US011505470B2

(12) United States Patent
Christou et al.

(10) Patent No.: US 11,505,470 B2
(45) Date of Patent: Nov. 22, 2022

(54) MOLECULAR CERIUM-OXIDE NANOCLUSTERS AND METHODS FOR SYNTHESIZING THE SAME

(71) Applicant: University of Florida Research Foundation, Inc., Gainesville, FL (US)

(72) Inventors: George Christou, Gainesville, FL (US); Bradley Keith Russell-Webster, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 138 days.

(21) Appl. No.: 17/051,904

(22) PCT Filed: May 3, 2019

(86) PCT No.: PCT/US2019/030602
§ 371 (c)(1),
(2) Date: Oct. 30, 2020

(87) PCT Pub. No.: WO2019/213522
PCT Pub. Date: Nov. 7, 2019

(65) Prior Publication Data
US 2021/0238207 A1 Aug. 5, 2021

Related U.S. Application Data

(60) Provisional application No. 62/666,394, filed on May 3, 2018.

(51) Int. Cl.
| | | |
|---|---|---|
| C01F 17/00 | (2020.01) | |
| C01F 17/235 | (2020.01) | |
| C07F 9/00 | (2006.01) | |
| B82Y 30/00 | (2011.01) | |
| B82Y 35/00 | (2011.01) | |
| B82Y 40/00 | (2011.01) | |
| B01J 37/00 | (2006.01) | |

(52) U.S. Cl.
CPC ............ *C01F 17/235* (2020.01); *C07F 9/005* (2013.01); *B01J 37/0072* (2013.01); *B82Y 30/00* (2013.01); *B82Y 35/00* (2013.01); *B82Y 40/00* (2013.01); *C01P 2004/64* (2013.01)

(58) Field of Classification Search
CPC .......... C01F 1/00; C01F 17/235; B82Y 40/00; C01P 2004/64
USPC ................................................. 423/263, 21.1
See application file for complete search history.

(56) References Cited

U.S. PATENT DOCUMENTS

| | | | |
|---|---|---|---|
| 6,210,451 B1 | 4/2001 | Chopin et al. | |
| 8,980,202 B2 * | 3/2015 | Cowdery-Corvan | ........................ C01G 49/0054 516/33 |
| 9,023,550 B2 * | 5/2015 | Brinkman | ............. H01M 8/126 429/482 |
| 11,207,663 B2 * | 12/2021 | Christou | ............... C01F 17/235 |
| 2007/0092423 A1 * | 4/2007 | Hyeon | .................. C01F 17/235 423/263 |

FOREIGN PATENT DOCUMENTS

WO 2018/106794 A2 6/2018

OTHER PUBLICATIONS

Kagomiya et al, "Oxygen permeable . . . Substrates" Electrochemical and Solid-State Lett. 8 (1), A70-3. (Year: 2005).*
Mitchell et al. Atomically-precise colloidal nanoparticles of cerium dioxide, Nature Communications, vol. 8:1445, Nov. 13, 2017, pp. 1-7.
Shulamith Schlick et al., "Scavenging of Hydroxyl Radicals by Ceria Nanoparticles: Effect of Particle Size and Concentration ", J. Phys. Chem. C 2016, 120, 6885-6890.
International Search Report and Written Opinion of PCT/US2019/030602 dated Jul. 2, 2019.
Carson, Innis, et al. "Metal-binding motifs of alkyl and aryl phosphinates; versatile mono and polynucleating ligands." Coordination Chemistry Reviews 335 (2017): 150-171.
Mason, Mark R. "Molecular phosphates, phosphonates, phosphinates, and arsonates of the group 13 elements." Journal of Cluster Science 9.1 (1998): 1-23.
Brown, Ian David. "Recent developments in the methods and applications of the bond valence model." Chemical reviews 109.12 (2009): 6858-6919.
Migani, Annapaola, Konstantin M. Neyman, and Stefan T. Bromley. "Octahedrality versus tetrahedrality in stoichiometric ceria nanoparticles." Chemical Communications 48.35 (2012): 4199-4201.
Calvez, Guillaume, et al. "A New Series of Anhydrous Lanthanide-Based Octahedral Hexanuclear Complexes." (2009): 3172-3178.
Fenton's reaction http://www.lenntech.com/fenton-reaction.htm (accessed Jun. 23, 2017).
Kalyanaraman, B., et al. "Detection of thiyl radical adducts formed during hydroxyl radical-and peroxynitrite-mediated oxidation of thiols—a high resolution ESR spin-trapping study at Q-band (35 Ghz)." Analytical biochemistry 241.1 (1996): 75-81.

(Continued)

*Primary Examiner* — Steven J Bos
(74) *Attorney, Agent, or Firm* — Thomas | Horstemeyer, LLP

(57) ABSTRACT

Described herein are compositions and methods relating to molecular cerium-oxide nanoclusters. Described herein are methods of producing cerium-oxide nanoclusters. Described herein are cerium-oxide nanoclusters. Further described herein are cerium-oxide nanoclusters produced by methods as described herein. Methods as described herein can comprise providing a first cerium source, an organic acid, and a solvent; and mixing the cerium source and the organic acid in the presence of a solvent to create a reaction mixture at a temperature and a pressure for a period of time to create a composition of molecular cerium-oxide nanoclusters containing a plurality of molecular cerium-oxide nanoclusters.

17 Claims, 34 Drawing Sheets

(56) References Cited

OTHER PUBLICATIONS

Chamulitrat, Walee, Sandra J. Jordan, and Ronald P. Mason. "Fatty acid radical formation in rats administered oxidized fatty acids: in vivo spin trapping investigation." Archives of biochemistry and biophysics 299.2 (1992): 361-367.
Guo, Qiong, Steven Y. Qian, and Ronald P. Mason. "Separation and identification of DMPO adducts of oxygen-centered radicals formed from organic hydroperoxides by HPLC-ESR, ESI-MS and MS/MS." Journal of the American Society for Mass Spectrometry 14.8 (2003): 862-871.
Dikalov, Sergey, Igor Kirilyuk, and Igor Grigor'ev. "Spin trapping of O-, C-, and S-centered radicals and peroxynitrite by 2H-imidazole-1-oxides." Biochemical and biophysical research communications 218.2 (1996): 616-622.
Attri, Pankaj, et al. "Generation mechanism of hydroxyl radical species and its lifetime prediction during the plasma-initiated ultraviolet (UV) photolysis." Scientific reports 5.1 (2015): 1-8.
Babu, Suresh, et al. "Electron paramagnetic study on radical scavenging properties of ceria nanoparticles." Chemical Physics Letters 442.4-6 (2007): 405-408.
Singh, Sanjay. "Cerium oxide based nanozymes: Redox phenomenon at biointerfaces." Biointerphases 11.4 (2016): 04B202.
Zhou, Kebin, et al. "Enhanced catalytic activity of ceria nanorods from well-defined reactive crystal planes." Journal of Catalysis 229.1 (2005): 206-212.
Aneggi, Eleonora, et al. "Surface-structure sensitivity of CO oxidation over polycrystalline ceria powders." Journal of catalysis 234.1 (2005): 88-95.
Vilé, Gianvito, et al. "Opposite face sensitivity of CeO2 in hydrogenation and oxidation catalysis." Angewandte Chemie International Edition 53.45 (2014): 12069-12072.
Liu, Xiangwen, et al. "Oxygen vacancy clusters promoting reducibility and activity of ceria nanorods." Journal of the American Chemical Society 131.9 (2009): 3140-3141.
Mai, Hao-Xin, et al. "Shape-selective synthesis and oxygen storage behavior of ceria nanopolyhedra, nanorods, and nanocubes." The Journal of Physical Chemistry B 109.51 (2005): 24380-24385.
Akhtar, Muhammad Nadeem, et al. "1D cerium (III) coordination polymer with pivalate bridges: Synthesis, structure and magnetic properties." Journal of Molecular Structure 1141 (2017): 170-175.
Malaestean, Iurie L., Arkady Ellem, and Paul Kögerler. "{Ce10Mn8}: Cerium Analogues of the Decavanadate Archetype." European Journal of Inorganic Chemistry 2013.10-11 (2013): 1635-1638.
Malaestean, Iurie L., et al. "Linear, Zigzag, and Helical Cerium (III) Coordination Polymers." Crystal growth & design 12.3 (2012): 1593-1602.
Eppley, Hilary J., et al. "High-Spin Molecules: Unusual magnetic susceptibility relaxation effects in [Mn12O12 (O2CEt) 16 (H2O) 3](S= 9) and the one-electron reduction product (PPh4)[Mn12O12 (O2CEt) 16 (H2O) 4](S= 19/2)." Journal of the American Chemical Society 117.1 (1995): 301-317.
Schugar, Harvey J., et al. "Crystal structure and magnetic properties of the cluster complex Cu18CuII6 [SC (CH3) 2CH2NH2] 12Cl 3.5 SO4.~ 20H2O, a mixed-valence copper-mercaptide species." Inorganic Chemistry 19.2 (1980): 543-552.
Kiskin, Mikhail A., et al. "First hexanuclear manganese (II) µ6-Cl centered carboxylate anion: Synthesis, structure and magnetic properties." Inorganic Chemistry Communications 10.9 (2007): 997-1000.
Falaise, Clement, et al. "Isolation of the large {actinide} 38 polyoxo cluster with uranium." Journal of the American Chemical Society 135.42 (2013): 15678-15681.
Wilson, Richard E., S. Skanthakumar, and L. Soderholm. "Separation of plutonium oxide nanoparticles and colloids." Angewandte Chemie 123.47 (2011): 11430-11433.
Soderholm, L., et al. "The structure of the plutonium oxide nanocluster [Pu38O56Cl54 (H2O) 8] 14-." Angewandte Chemie International Edition 47.2 (2008): 298-302.

Wang, Zhenling, Zewei Quan, and Jun Lin. "Remarkable changes in the optical properties of CeO2 nanocrystals induced by lanthanide ions doping." Inorganic chemistry 46.13 (2007): 5237-5242.
Tsunekawa, S., T. Fukuda, and A. Kasuya. "Blue shift in ultraviolet absorption spectra of monodisperse CeO 2-x nanoparticles." Journal of Applied Physics 87 3 (2000): 1318-1321.
Gu, Hua, and Mark D. Soucek. "Preparation and characterization of monodisperse cerium oxide nanoparticles in hydrocarbon solvents." Chemistry of Materials 19.5 (2007): 1103-1110.
Bensalem, A., J. C. Muller, and F. Bozon-Verduraz. "Faraday communications. From bulk CeO 2 to supported cerium-oxygen clusters: a diffuse reflectance approach." Journal of the Chemical Society, Faraday Transactions 88.1 (1992): 153-154.
Haddow, Alexander, G. A. R. Kon, and W. C. J. Ross. "Effects upon tumours of various haloalkylarylamines." Nature 162.4125 (1948): 824-825.
Rousselot, Louis M., et al. "Intraluminal chemotherapy (HN2 or 5-FU) adjuvant to operation for cancer of the colon and rectum. II. Follow-up report of 97 cases." Cancer 20.5 (1967): 829-833.
Yang, Yu-Chu. "Chemical detoxification of nerve agent VX." Accounts of Chemical Research 32.2 (1999): 109-115.
Shih, Tsung-Ming, Robert K. Kan, and John H. McDonough. "In vivo cholinesterase inhibitory specificity of organophosphorus nerve agents." Chemico-biological interactions 157 (2005): 293-303.
Campion, Alan, and Patanjali Kambhampati. "Surface-enhanced Raman scattering." Chemical society reviews 27.4 (1998): 241-250.
Munro, Nancy B., et al. "The sources, fate, and toxicity of chemical warfare agent degradation products." Environmental health perspectives 107.12 (1999): 933-974.
Yang, Yu Chu, James A. Baker, and J. Richard Ward. "Decontamination of chemical warfare agents." Chemical Reviews 92.8 (1992): 1729-1743.
Hegde, R. I., C. M. Greenlief, and J. M. White. "Surface chemistry of dimethyl methylphosphonate on rhodium (100)." The Journal of Physical Chemistry 89.13 (1985): 2886-2891.
Smentkowski, V. S., P. Hagans, and J. T. Yates Jr. "Study of the catalytic destruction of dimethyl methylphosphonate (DMMP): oxidation over molybdenum (110)." The Journal of Physical Chemistry 92.22 (1988): 6351-6357.
Guo, X., J. Yoshinobu, and J. T. Yates. "Decomposition of an organophosphonate compound (dimethylmethylphosphonate) on the nickel (111) and palladium (111) surfaces." Journal of physical chemistry 94.17 (1990): 6839-6842.
Henderson, Michael A., and J. M. White. "Adsorption and decomposition of dimethyl methylphosphonate on platinum (111)." Journal of the American Chemical Society 110.21 (1988): 6939-6947.
Wagner, George W., et al. "Reactions of VX, GD, and HD with nanosize MgO." The Journal of Physical Chemistry B 103.16 (1999): 3225-3228.
Michalkova, A., et al. "Theoretical study of the adsorption and decomposition of sarin on magnesium oxide." The Journal of Physical Chemistry B 108.17 (2004): 5294-5303.
Wagner, George W., Qiang Chen, and Yue Wu. "Reactions of VX, GD, and HD with Nanotubular Titania." The Journal of Physical Chemistry C 112.31 (2008): 11901-11906.
Prasad, G. K., et al. "Modified titania nanotubes for decontamination of sulphur mustard." Journal of hazardous materials 167.1-3 (2009): 1192-1197.
Liu, Yangyang, et al. "Dual-function metal-organic framework as a versatile catalyst for detoxifying chemical warfare agent simulants" ACS nano 9.12 (2015): 12358-12364.
Mondloch, Joseph E., et al. "Destruction of chemical warfare agents using metal-organic frameworks." Nature materials 14.5 (2015): 512-516.
Dhall. A., et al. "Characterizing the phosphatase mimetic activity of cerium oxide nanoparticles and distinguishing its active site from that for catalase mimetic activity using anionic inhibitors." Environmental Science: Nano 4.8 (2017): 1742-1749.
Dowding, Janet M., et al. "Cellular interaction and toxicity depend on physicochemical properties and surface modification of redox-active nanomaterials." ACS nano 7.6 (2013): 4855-4868.

(56) References Cited

OTHER PUBLICATIONS

Cerium—Element information, properties and uses | Periodic Table http://www.rsc.org/periodic-table/element/58/cerium (accessed Mar. 7, 2017).
Montini, Tiziano, et al. "Fundamentals and catalytic applications of CeO2-based materials." Chemical reviews 116.10 (2016): 5987-6041.
Wang, Qiuyan, et al. "Application of rare earth modified Zr-based ceria-zirconia solid solution in three-way catalyst for automotive emission control." Environmental science & technology 44.10 (2010): 3870-3875.
Gao, Peng, et al. "Electrically driven redox process in cerium oxides." Journal of the American Chemical Society 132.12 (2010): 4197-4201.
Flytzani-Stephanopoulos, Maria. "Nanostructured cerium oxide "Ecocatalysts"." Mrs Bulletin 26.11 (2001): 885-889.
Lawrence, Neil J., et al. "Defect engineering in cubic cerium oxide nanostructures for catalytic oxidation." Nano letters 11.7 (2011): 2666-2671.
Ivanova, A. S. "Physicochemical and catalytic properties of systems based on CeO 2." Kinetics and catalysis 50.6 (2009): 797-815.
Scire, Salvatore, et al. "Catalytic combustion of volatile organic compounds on gold/cerium oxide catalysts." Applied Catalysis B: Environmental 40.1 (2003): 43-49.
Ousmane, M., et al. "Supported Au catalysts for low-temperature abatement of propene and toluene, as model VOCs: Support effect" Applied Catalysis B: Environmental 101.3-4 (2011): 629-637.
Cook, Lee M. "Chemical processes in glass polishing." Journal of non-crystalline solids 120.1-3 (1990): 152-171.
Das, Soumen, et al. "Cerium oxide nanoparticles: applications and prospects in nanomedicine." Nanomedicine 8.9 (2013): 1483-1508.
Esch, Friedrich, et al. "Electron localization determines defect formation on ceria substrates." Science 309.5735 (2005): 752-755.
Reed, Kenneth, et al. "Exploring the properties and applications of nanoceria: is there still plenty of room at the bottom?." Environmental Science: Nano 1.5 (2014): 390-405.
Yao, H. C., and YF Yu Yao. "Ceria in automotive exhaust catalysts: I. Oxygen storage." Journal of catalysis 86.2 (1984): 254-265.
Conesa, JoséC. "Computer modeling of surfaces and defects on cerium dioxide." Surface Science 339.3 (1995): 337-352.
Trovarelli, Alessandro, and Jordi Llorca. "Ceria catalysts at nanoscale: how do crystal shapes shape catalysis?." ACS catalysis 7.7 (2017): 4716-4735.
Huang, Weixin, and Yuxian Gao. "Morphology-dependent surface chemistry and catalysis of CeO 2 nanocrystals." Catalysis Science & Technology 4.11 (2014): 3772-3784.
Heiligtag, Florian J., and Markus Niederberger. "The fascinating world of nanoparticle research." Materials Today 16.7-8 (2013): 262-271.
Wu, Lijun, et al. "Oxidation state and lattice expansion of CeO 2-x nanoparticles as a function of particle size." Physical Review B 69.12 (2004): 125415.
Hailstone, R. K., et al. "A study of lattice expansion in CeO2 nanoparticles by transmission electron microscopy." The Journal of Physical Chemistry C 113.34 (2009): 15155-15159.
Loschen, Christoph, et al. "Understanding ceria nanoparticles from first-principles calculations." The Journal of Physical Chemistry C 111.28 (2007): 10142-10145.
Zhang, Dengsong, et al. "Shape-controlled synthesis and catalytic application of ceria nanomaterials." Dalton transactions 41.48 (2012): 14455-14475.
Sayle, Thi XT, et al. "Environment-mediated structure, surface redox activity and reactivity of ceria nanoparticles." Nanoscale 5.13 (2013): 6063-6073.
Wu, Qiang, et al. "Great influence of anions for controllable synthesis of CeO2 nanostructures: from nanorods to nanocubes." The Journal of Physical Chemistry C 112.44 (2008): 17076-17080.
Baranchikov, Alexander E., et al. "Lattice expansion and oxygen non-stoichiometry of nanocrystalline ceria." CrystEngComm 12.11 (2010): 3531-3533.

Sokolov, A. E., et al. "On the size effect in nanocrystalline cerium dioxide: Is the Tsunekawa model correct?." Journal of Surface Investigation X-ray, Synchrotron and Neutron Techniques 8.5 (2014): 997-1001.
Sass, Ian A., et al. "Synthesis and magnetic properties of heptadecametallic Fe (III) clusters." Polyhedron 26.9-11 (2007): 1835-1837.
Malaestean, Iurii L., et al. "Cerium oxide nanoclusters: commensurate with concepts of polyoxometalate chemistry? " Chemical communications 48.10 (2012): 1499-1501.
Bruix, Albert, and Konstantin M. Neyman. "Modeling ceria-based nanomaterials for catalysis and related applications." Catalysis Letters 146.10 (2016): 2053-2080.
Wang, Zhong Lin, and Xiangdong Feng. "Polyhedral shapes of CeO2 nanoparticles." The Journal of Physical Chemistry B 107.49 (2003): 13563-13566.
Deshpande, Sameer, et al. "Size dependency variation in lattice parameter and valency states in nanocrystalline cerium oxide." Applied Physics Letters 87.13 (2005): 133113.
Asati, Atul, et al. "Surface-charge-dependent cell localization and cytotoxicity of cerium oxide nanoparticles." ACS nano 4.9 (2010): 5321-5331.
Gao, Ying, et al. "Cerium oxide nanoparticles in cancer." OncoTargets and therapy 7 (2014): 835.
Akhtar, Mohd Javed, Maqusood Ahamed, and Hisham A. Alhadlaq. "Therapeutic targets in the selective killing of cancer cells by nanomaterials." Clinica Chimica Acta 469 (2017): 53-62.
Xu, Can, and Xiaogang Qu. "Cerium oxide nanoparticle: a remarkably versatile rare earth nanomaterial for biological applications." NPG Asia materials 6.3 (2014): e90-e90.
Grulke, Eric, et al. "Nanoceria: factors affecting its pro-and antioxidant properties." Environmental Science: Nano 1.5 (2014): 429-444.
Singh, Sanjay, et al. "A phosphate-dependent shift in redox state of cerium oxide nanoparticles and its effects on catalytic properties" Biomaterials 32.28 (2011): 6745-6753.
Aguilar, Tomás Alejandro Fregoso, Brenda Carolina Hernández Navarro, and Jorge Alberto Mendoza Pérez. "Endogenous antioxidants: a review of their role in oxidative stress." A master regulator of oxidative stress—the transcription factor nrf2 (2016): 3-20.
Das, Mainak, et al. "Auto-catalytic ceria nanoparticles offer neuroprotection to adult rat spinal cord neurons." Biomaterials 28.10 (2007): 1918-1925.
Xue, Ying, et al. "Direct evidence for hydroxyl radical scavenging activity of cerium oxide nanoparticles." The Journal of Physical Chemistry C 115.11 (2011): 4433-4438.
Nelson, Bryant C., et al. "Antioxidant cerium oxide nanoparticles in biology and medicine." Antioxidants 5.2 (2016): 15.
Xue, Ying, et al. "The vital role of buffer anions in the antioxidant activity of CeO2 nanoparticles." Chemistry—A European Journal 18.35 (2012): 11115-11122.
Das, Rajorshi, Rupam Sarma, and Jubaraj B. Baruah. "A hexanuclear cerium (IV) cluster with mixed coordination environment." Inorganic Chemistry Communications 13.6 (2010): 793-795.
Mathey, Laurent, et al. "Cerium (IV) hexanuclear clusters from cerium (III) precursors: Molecular models for oxidative growth of ceria nanoparticles." Chemistry—A European Journal 21.38 (2015): 13454-13461.
Hennig, Christoph, et al. "Crystal structure and solution species of Ce (III) and Ce (IV) formates: From mononuclear to hexanuclear complexes." Inorganic chemistry 52.20 (2013): 11734-11743.
Mereacre, Valeriu, et al. "Homo-and Heterovalent Polynuclear Cerium and Cerium/Manganese Aggregates." Helvetica Chimica Acta 92.11 (2009): 2507-2524.
Estes, Shanna L., Mark R. Antonio, and L. Soderholm. "Tetravalent Ce in the nitrate-decorated hexanuclear cluster [Ce6 (µ3-0) 4 (µ3-OH) 4] 12+: a structural end point for ceria nanoparticles." The Journal of Physical Chemistry C 120.10 (2016): 5810-5818.
Spek, A. L. "Platon/Squeeze." Acta Crystallogr., Sect. D: Biol. Crystallogr 65 (2009): 148-155.
Franz, Robert G. "Comparisons of pKa and log P values of some carboxylic and phosphonic acids: synthesis and measurement" Aaps Pharmsci 3.2 (2001): 1-13.

(56) References Cited

OTHER PUBLICATIONS

Nanda, Himansu Sekhar. "Surface modification of promising cerium oxide nanoparticles for nanomedicine applications." Rsc Advances 6.113 (2016): 111889-111894.

Kuchma, Melissa Hirsch, et al. "Phosphate ester hydrolysis of biologically relevant molecules by cerium oxide nanoparticles." Nanomedicine: Nanotechnology, Biology and Medicine 6.6 (2010): 738-744.

Patil, Avinash J., et al. "Cerium oxide nanoparticle-mediated self-assembly of hybrid supramolecular hydrogels." Chemical Communications 48.64 (2012): 7934-7936.

Tan, Feng, et al. "An efficient method for dephosphorylation of phosphopeptides by cerium oxide." Journal of mass spectrometry 43.5 (2008): 628-632.

Xu, Can, et al. "Nucleoside triphosphates as promoters to enhance nanoceria enzyme-like activity and for single-nucleotide polymorphism typing." Advanced Functional Materials 24.11 (2014): 1624-1630.

Janoš, Pavel, et al. "Cerium oxide for the destruction of chemical warfare agents: A comparison of synthetic routes." Journal of hazardous materials 304 (2016): 259-268.

Vernekar, Amit A., Tandrila Das, and Govindasamy Mugesh. "Vacancy-engineered nanoceria: enzyme mimetic hotspots for the degradation of nerve agents." Angewandte Chemie International Edition 55.4 (2016): 1412-1416.

Zenerino, Arnaud, et al. "New CeO2 nanoparticles-based topical formulations for the skin protection against organophosphates." Toxicology reports 2 (2015): 1007-1013.

Yang, Yushi, et al. "Redox enzyme-mimicking activities of CeO 2 nanostructures: Intrinsic influence of exposed facets." Scientific reports 6.1 (2016): 1-7.

Naganuma, Tamaki. "Shape design of cerium oxide nanoparticles for enhancement of enzyme mimetic activity in therapeutic applications." Nano Research 10.1 (2017): 199-217.

Mitchell, Mark B., et al. "The room temperature decomposition mechanism of dimethyl methylphosphonate (DMMP) on alumina-supported cerium oxide-participation of nano-sized cerium oxide domains." The Journal of Physical Chemistry B 108.5 (2004): 1634-1645.

Sheinker, Viktor N., and Mark B. Mitchell. "Quantitative study of the decomposition of dimethyl methylphosphonate (DMMP) on metal oxides at room temperature and above." Chemistry of materials 14.3 (2002): 1257-1268.

Barry, Judith A., et al. "Dimethyl methyl phosphonate (DMMP): A phosphorus-31 nuclear magnetic resonance spectroscopic probe of intracellular volume in mammalian cell cultures." Biochemistry 32.17 (1993): 4665-4670.

31 Phosphorus NMR http://chem.ch.huji.ac.il/nmr/techniques/1d/row3/p.html (accessed Aug. 9, 2017).

Miyata, Yoshihiko, and Hiroaki Ando. "Examination of an internal standard substance for the quantitative analysis of sarin using 31P-NMR." Journal of health science 47.1 (2001): 75-77.

Katz, Michael J., et al. "Simple and compelling biomimetic metal-organic framework catalyst for the degradation of nerve agent simulants." Angewandte Chemie 126.2 (2014): 507-511.

Dimethyl methylphosphonate D169102 http://www.sigmaaldrich.com/catalog/product/aldrich/d169102.

Paraoxon-methyl 46192 http://www.sigmaaldrich.com/catalog/product/sial/46192.

Štengl, Václav, et al. "Ge4+ doped TiO2 for stoichiometric degradation of warfare agents." Journal of hazardous materials 227 (2012): 62-67.

Štengl, Václav, et al. "Sulphur mustard degradation on zirconium doped Ti—Fe oxides." Journal of hazardous materials 192.3 (2011): 1491-1504.

Mitchell, "Molecular Routes to Monodisperse Cerium-Oxide Nanoparticles, and a Magnetostructural Correlation for Polynuclear Iron-Oxide Clusters" University of Florida (2017) Uploaded into two separate filed due to size.

Goura, Joydeb, and Vadapalli Chandrasekhar. "Molecular metal phosphonates." Chemical reviews 115.14 (2015): 6854-6965.

Thuijs, Annaliese Elizabeth "High Temperature Solution Methods to Homo- And Heterometallic Molecular Compounds with Multi-functional Properties" University of Florida (2015) Uploaded into two separate filed due to size.

National Research Council. "Review of the US Army's Health Risk Assessments for Oral Exposure to Six Chemical-Warfare Agents." (1999). Uploaded into three separate filed due to size.

\* cited by examiner

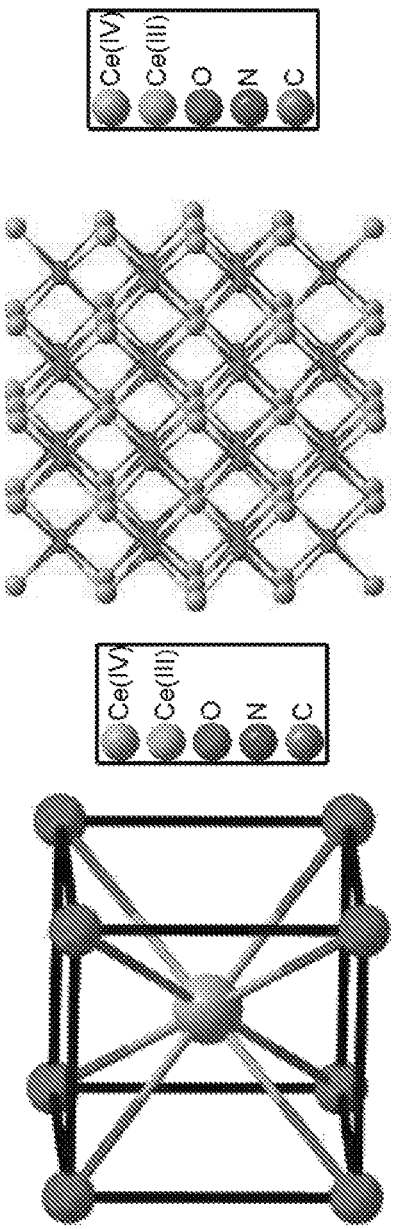
FIG. 2A
FIG. 2B
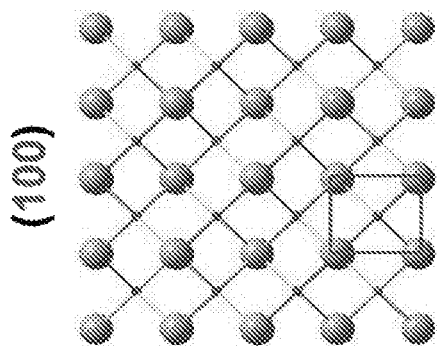
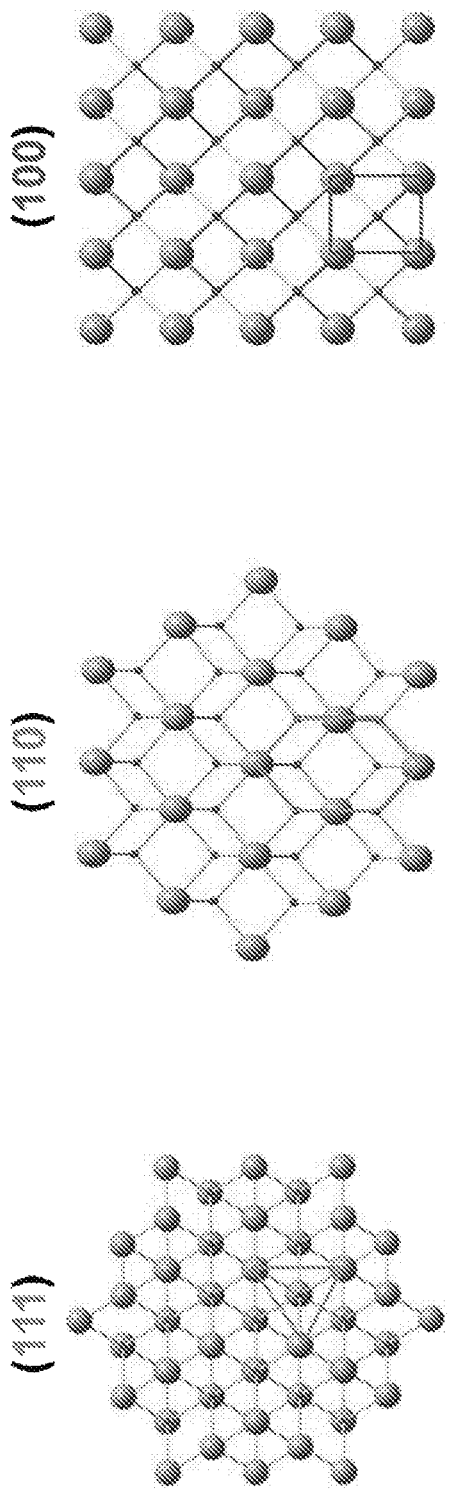
FIG. 2C
FIG. 2D
FIG. 2E

Ceria nanocubes

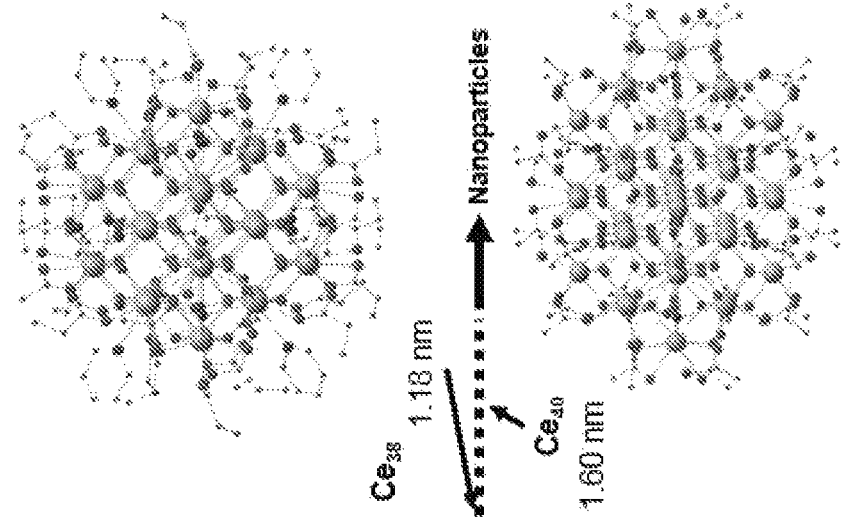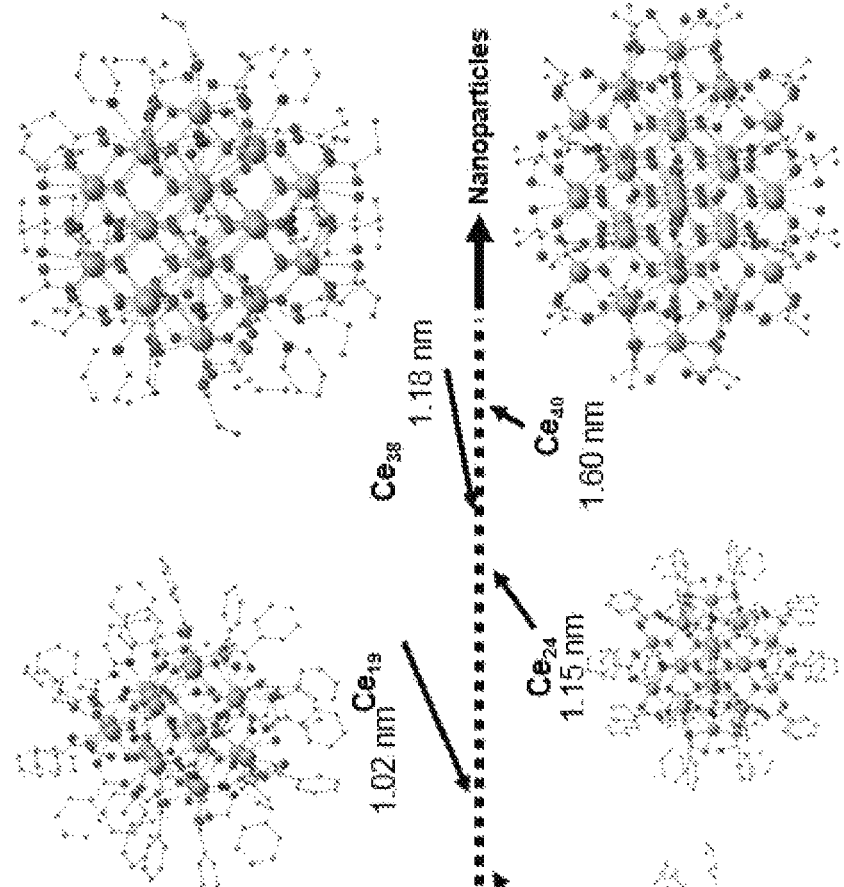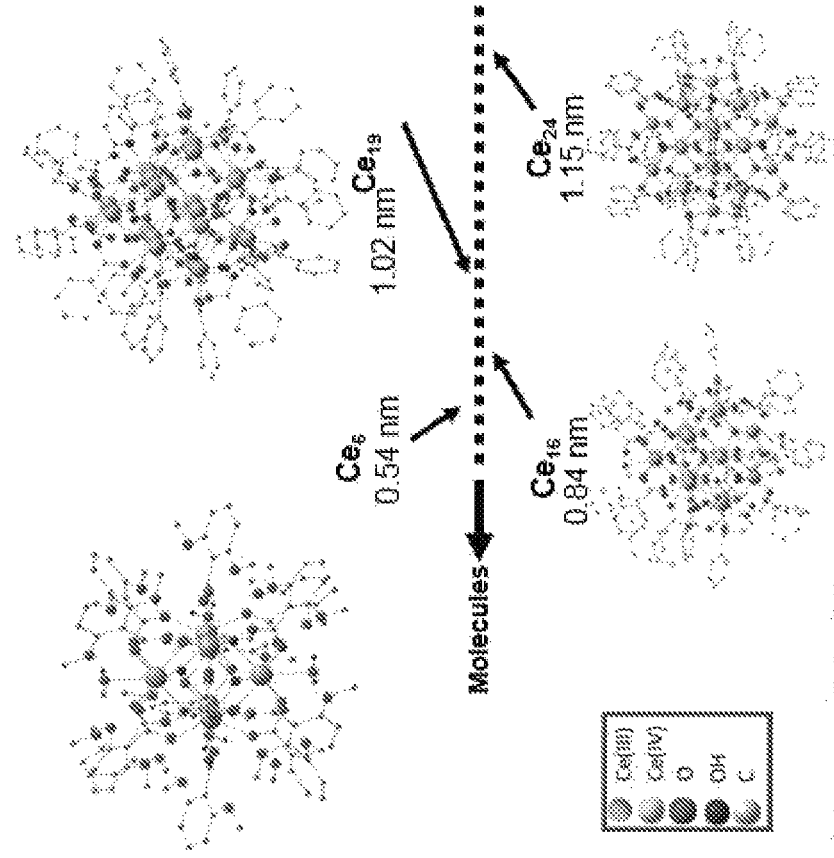
FIG. 4A  FIG. 4B  FIG. 4C  FIG. 4D  FIG. 4E  FIG. 4F

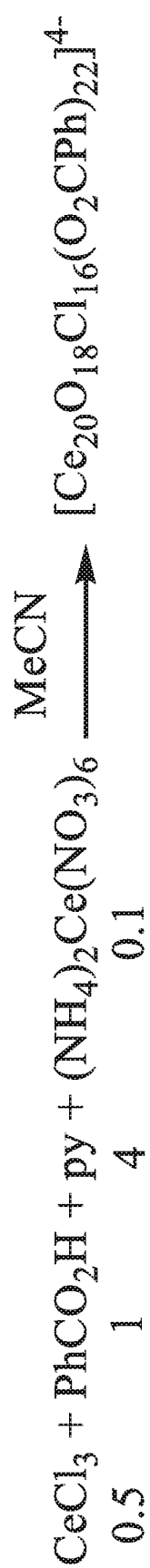
$CeCl_3 + PhCO_2H + py + (NH_4)_2Ce(NO_3)_6 \xrightarrow{MeCN} [Ce_{20}O_{18}Cl_{16}(O_2CPh)_{22}]^{4-}$
0.5        1           4          0.1
FIG. 7A
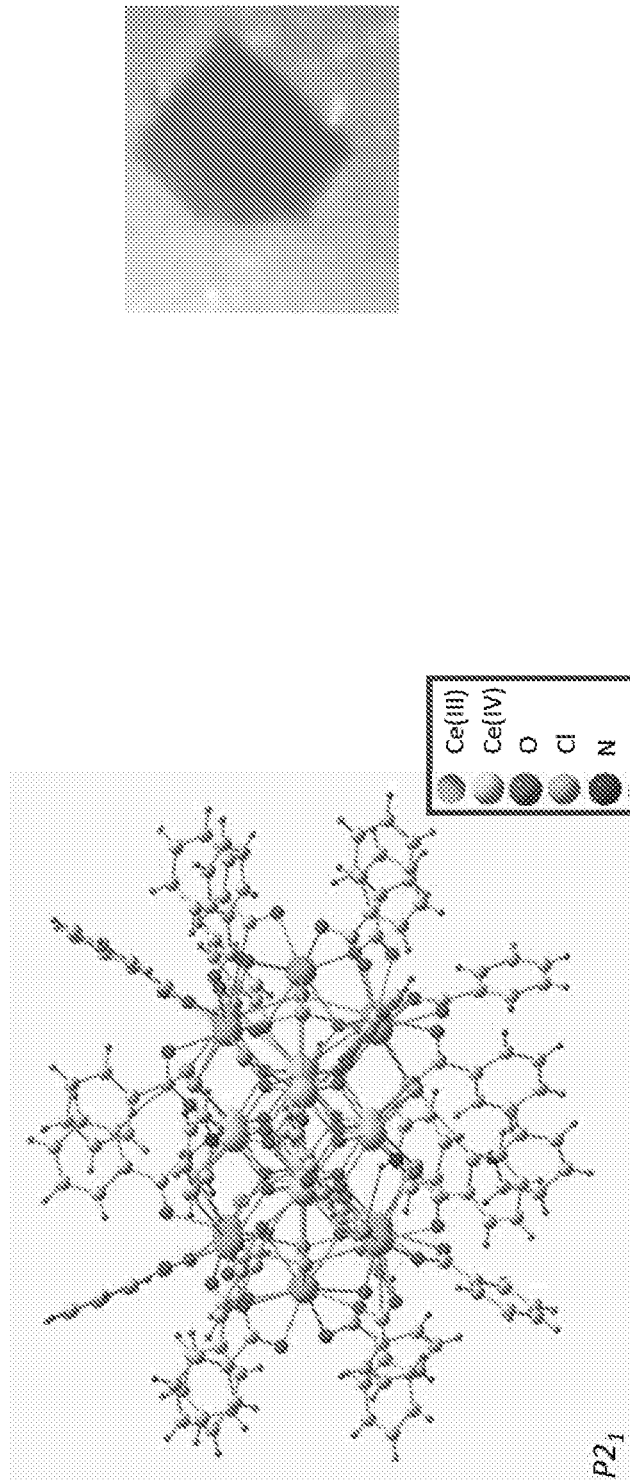
FIG. 7B
FIG. 7C

The BVS of Ce$_{20}$

|      | Ce(III) | Ce(IV) | C.N. |       | Ce(III) | Ce(IV) | C.N. | O$^{2-}$ |
|------|---------|--------|------|-------|---------|--------|------|----------|
| Ce1  | 4.22    | 3.71   | 8    | Ce11  | 3.14    | 2.65   | 9    | 2        |
| Ce2  | 3.85    | 3.38   | 8    | Ce12  | 3.00    | 2.53   | 9    | 2        |
| Ce3  | 4.45    | 3.77   | 8    | Ce13  | 2.56    | 2.46   | 9    | 2        |
| Ce4  | 4.39    | 3.71   | 8    | Ce14  | 2.98    | 2.50   | 9    | 2        |
| Ce5  | 4.44    | 3.76   | 8    | Ce15  | 2.92    | 2.46   | 9    | 2        |
| Ce6  | 4.38    | 3.71   | 8    | Ce16  | 2.99    | 2.53   | 9    | 2        |
| Ce7  | 4.44    | 3.80   | 8    | Ce17  | 3.02    | 2.55   | 9    | 2        |
| Ce8  | 4.45    | 3.82   | 8    | Ce18  | 2.96    | 2.49   | 9    | 2        |
| Ce9  | 4.41    | 3.76   | 8    | Ce19  | 2.89    | 2.65   | 10   | 2        |
| Ce10 | 4.41    | 3.78   | 8    | Ce20  | 2.92    | 2.51   | 10   | 2        |

FIG. 8

(111) Green (100) Blue

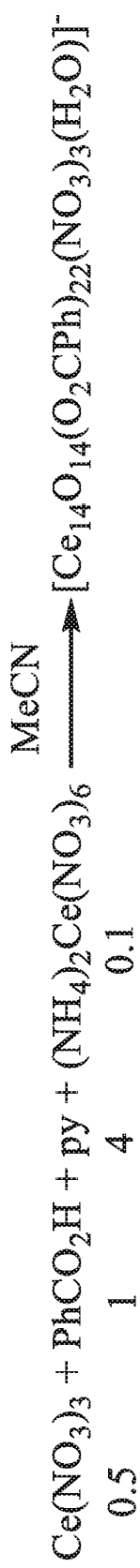
$Ce(NO_3)_3 + PhCO_2H + py + (NH_4)_2Ce(NO_3)_6 \xrightarrow{MeCN} [Ce_{14}O_{14}(O_2CPh)_{22}(NO_3)_3(H_2O)]^-$
0.5            1            4            0.1
FIG. 11A
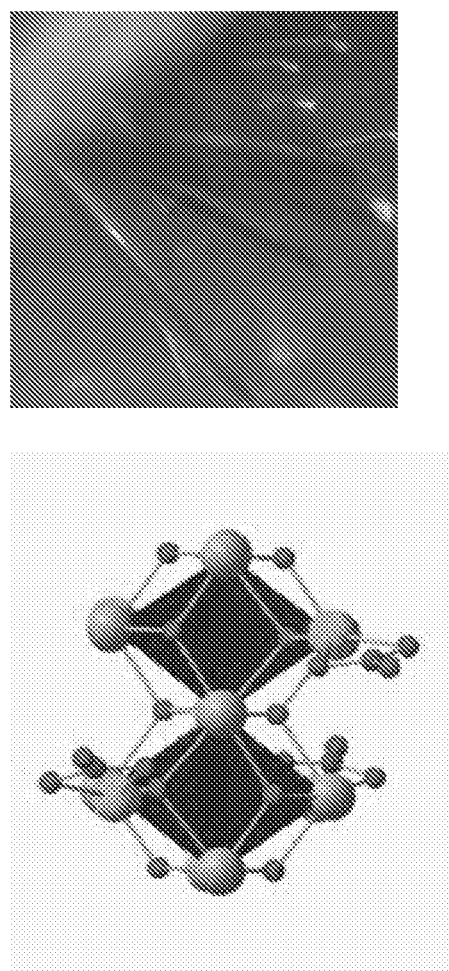
FIG. 11C
FIG. 11D
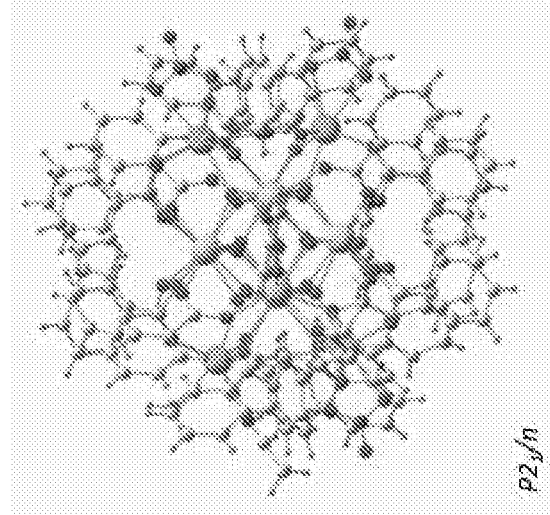
FIG. 11B

| $Ce_{14}$ | $Ce_{20}$ | Deviation (Å) |
|---|---|---|
| Ce1 | Ce1 | 0.152 |
| Ce2 | Ce2 | 0.135 |
| Ce3 | Ce3 | 0.084 |
| Ce4 | Ce4 | 0.089 |
| Ce5 | Ce5 | 0.084 |
| Ce6 | Ce6 | 0.084 |
| Ce7 | Ce7 | 0.177 |
| Ce8 | Ce8 | 0.153 |
| Ce9 | Ce9 | 0.158 |
| Ce10 | Ce10 | 0.171 |
| Ce11 | Ce11 | 0.462 |
| Ce12 | Ce12 | 0.453 |
| Ce13 | Ce13 | 0.492 |
| Ce14 | Ce14 | 0.450 |
| Weighted RMS Deviation (Å) | | 0.273 |

FIG. 12

- Ce(III)
- Ce(IV)
- O (dashed)
Ce₁₄ Green

Ce₂₀ Pink
(solid)

$$\text{Ce(NO}_3)_3 + \text{PhCO}_2\text{H} + \text{HCl} + \text{py} + (\text{NH}_4)_2\text{Ce(NO}_3)_3 \xrightarrow{\text{MeCN}} [\text{Ce}_{24}\text{O}_{27}(\text{OH})_5\text{Cl}_4(\text{O}_2\text{CPh})_{30}(\text{py})_4]$$
0.5    1    25 μL    4    0.1
FIG. 14A
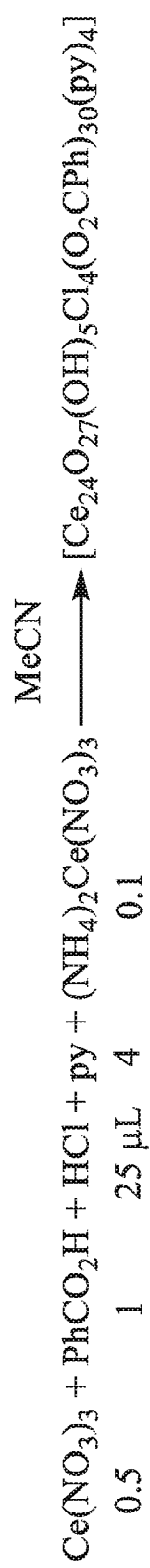
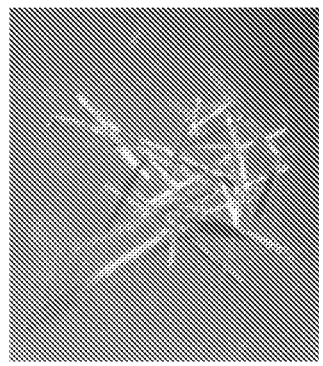
| Reaction Control | Product |
|---|---|
| $H_2O$ | $Ce_{14}$ |
| KCl | $Ce_{14}$ |
| $HNO_3$ | $Ce_{24}$ |
FIG. 14D
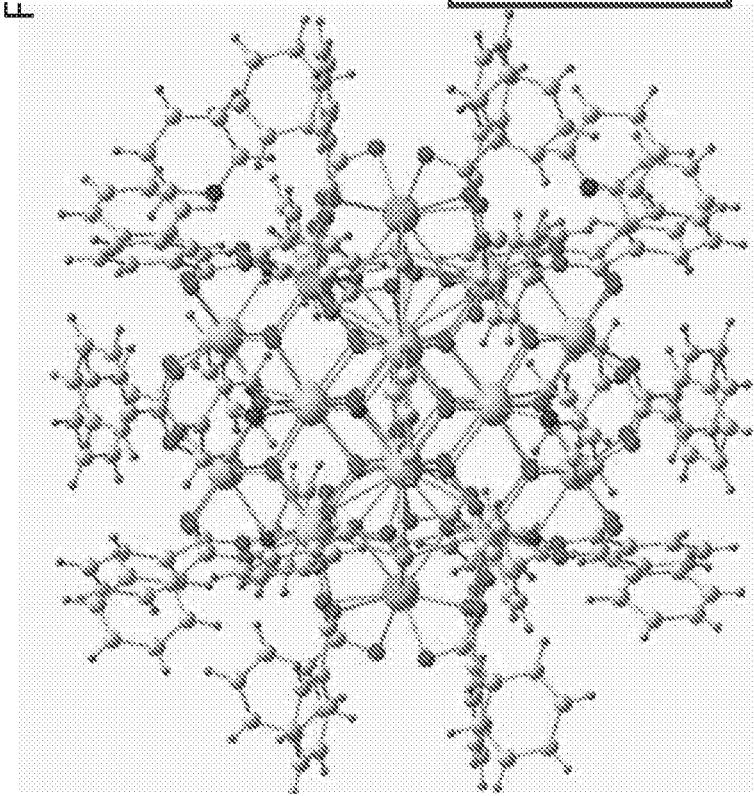
FIG. 14C
$P2_1/n$    FIG. 14B

The BVS of Ce$_{14}$

|      | Ce(III) | Ce(IV) | C.N. |      | Ce(III) | Ce(IV) | C.N. |
|------|---------|--------|------|------|---------|--------|------|
| Ce1  | 4.29    | 3.76   | 8    | Ce8  | 4.51    | 3.96   | 8    |
| Ce2  | 4.26    | 3.75   | 8    | Ce9  | 3.92    | 3.92   | 8    |
| Ce3  | 4.41    | 3.87   | 8    | Ce10 | 3.88    | 3.87   | 8    |
| Ce4  | 4.34    | 3.81   | 8    | Ce11 | 2.97    | 2.61   | 9    |
| Ce5  | 4.51    | 3.96   | 8    | Ce12 | 2.98    | 2.62   | 9    |
| Ce6  | 4.49    | 3.94   | 8    | Ce13 | 2.95    | 2.59   | 9    |
| Ce7  | 4.48    | 3.94   | 8    | Ce14 | 3.00    | 2.64   | 9    |

The BVS of Ce$_{24}$

|  | Ce(III) | Ce(IV) | C.N. |  | Ce(III) | Ce(IV) | C.N. |
|---|---|---|---|---|---|---|---|
| Ce1 | 4.38 | 3.84 | 8 | Ce7 | 4.54 | 3.93 | 9 |
| Ce2 | 4.16 | 3.65 | 8 | Ce8 | 4.61 | 3.99 | 9 |
| Ce3 | 4.18 | 3.67 | 8 | Ce9 | 4.45 | 3.86 | 9 |
| Ce4 | 4.44 | 3.85 | 8 | Ce10 | 4.39 | 3.85 | 8 |
| Ce5 | 3.34 | 2.83 | 10 | Ce11 | 4.21 | 3.63 | 9 |
| Ce6 | 4.70 | 4.05 | 9 | Ce12 | 4.46 | 3.92 | 8 |

| $Ce_{20}$ | $Ce_{24}Cl$ | Deviation (Å) |
|---|---|---|
| Ce1 | Ce1 | 0.175 |
| Ce2 | Ce1A | 0.176 |
| Ce3 | Ce2A | 0.24 |
| Ce4 | Ce3 | 0.204 |
| Ce5 | Ce3A | 0.18 |
| Ce6 | Ce2 | 0.222 |
| Ce7 | Ce8A | 0.072 |
| Ce8 | Ce4A | 0.053 |
| Ce9 | Ce8 | 0.06 |
| Ce10 | Ce4 | 0.06 |
| Weighted RMS Deviation (Å) | | |
| 0.1823 | | |

FIG. 20A

| $Ce_{20}$ | $Ce_{24}Cl$ | Deviation (Å) |
|---|---|---|
| Ce11 | Ce6A | 0.236 |
| Ce12 | Ce7A | 0.185 |
| Ce13 | Ce11 | 0.177 |
| Ce14 | Ce9 | 0.25 |
| Ce15 | Ce9A | 0.234 |
| Ce16 | Ce7 | 0.183 |
| Ce17 | Ce6 | 0.213 |
| Ce18 | Ce11A | 0.183 |
| Ce19 | Ce5A | 0.164 |
| Ce20 | Ce5 | 0.171 |

Weighted RMS Deviation (Å)
0.1823

FIG. 20B

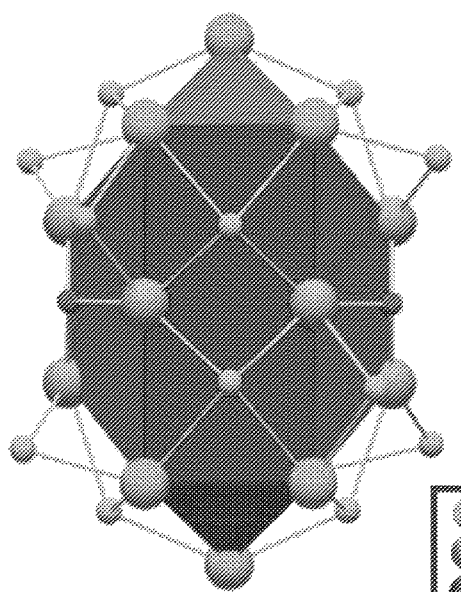 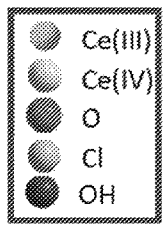 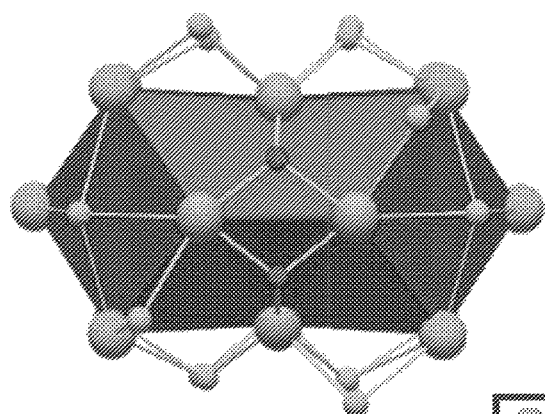 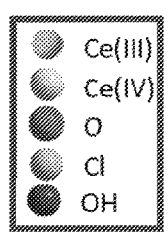
FIG. 22A
FIG. 22B

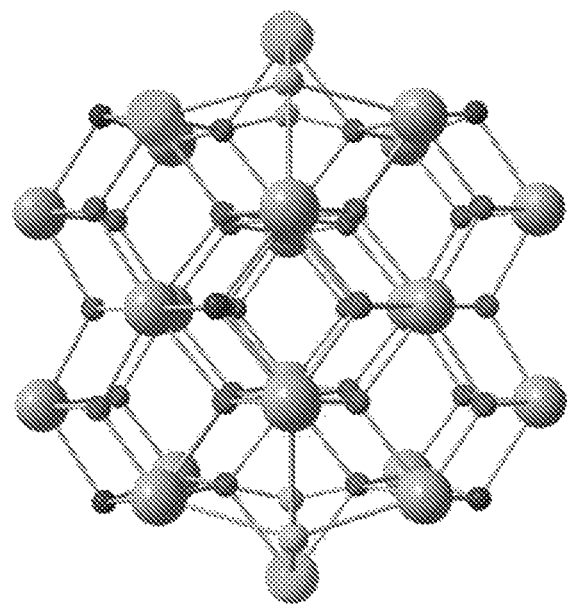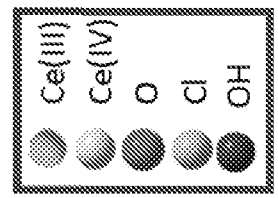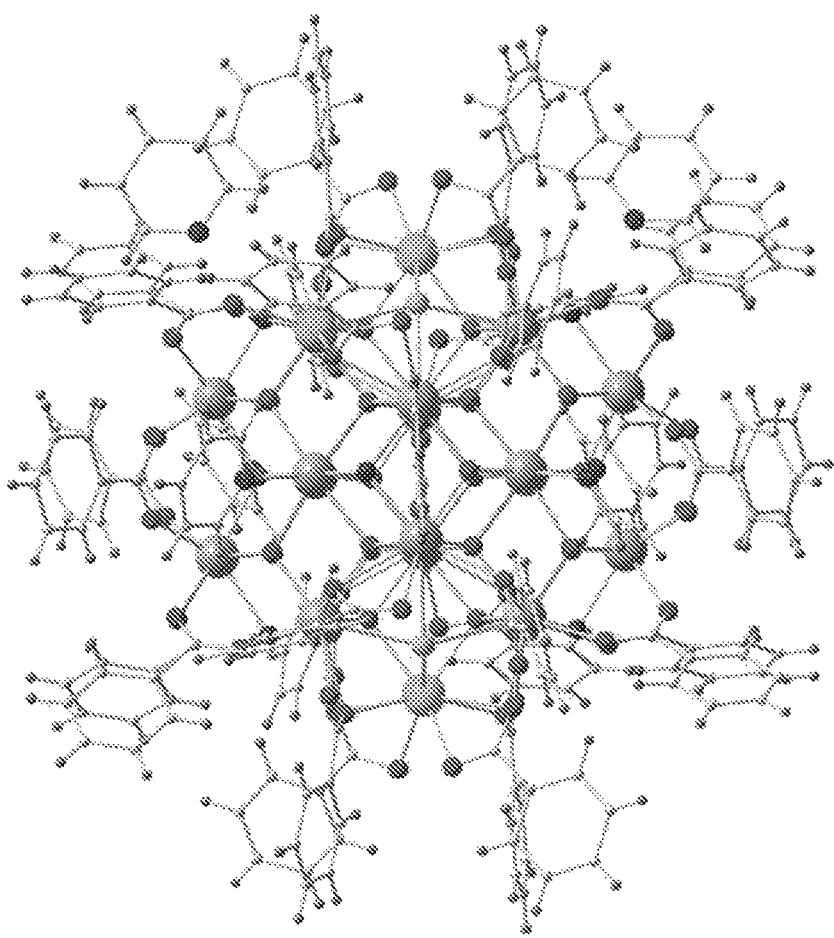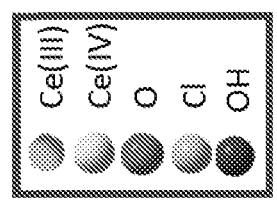
FIG. 23B
FIG. 23A

MOLECULAR CERIUM-OXIDE NANOCLUSTERS AND METHODS FOR SYNTHESIZING THE SAME

CROSS-REFERENCE TO RELATED APPLICATIONS

This application is the 35 U.S.C. § 371 national stage entry of International PCT Application entitled "COMPOSITIONS AND METHODS RELATING TO MOLECULAR CERIUM-OXIDE NANOCLUSTERS," having serial number PCT/US2019/030602, filed on May 3, 2019, where the PCT claims priority to U.S. provisional patent application entitled "COMPOSITIONS AND METHODS RELATING TO MOLECULAR CERIUM-OXIDE NANOCLUSTERS", having Ser. No. 62/666,394, filed on May 3, 2018, both of which are entirely incorporated herein by reference.

BACKGROUND

Cerium oxide (ceria, $CeO_2$) is of importance to many different areas, including industrial catalysis of organic and inorganic reactions, advanced materials, environmental remediation (of power station wastewater, stream and rivers, etc.), automobile exhaust scrubbing (deNOx, deSOx), polishing materials, and others. These diverse fields stem primarily from the $Ce^{3+}/Ce^{4+}$ redox couple capability and the relatively low cost of Ce. Unfortunately, many of these applications have to be carried out at high temperatures for significant activity, e.g. the catalysis applications.

In the last decade, study of ceria nanoparticles has seen explosive growth owing to the much greater activity they exhibit, and at lower temperatures, in comparison to the bulk material. This has also opened up various applications of ceria nanoparticles in biomedicine, spanning protection from reactive radicals to therapies for a variety of disorders. As the size of these nanoparticles decreases, the reactivity has been found to increase, but synthesizing a homogenous composition of small ceria nanoparticles without a significant size distribution and/or variation is nearly impossible and hampers detailed study of activity vs size. It has also been found that the $Ce^{3+}/Ce^{4+}$ ratio and morphology regarding facet makeup is very important to the reactivity, but determining the exact $Ce^{3+}/Ce^{4+}$ composition in nanoparticles is challenging, in addition to determining surface morphology. Accordingly, there is a need to address the aforementioned deficiencies and inadequacies.

SUMMARY

Described herein are methods of synthesizing molecular cerium-oxide nanocluster compositions and compositions thereof.

Described herein are methods of synthesizing a molecular cerium-oxide nanocluster composition, comprising: providing a first cerium source, an organic acid, and a solvent; and mixing the cerium source and the organic acid in a ratio of about 1:2 to about 1:4 in the presence of a solvent to create a reaction mixture at a temperature and a pressure for a period of time to create a composition of molecular cerium-oxide nanoclusters containing a plurality of molecular cerium-oxide nanoclusters.

The first cerium source can be a $Ce^{3+}$ salt. The first cerium source can be $CeCl_3$, $Ce(NO_3)_3$, $Ce(ClO_4)_3$, $CeF_3$, $Ce_2(SO_4)_3$, $CeBr_3$, or $CeI_3$, individually or in combination. The organic acid can be of the formula $X_1CO_2H$, $X_1Y_1PO_2H$, or $X_1PO_3H$. The organic acid can be $MeCO_2H$, $PhCO_2H$, $H_3CO_2H$, or $CH_3CH_2CO_2H$, individually or in combination.

$X_1$ and $Y_1$ can be selected from the group consisting of: an alkyl group, an aromatic group, substituted phenyls, a plurality of connected phenyls, linear or branched aliphatic, alicyclic groups, and a combination thereof.

The solvent can be MeCN.

Methods as described herein can further comprise adding a second cerium source to the reaction mixture, wherein the second cerium source is different than the first. The second cerium source can be $(NH_4)_2Ce(NO_3)_3$, $(NH_4)_2Ce(NO_3)_6$ or $(TBA)_2[Ce(NO_3)_6]$, individually or in combination. The ratio of the first cerium source to the second cerium source can be about 5:1.

Methods as described herein further comprise adding an anion source to the reaction mixture. The anion source can be HCl, HBr, HF, or $HNO_3$, individually or in combination.

Methods as described here further comprise adding pyridine to the reaction mixture.

Methods as described herein further comprise adding $NEt_4ClO_4$ to the reaction mixture. $NEt_4ClO_4$ can be added to the reaction mixture in an amount of about 0.1 mmol to about 1 mmol.

In an embodiment according to the present disclosure, the first cerium source is $CeCl_3$ and the crystalline molecular cerium-oxide nanocluster composition has a formula of $[Ce_{20}O_{18}Cl_{16}(O_2CPh)_{22}]^{4-}$.

In an embodiment according to the present disclosure, the first cerium source is $Ce(NO_3)_3$ and the molecular cerium-oxide nanocluster composition has a formula of $[Ce_{24}O_{27}(OH)_5Cl_4(O_2CPh)_{30}(py)_4]$.

In an embodiment according to the present disclosure, the first cerium source is $Ce(NO_3)_3$ and the molecular cerium-oxide nanocluster composition has a formula of $[Ce_{24}O_{27}(OH)_9Cl_4(O_2CPh)_{30}(py)_4]$.

In an embodiment according to the present disclosure, the first cerium source is $Ce(NO_3)_3$ and the molecular cerium-oxide nanocluster composition has a formula of $[Ce_{24}O_{23}(OH)_8Cl_4(O_2CPh)_{30}(py)_4]$.

In an embodiment according to the present disclosure, the first cerium source is $Ce(NO_3)_3$ and the molecular cerium-oxide nanocluster composition has a formula of $[Ce_{14}O_{14}(O_2CPh)_{22}(NO_3)_3(H_2O)]$.

In an embodiment according to the present disclosure, the first cerium source is $CeBr_3$ and the molecular cerium-oxide nanocluster composition has a formula of $[Ce_{14}O_{14}(O_2CPh)_{22}(NO_3)_3(H_2O)]$.

In an embodiment according to the present disclosure, the first cerium source is $Ce(ClO_4)_3$ and the molecular cerium-oxide nanocluster composition has a formula of $[Ce_{14}O_{14}(O_2CPh)_{22}(NO_3)_3(H_2O)]$.

In an embodiment according to the present disclosure, the first cerium source is $CeF_3$ and the molecular cerium-oxide nanocluster composition has a formula of $[Ce_6O_4(OH)_3F(O_2CPh)_{12}(py)_2]$.

In an embodiment according to the present disclosure, the first cerium source is $CeCl_3$ and the molecular cerium-oxide nanocluster composition has a formula of $[Ce_{38}O_{54}Cl_6(O_2CMe)_{36}(py)_8]$.

Also described herein are compositions. Compositions according to the present disclosure can be compositions produced by any of the methods according to the present disclosure. Compositions as described herein may be charged or neutral as one of skill in the art would understand.

Also described herein are products according to any of the methods according to the present disclosure.

BRIEF DESCRIPTION OF THE DRAWINGS

Many aspects of the disclosed devices and methods can be better understood with reference to the following drawings. The components in the drawings are not necessarily to scale, emphasis instead being placed upon clearly illustrating the relevant principles. Moreover, in the drawings, like reference numerals designate corresponding parts throughout the several views.

FIG. 2A demonstrates a cube arrangement of the fluorite structure.

FIG. 2B shows a portion of bulk $CeO_2$ structure and the fluorite structure within.

FIGS. 2C-2E illustrate 3 low index faces of ceria: (111) (FIG. 2C), (110) (FIG. 2D), and (100) (FIG. 2E).

FIGS. 4A-4F illustrate previous molecular cerium-oxide nanoclusters upon which this work improves.

FIG. 6A is a representative synthesis reaction for molecular cerium-oxide nanoclusters as previously described. FIGS. 6B-6D represent synthesis routes according to the present disclosure.

FIGS. 7A-7C show an embodiment of a molecular cerium-oxide nanocluster of cerium nuclearity 20 ($Ce_{20}$) according to the present structure. FIG. 7A depicts an embodiment of a reaction scheme according to the present disclosure. FIG. 7B is a ball and stick representation, showing the full structure, while FIG. 7C is a photograph of a $Ce_{20}$ crystal.

FIGS. 10A-10C show core-in-facet views of an embodiment of a molecular cerium-oxide nanocluster, $Ce_{20}$, from different angles according to the present disclosure.

FIGS. 11A-11D show an embodiment of a molecular cerium-oxide nanocluster with cerium nuclearity 14 ($Ce_{14}$) according to the present structure. FIG. 11A depicts an embodiment of a reaction scheme according to the present disclosure. FIG. 11B is a ball and stick representation of the molecular cerium-oxide nanocluster of nuclearity 14 ($Ce_{14}$), showing the full structure. FIG. 11C is a core-in-facet view while FIG. 11D is a photograph of $Ce_{14}$ crystals.

FIG. 12 is a root mean square (RMS) analysis of the $Ce_{14}$ and $Ce_{20}$ embodiments according to the present disclosure.

FIGS. 14A-14C show an embodiment of a molecular cerium-oxide nanocluster of cerium nuclearity 24 ($Ce_{24}$) according to the present structure. FIG. 14A depicts an embodiment of a reaction scheme according to the present disclosure. FIG. 14B is a ball and stick representation, showing the full structure, while FIG. 14C is a photograph of $Ce_{24}$ crystals.

FIGS. 20A-20D show RMS analysis of $Ce_{20}$ and $Ce_{24}$.

FIGS. 22A-22B depict the facets of the $Ce_{20}$. The benzoate ligands have been omitted for clarity. Facets are colour coded: (100) facets are blue, (111) facets are green. On the (100) facets there are $\mu_4$-Cl⁻ ions and at the (111)(100) facet intersection there are $\mu_2$-Cl⁻ ions. Colour code: $Ce^{IV}$ gold, $Ce^{III}$ sky blue, O red, Cl green.

FIGS. 23A-23B illustrate the structure of the $Ce_{24b}Cl$ with (FIG. 23A) and without (FIG. 23B) the benzoate ligands Color code: $Ce^{IV}$ gold, $Ce^{III}$ sky blue, O red, Cl green, N blue, OH purple, C light grey, H dark grey.

DETAILED DESCRIPTION

Figures 1A, 1B:
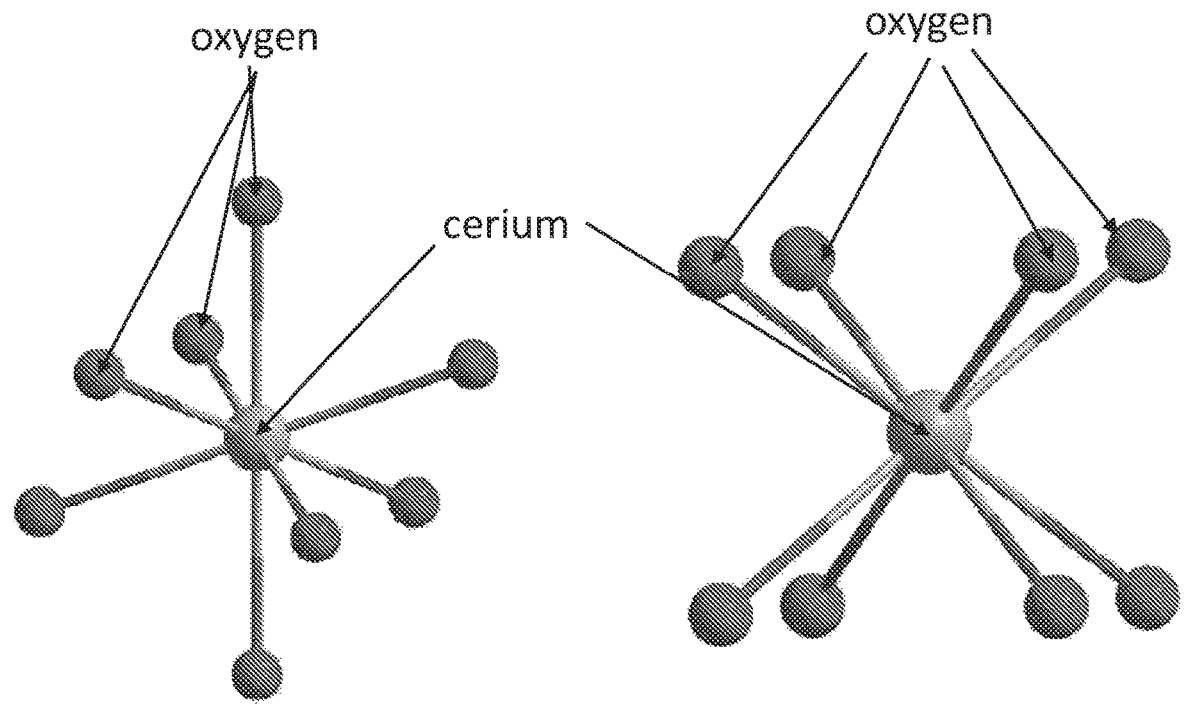
FIGS. 1A-1D depicts illustrations of various aspects of the "fluorite structure" with atoms of cerium (Ce) and oxygen (O).

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of organic and inorganic chemistry which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Definitions

Unless otherwise defined, all technical and scientific terms used herein have the same meaning as commonly understood by one of ordinary skill in the art of molecular biology, medicinal chemistry, and/or organic chemistry. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

The term "substituted" refers to any one or more hydrogen atoms on the designated atom (e.g., a carbon atom) that can be replaced with a selection from the indicated group (e.g., halide, hydroxyl, alkyl, and the like), provided that the designated atom's normal valence is not exceeded.

As used herein, an "analog", or "analogue" of a chemical compound is a compound that, by way of example, resembles another in structure but is not necessarily an isomer (e.g., 5-fluorouracil is an analog of thymine).

As used herein, a "derivative" of a compound refers to a chemical compound that may be produced from another compound of similar structure in one or more steps, as in replacement of H by an alkyl, acyl, or amino group.

As used herein, "aliphatic" or "aliphatic group" refers to a saturated or unsaturated, linear or branched, cyclic (non-aromatic) or heterocyclic (non-aromatic), hydrocarbon or hydrocarbon group and encompasses alkyl, alkenyl, and alkynyl groups, and alkanes, alkene, alicyclic groups, and alkynes, for example.

As used herein, "alkane" refers to a saturated aliphatic hydrocarbon which can be straight or branched, having 1 to 40, 1 to 20, 1 to 10, or 1 to 5 carbon atoms, where the stated range of carbon atoms includes each intervening integer individually, as well as sub-ranges. Examples of alkane include, but are not limited to methane, ethane, propane, butane, pentane, and the like. Reference to "alkane" includes unsubstituted and substituted forms of the hydrocarbon.

As used herein, "alkyl" or "alkyl group" refers to a saturated aliphatic hydrocarbon radical which can be straight or branched, having 1 to 40, 1 to 20, 1 to 10, or 1 to 5 carbon atoms, where the stated range of carbon atoms includes each intervening integer individually, as well as sub-ranges. Examples of alkanes include, but are not limited to methyl, ethyl, n-propyl, i-propyl, n-butyl, s-butyl, t-butyl, n-pentyl, and s-pentyl. Reference to "alkyl" or "alkyl group" includes unsubstituted and substituted forms of the hydrocarbon group.

As used herein, "alkene" refers to an aliphatic hydrocarbon which can be straight or branched, containing at least one carbon-carbon double bond, having 2 to 40, 2 to 20, 2 to 10, or 2 to 5 carbon atoms, where the stated range of carbon atoms includes each intervening integer individually, as well as sub-ranges. Examples of alkene groups include, but are not limited to, ethene, propene, and the like. Reference to "alkene" includes unsubstituted and substituted forms of the hydrocarbon.

As used herein, "alkenyl" or "alkenyl group" refers to an aliphatic hydrocarbon radical which can be straight or branched, containing at least one carbon-carbon double bond, having 2 to 40, 2 to 20, 2 to 10, or 2 to 5 carbon atoms, where the stated range of carbon atoms includes each intervening integer individually, as well as sub-ranges. Examples of alkenyl groups include, but are not limited to, ethenyl, propenyl, n-butenyl, i-butenyl, 3-methylbut-2-enyl, n-pentenyl, heptenyl, octenyl, decenyl, and the like. Reference to "alkyl" or "alkyl group" includes unsubstituted and substituted forms of the hydrocarbon group.

As used herein, "alkyne" refers to straight or branched chain hydrocarbon groups having 2 to 40, 2 to 20, 2 to 10, or 2 to 5 carbon atoms and at least one triple carbon to carbon bond. Reference to "alkyne" includes unsubstituted and substituted forms of the hydrocarbon.

As used herein, "alkynyl" or "alkynyl group" refers to straight or branched chain hydrocarbon groups having 2 to 40, 2 to 20, 2 to 10, or 2 to 5 carbon atoms and at least one triple carbon to carbon bond, such as ethynyl. Reference to "alkynyl" or "alkynyl group" includes unsubstituted and substituted forms of the hydrocarbon group.

As used herein, "aromatic" or "aromatic group" refers to a monocyclic or multicyclic ring system of 6 to 20 or 6 to 10 carbon atoms having alternating double and single bonds between carbon atoms. Exemplary aromatic groups include benzene, naphthalene, and the like. Reference to "aromatic" includes unsubstituted and substituted forms of the hydrocarbon.

As used herein, "aryl" or "aryl group" refers to an aromatic monocyclic or multicyclic ring system of 6 to 20 or 6 to 10 carbon atoms. The aryl is optionally substituted with one or more $C_1$-$C_{20}$ alkyl, alkylene, alkoxy, or haloalkyl groups. Exemplary aryl groups include phenyl or naphthyl, or substituted phenyl or substituted naphthyl. Reference to "aryl" or "aryl group" includes unsubstituted and substituted forms of the hydrocarbon group.

The term "arylalkyl" refers to an arylalkyl group wherein the aryl and alkyl are as herein described. Examples of arylalkyl include, but are not limited to, -phenylmethyl, phenylethyl, -phenylpropyl, -phenylbutyl, and -phenylpentyl.

The term "substituted," as in "substituted alkyl", "substituted aryl," "substituted heteroaryl" and the like, means that the substituted group may contain in place of one or more hydrogens a group such as alkyl, hydroxy, amino, halo, trifluoromethyl, cyano, alkoxy, alkylthio, or carboxy. A carboxy group or carboxylate can have the formula $RCO_2$— where R=various.

As used herein, "halo", "halogen", "halide", or "halogen radical" refers to a fluorine, chlorine, bromine, iodine, and astatine, and radicals thereof. Further, when used in compound words, such as "haloalkyl" or "haloalkenyl", "halo" refers to an alkyl or alkenyl radical in which one or more hydrogens are substituted by halogen radicals. Examples of haloalkyl include, but are not limited to, trifluoromethyl, trichloromethyl, pentafluoroethyl, and pentachloroethyl.

As used herein, "cyclic" hydrocarbon refers to any stable 4, 5, 6, 7, 8, 9, 10, 11, or 12 membered, (unless the number of members is otherwise recited), monocyclic, bicyclic, or tricyclic cyclic ring.

As used herein, "heterocycle" refers to any stable 4, 5, 6, 7, 8, 9, 10, 11, or 12 membered, (unless the number of members is otherwise recited), monocyclic, bicyclic, or tricyclic heterocyclic ring that is saturated or partially unsaturated, and which includes carbon atoms and 1, 2, 3, or 4 heteroatoms independently selected from the group consisting of N, O, and S. If the heterocycle is defined by the number of carbons atoms, then from 1, 2, 3, or 4 of the listed carbon atoms are replaced by a heteroatom. If the heterocycle is bicyclic or tricyclic, then at least one of the two or three rings must contain a heteroatom, though both or all three may each contain one or more heteroatoms. The N group may be N, NH, or N-substituent, depending on the chosen ring and if substituents are recited. The nitrogen and sulfur heteroatoms optionally may be oxidized (e.g., S, S(O), S(O)$_2$, and N—O). The heterocycle may be attached to its pendant group at any heteroatom or carbon atom that results in a stable structure. The heterocycles described herein may be substituted on carbon or on a heteroatom if the resulting compound is stable.

"Heteroaryl" refers to any stable 5, 6, 7, 8, 9, 10, 11, or 12 membered, (unless the number of members is otherwise recited), monocyclic, bicyclic, or tricyclic heterocyclic ring that is aromatic, and which consists of carbon atoms and 1, 2, 3, or 4 heteroatoms independently selected from the group consisting of N, O, and S. If the heteroaryl is defined by the number of carbons atoms, then 1, 2, 3, or 4 of the listed carbon atoms are replaced by a heteroatom. If the heteroaryl group is bicyclic or tricyclic, then at least one of the two or three rings must contain a heteroatom, though both or all three may each contain one or more heteroatoms. If the heteroaryl group is bicyclic or tricyclic, then only one of the rings must be aromatic. The N group may be N, NH, or N-substituent, depending on the chosen ring and if substituents are recited. The nitrogen and sulfur heteroatoms may optionally be oxidized (e.g., S, S(O), S(O)$_2$, and N—O). The heteroaryl ring may be attached to its pendant group at any heteroatom or carbon atom that results in a stable structure. The heteroaryl rings described herein may be substituted on carbon or on a nitrogen atom if the resulting compound is stable.

The term "heteroatom" means for example oxygen, sulfur, nitrogen, phosphorus, or silicon (including, any oxidized form of nitrogen, sulfur, phosphorus, or silicon; the quaternized form of any basic nitrogen or; a substitutable nitrogen of a heterocyclic ring).

The term "bicyclic" represents either an unsaturated or saturated stable 7- to 12-membered bridged or fused bicyclic carbon ring. The bicyclic ring may be attached at any carbon atom which affords a stable structure. The term includes, but is not limited to, naphthyl, dicyclohexyl, dicyclohexenyl, and the like.

As used herein, the term "purified" and like terms (such as "isolated") relate to an enrichment of a molecule or compound relative to other components normally associated with the molecule or compound in a native environment. The term "purified" does not necessarily indicate that complete purity of the particular molecule has been achieved during the process. A "highly purified" compound as used herein refers to a compound that is greater than 90% pure.

As used herein, the term "nuclearity" relates to the number of central metal atoms in a coordination compound (or nanocluster as used herein).

As used herein, the term "cerium source" denotes any composition containing cerium in the +3 and/or +4 oxidation state, and can be a salt with a counter ion such as nitrate, halide, or similar. In certain embodiments, "cerium source" denotes more narrowly a cerium salt containing cerium in the +3 oxidation state with a counter anion such as a halide, nitrate, or similar.

As used herein, "crystallization agent" can refer to any composition which can aid in the formation of crystals of a given composition.

As used herein, a "nitrate group" is a chemical group containing $NO_3$.

As used herein, a "neutral organic molecule" can be a molecule or moiety having zero net electrical charge, optionally having both cationic and anionic groups.

The term "alkoxy" represents an alkyl group as defined above with the indicated number of carbon atoms attached through an oxygen bridge. Examples of alkoxy include, but are not limited to, methoxy, ethoxy, n-propoxy, i-propoxy, n-butoxy, s-butoxy, t-butoxy, n-pentoxy, and s-pentoxy. The term "lower alkoxy" means an alkoxy group having less than 10 carbon atoms.

The term "carbocycles" refers to a monocyclic or multicyclic ring system of about 3 to about 14 carbon atoms, preferably of about 6 to about 10 carbon atoms. In an embodiment, carbocycle can refer to an aryl group. Exemplary carbocycles can refer to functional groups.

The term "cycloalkyl" refers to a non-aromatic mono- or multicyclic ring system of about 3 to about 10 carbon atoms, preferably of about 5 to about 10 carbon atoms. Preferred ring sizes of rings of the ring system include about 5 to about 6 ring atoms. Exemplary monocyclic cycloalkyl include cyclopentyl, cyclohexyl, cycloheptyl, and the like. Exemplary multicyclic cycloalkyl include 1-decalin, norbornyl, adamant-(1-or 2-)yl, and the like. Reference to a cycloalkyl group includes substituted and unsubstituted cycloalkyl groups.

The term "cycloalkenyl" refers to a non-aromatic mono- or multicyclic ring system of about 3 to about 10 carbon atoms, preferably of about 5 to about 10 carbon atoms, and which contains at least one carbon-carbon double bond. Preferred ring sizes of rings of the ring system include about 5 to about 6 ring atoms. Exemplary monocyclic cycloalkenyl include cyclopentenyl, cyclohexenyl, cycloheptenyl, and the like. An exemplary multicyclic cycloalkenyl is norbornylenyl. Reference to a cycloalkyl group includes substituted and unsubstituted cycloalkyl groups. Reference to a cycloalkenyl group includes substituted and unsubstituted cycloalkenyl groups.

"Aralkyl" and "heteroaralkyl" refer to aryl and heteroaryl moieties, respectively, that are linked to a main structure by an intervening alkyl group, e.g., containing one or more methylene groups.

The term "fluorobenzyl" refers to a benzyl group wherein the phenyl moiety is substituted with one or more fluorine atoms, including 2, 3, 4 and 5 fluorine atom substituents.

Similarly, "halobenzyl" refers to benzyl substituted with one or more different halogens, including fluorine, chlorine, bromine, and iodine (not astatine).

The terms "sulfide" and "thioether" as used herein, alone or in combination, refer to a sulfur atom covalently linked to two atoms, the formal oxidation state of said sulfur is (II). These terms may be used interchangeably.

The term "sulfanyl" as used herein, alone or in combination, refers to the —S—R group, wherein R may be a group such as: alkyl, alkenyl, alkynyl, aryl, alicyclic, heterocyclic, aryl, heteroaryl, arylalkyl and heteroarylalkyl, wherein the alkyl, alkenyl, alkynyl, aryl, alicyclic, heterocyclic, aryl, heteroaryl, arylalkyl and heteroarylalkyl groups may be optionally substituted. Non-limiting examples of sulfanyl groups include methylsulfanyl (—$SCH_3$) and iso-propylsulfanyl (—$SCH(CH_3)_2$) and the like.

The term "surface morphology" or "morphology" as described herein relates to the surface makeup of molecular cerium-oxide nanoclusters in terms of facets, more specifically (100), (110), and (111) facets and their composition and arrangement (% surface coverage) within the cerium oxide nanoclusters.

The term "unit dosage form," as used herein, refers to physically discrete units suitable as unitary dosages for human and/or animal subjects, each unit containing a predetermined quantity of a compound (e.g., compositions or pharmaceutical compositions, as described herein) calculated in an amount sufficient to produce the desired effect in association with a pharmaceutically acceptable diluent, carrier or vehicle. The specifications for unit dosage forms depend on the particular compound employed, the route and frequency of administration, and the effect to be achieved, and the pharmacodynamics associated with each compound in the subject.

A "pharmaceutically acceptable excipient," "pharmaceutically acceptable diluent," "pharmaceutically acceptable carrier," or "pharmaceutically acceptable adjuvant" means an excipient, diluent, carrier, and/or adjuvant that are useful in preparing a pharmaceutical composition that are generally safe, non-toxic and neither biologically nor otherwise undesirable, and include an excipient, diluent, carrier, and adjuvant that are acceptable for veterinary use and/or human pharmaceutical use. "A pharmaceutically acceptable excipient, diluent, carrier and/or adjuvant" as used in the specification and claims includes one and more such excipients, diluents, carriers, and adjuvants.

As used herein, a "pharmaceutical composition" is meant to encompass a composition or pharmaceutical composition suitable for administration to a subject, such as a mammal, especially a human. In general a "pharmaceutical composition" is sterile, and preferably free of contaminants that are capable of eliciting an undesirable response within the subject (e.g., the compound(s) in the pharmaceutical composition is pharmaceutical grade). Pharmaceutical compositions can be designed for administration to subjects or patients in need thereof via a number of different routes of administration including oral, intravenous, buccal, rectal, parenteral, intraperitoneal, intradermal, intracheal, intramuscular, subcutaneous, inhalational and the like.

The term "therapeutically effective amount" as used herein refers to that amount of an embodiment of the composition or pharmaceutical composition being administered that will relieve to some extent one or more of the symptoms of the disease, i.e., infection, being treated, and/or that amount that will prevent, to some extent, one or more of the symptoms of the disease, i.e., infection, that the subject being treated has or is at risk of developing.

"Pharmaceutically acceptable salt" refers to those salts that retain the biological effectiveness and optionally other properties of the free bases and that are obtained by reaction with inorganic or organic acids such as hydrochloric acid, hydrobromic acid, sulfuric acid, nitric acid, phosphoric acid, methanesulfonic acid, ethanesulfonic acid, p-toluenesulfonic acid, salicylic acid, malic acid, maleic acid, succinic acid, tartaric acid, citric acid, and the like.

In the event that embodiments of the disclosed compounds in the composition or pharmaceutical composition form salts, these salts are within the scope of the present disclosure. Reference to a compound used in the composition or pharmaceutical composition of any of the formulas herein is understood to include reference to salts thereof, unless otherwise indicated. The term "salt(s)", as employed herein, denotes acidic and/or basic salts formed with inorganic and/or organic acids and bases. In addition, when a compound contains both a basic moiety and an acidic moiety, zwitterions ("inner salts") may be formed and are included within the term "salt(s)" as used herein. Pharmaceutically acceptable (e.g., non-toxic, physiologically acceptable) salts are preferred, although other salts are also useful, e.g., in isolation or purification steps which may be employed during preparation. Salts of the compounds of a compound may be formed, for example, by reacting the compound with an amount of acid or base, such as an equivalent amount, in a medium such as one in which the salt precipitates or in an aqueous medium followed by lyophilization.

Embodiments of the compounds of the composition or pharmaceutical composition of the present disclosure that contain a basic moiety may form salts with a variety of organic and inorganic acids. Exemplary acid addition salts include acetates (such as those formed with acetic acid or trihaloacetic acid, for example, trifluoroacetic acid), adipates, alginates, ascorbates, aspartates, benzoates, benzenesulfonates, bisulfates, borates, butyrates, citrates, camphorates, camphorsulfonates, cyclopentanepropionates, digluconates, dodecylsulfates, ethanesulfonates, fumarates, glucoheptanoates, glycerophosphates, hemisulfates, heptanoates, hexanoates, hydrochlorides (formed with hydrochloric acid), hydrobromides (formed with hydrogen bromide), hydroiodides, 2-hydroxyethanesulfonates, lactates, maleates (formed with maleic acid), methanesulfonates (formed with methanesulfonic acid), 2-naphthalenesulfonates, nicotinates, nitrates, oxalates, pectinates, persulfates, 3-phenylpropionates, phosphates, picrates, pivalates, propionates, salicylates, succinates, sulfates (such as those formed with sulfuric acid), sulfonates (such as those mentioned herein), tartrates, thiocyanates, toluenesulfonates such as tosylates, undecanoates, and the like.

Embodiments of the compounds of the composition or pharmaceutical composition of the present disclosure that contain an acidic moiety may form salts with a variety of organic and inorganic bases. Exemplary basic salts include ammonium salts, alkali metal salts such as sodium, lithium, and potassium salts, alkaline earth metal salts such as calcium and magnesium salts, salts with organic bases (for example, organic amines) such as benzathines, dicyclohexylamines, hydrabamines (formed with N,N-bis(dehydroabietyl)ethylenediamine), N-methyl-D-glucamines, N-methyl-D-glucamides, t-butyl amines, and salts with amino acids such as arginine, lysine, and the like.

Basic nitrogen-containing groups may be quaternized with agents such as lower alkyl halides (e.g., methyl, ethyl, propyl, and butyl chlorides, bromides and iodides), dialkyl sulfates (e.g., dimethyl, diethyl, dibutyl, and diamyl sulfates), long chain halides (e.g., decyl, lauryl, myristyl and stearyl chlorides, bromides and iodides), aralkyl halides (e.g., benzyl and phenethyl bromides), and others.

Solvates of the compounds of the composition or pharmaceutical composition of the present disclosure are also contemplated herein.

To the extent that the disclosed the compounds of the composition or pharmaceutical composition of the present disclosure, and salts thereof, may exist in their tautomeric form, all such tautomeric forms are contemplated herein as part of the present disclosure.

All stereoisomers of the compounds of the composition or pharmaceutical composition of the present disclosure, such as those that may exist due to asymmetric carbons on the various substituents, including enantiomeric forms (which may exist even in the absence of asymmetric carbons) and diastereomeric forms are contemplated within the scope of this disclosure. Individual stereoisomers of the compounds of the disclosure may, for example, be substantially free of other isomers, or may be admixed, for example, as racemates or with all other, or other selected, stereoisomers. The stereogenic centers of the compounds of the present disclosure can have the S or R configuration as defined by the IUPAC 1974 Recommendations.

The term "prodrug" refers to an inactive precursor of the compounds of the composition or pharmaceutical composition of the present disclosure that is converted into a biologically active form in vivo. Prodrugs are often useful because, in some situations, they may be easier to administer than the parent compound. They may, for instance, be bioavailable by oral administration whereas the parent compound is not. The prodrug may also have improved solubility in pharmaceutical compositions over the parent drug. A prodrug may be converted into the parent drug by various mechanisms, including enzymatic processes and metabolic hydrolysis. Harper, N.J. (1962). Drug Latentiation in Jucker, ed. Progress in Drug Research, 4:221-294; Morozowich et al. (1977). Application of Physical Organic Principles to Prodrug Design in E. B. Roche ed. Design of Biopharmaceutical Properties through Prodrugs and Analogs, APhA; Acad. Pharm. Sci.; E. B. Roche, ed. (1977). Bioreversible Carriers in Drug in Drug Design, Theory and Application, APhA; H. Bundgaard, ed. (1985) Design of Prodrugs, Elsevier; Wang et al. (1999) Prodrug approaches to the improved delivery of peptide drug, Curr. Pharm. Design. 5(4):265-287; Pauletti et al. (1997). Improvement in peptide bioavailability: Peptidomimetics and Prodrug Strategies, Adv. Drug. Delivery Rev. 27:235-256; Mizen et al. (1998). The Use of Esters as Prodrugs for Oral Delivery of β-Lactam antibiotics, Pharm. Biotech. 11:345-365; Gaignault et al. (1996). Designing Prodrugs and Bioprecursors I. Carrier Prodrugs, Pract. Med. Chem. 671-696; M. Asgharnejad (2000). Improving Oral Drug Transport Via Prodrugs, in G. L. Amidon, P. I. Lee and E. M. Topp, Eds., Transport Processes in Pharmaceutical Systems, Marcell Dekker, p. 185-218; Balant et al. (1990) Prodrugs for the improvement of drug absorption via different routes of administration, Eur. J. Drug Metab. Pharmacokinet., 15(2): 143-53; Balimane and Sinko (1999). Involvement of multiple transporters in the oral absorption of nucleoside analogues, Adv. Drug Delivery Rev., 39(1-3):183-209; Browne (1997). Fosphenytoin (Cerebyx), Clin. Neuropharmacol. 20(1): 1-12; Bundgaard (1979). Bioreversible derivatization of drugs—principle and applicability to improve the therapeutic effects of drugs, Arch. Pharm. Chemi. 86(1): 1-39; H. Bundgaard, ed. (1985) Design of Prodrugs, New York: Elsevier; Fleisher et al. (1996). Improved oral drug delivery: solubility limitations overcome by the use of prodrugs, Adv. Drug Delivery Rev. 19(2): 115-130; Fleisher et al. (1985). Design of prodrugs for improved gastrointestinal absorption by intestinal enzyme targeting, Methods Enzymol. 112: 360-81; Farquhar D, et al. (1983). Biologically Reversible Phosphate-Protective Groups, J. Pharm. Sci., 72(3): 324-325; Han, H. K. et al. (2000). Targeted prodrug design to optimize drug delivery, AAPS PharmSci., 2(1): E6; Sadzuka Y. (2000). Effective prodrug liposome and conversion to active metabolite, Curr. Drug Metab., 1(1):31-48; D. M. Lambert (2000) Rationale and applications of lipids as prodrug carriers, Eur. J. Pharm. Sci., 11 Suppl 2:S15-27; Wang, W. et al. (1999) Prodrug approaches to the improved delivery of peptide drugs. Curr. Pharm. Des., 5(4):265-87.

The term "administration" refers to introducing a composition of the present disclosure into a subject. One preferred route of administration of the composition is oral administration. Another preferred route is intravenous administration. However, any route of administration, such as topical, subcutaneous, peritoneal, intraarterial, inhalation, vaginal, rectal, nasal, introduction into the cerebrospinal fluid, or instillation into body compartments can be used.

As used herein, "treat", "treatment", "treating", and the like refer to acting upon a condition (e.g., an infection), a disease or a disorder with a composition to affect the condition, disease or disorder by improving or altering it. The improvement or alteration may include an improvement in symptoms or an alteration in the physiologic pathways associated with the condition, disease, or disorder. "Treatment," as used herein, covers one or more treatments of an infection, a condition or a disease in a subject (e.g., a mammal, typically a human or non-human animal of veterinary interest), and includes: (a) reducing the risk of occurrence of the infection, condition, or a disease in a subject determined to be predisposed to the condition or disease but not yet diagnosed with it (b) impeding the development of the infection, and/or (c) relieving the infection, e.g., causing regression of the infection and/or relieving one or more infection symptoms.

As used herein, the terms "prophylactically treat" or "prophylactically treating" refers completely or partially preventing (e.g., about 50% or more, about 60% or more, about 70% or more, about 80% or more, about 90% or more, about 95% or more, or about 99% or more) a condition (e.g., infection), a disease, or a symptom thereof and/or may be therapeutic in terms of a partial or complete cure for an infection, and/or adverse effect attributable to the infection.

As used herein, the term "subject," or "patient," includes humans, mammals (e.g., mice, rats, pigs, cats, dogs, and horses), and birds. Typical subjects to which compounds of the present disclosure may be administered will be mammals, particularly primates, especially humans. For veterinary applications, a wide variety of subjects will be suitable, e.g., livestock such as cattle, sheep, goats, cows, swine, and the like; poultry such as chickens, ducks, geese, turkeys, and the like; and domesticated animals particularly pets such as dogs and cats. For diagnostic or research applications, a wide variety of mammals will be suitable subjects, including rodents (e.g., mice, rats, hamsters), rabbits, primates, and swine such as inbred pigs and the like. The term "living subject" refers to a subject noted above or another organism that is alive. The term "living subject" refers to the entire subject or organism and not just a part excised (e.g., a liver or other organ) from the living subject.

Discussion

Embodiments of the present disclosure provide for compositions and methods relating to molecular nanoclusters, in addition methods for tuning surface morphology relating to molecular nanoclusters. Discussed herein are embodiments of compositions of molecular nanoclusters in addition to embodiments of methods for the synthesis of such compounds. Also disclosed herein are compositions that are products of methods as described herein. In certain aspects, methods as disclosed herein offer improved product yields compared to those previously disclosed.

Figures 1C, 1D:
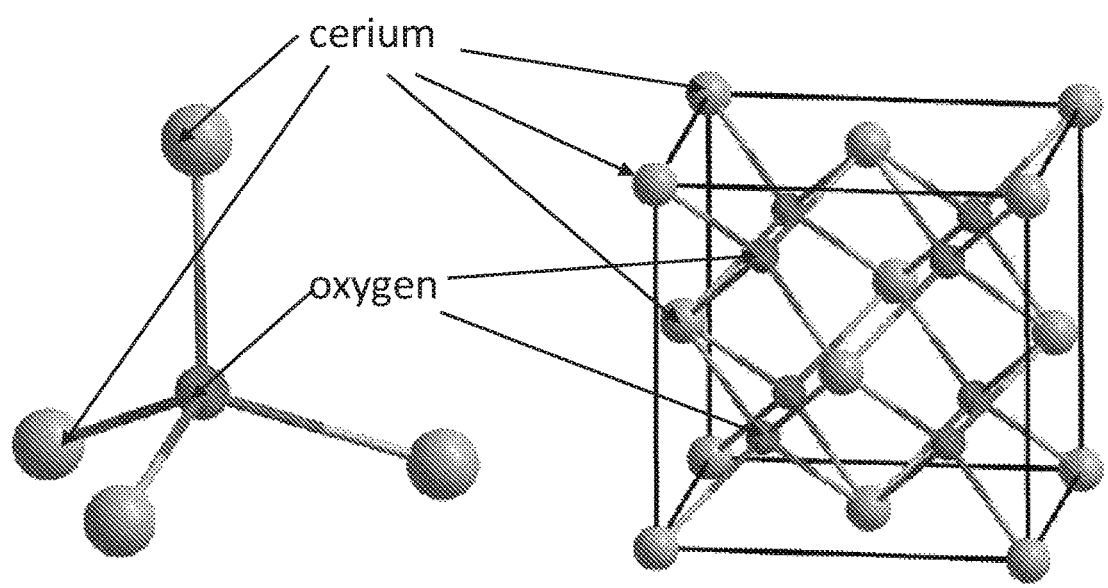
Figure 3A:
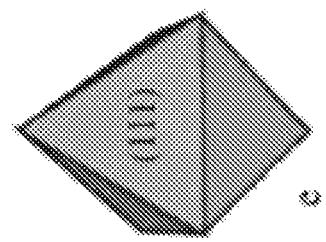
FIGS. 3A-3E illustrates conceptually how the presence of difference facets can lead to the formation of different morphologies.
Figure 3B:
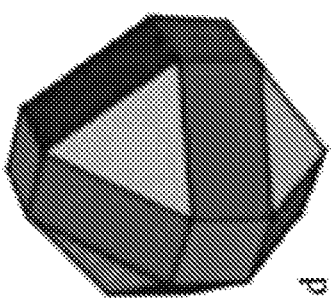
Figure 3C:
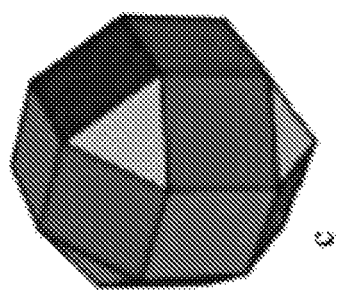
Figure 3D:
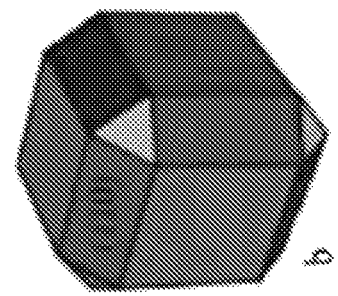
Figure 3E:
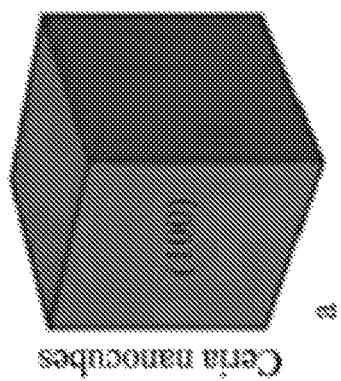

Cerium is the most abundant of the rare earth elements (more abundant than Pb and Sn). It is stable in both $Ce^{3+}$ and $Ce^{4+}$ oxidation states, and is most commonly employed in its bulk form: $CeO_2$. $CeO_2$ displays the solid-state structure known as the Fluorite structure, wherein each Ce ion is coordinated to 8 O atoms (FIGS. 1A-1B) in a perfect cube (FIG. 1D) and each O is coordinated to 4 Ce atoms in a tetrahedral arrangement (FIG. 1C). Cerium oxide (ceria, $CeO_2$) is of importance to many different areas, including industrial catalysis of organic and inorganic reactions, advanced materials, environmental remediation (e.g., of power station wastewater, stream and rivers, etc.), automobile exhaust scrubbing (deNOx, deSOx), polishing materials, and others. These diverse fields stem primarily from the $Ce^{3+}/Ce^{4+}$ redox couple capability (ability to easily switch between the trivalent $^{3+}$ and tetravalent 4+ oxidation states) and the relatively low cost of Ce. Unfortunately, many of these applications have to be carried out at high temperatures for significant activity, e.g., the catalysis applications.

In the last decade, study of ceria nanoparticles has seen explosive growth owing to the much greater activity they exhibit, and at lower temperatures, in comparison to the bulk material. This has also opened up various applications of ceria nanoparticles in biomedicine, including protection from reactive radicals to therapies for a variety of disorders. As the size of these nanoparticles decreases, the reactivity has been found to increase, but synthesizing a homogenous composition of small ceria nanoparticles (CNP) without a significant size distribution and/or variation is nearly impossible and hampers detailed study of activity vs size. It has also been found that the $Ce^{3+}/Ce^{4+}$ ratio is a parameter related to the reactivity, but determining the exact $Ce^{3+}/Ce^{4+}$ composition in nanoparticles is challenging. Additionally, bulk $CeO_2$ is difficult to reduce and therefore has a low $Ce^{3+}$ concentration, whereas ceria nanoparticles have an increase in $Ce^{3+}$ concentration with decreasing particle size.

Existing cerium-oxide products are all currently based on the nanoparticle form or bulk form of this material. Molecular cerium-oxide clusters represent a new molecular approach to obtaining ultra-small cerium-oxide nanoparticles, which are difficult to achieve using traditional nanoparticle synthesis methods. As mentioned above, the size of nanoparticles has been shown to have dramatic effects on the activity, with the smaller nanoparticles usually showing the highest activity. However, it is very difficult to establish these size-to-activity relationships with nanoparticles since they always possess some size distribution and it cannot be ensured that all nanoparticles are identical with respect to surface features. The concentration of $Ce^{3+}$ is also extremely difficult to determine with accuracy in nanoparticles.

Molecular cerium-oxide clusters would provide an important alternative route to ultra-small ceria nanoparticles of finite dimensions. Such clusters could bring along all of the advantages of molecular chemistry, such as solubility, crystallinity, and monodispersity (single-size), allowing (i) the exact size, shape, surface ligation, surface protonation level, and $Ce^{3+}/Ce^{4+}$ ratio to be determined by X-ray crystallography and spectroscopic techniques, and (ii) the reactivity to be investigated as a function of size, $Ce^{3+}/Ce^{4+}$ ratio, etc., in a more controlled manner than the nanoparticles. This could be a major advantage in understanding of the mechanism by which nano-ceria can function as effective catalysts in biomedical, industrial, and environmental applications, and provide a means to optimize their activity and efficiency in applications. This novel molecular approach to cerium-oxide chemistry is an area with immense room for exploration.

As described herein, metal oxide nanoparticles provide exciting prospects for various applications as they exhibit much greater catalytic activities than their bulk counterparts. Of tremendous importance are cerium dioxide nanoparticles (CNPs) owing to their widespread use as catalysts in many industrial and medical processes.

Their activity is found to vary according to the surface facets present. It has been determined, both theoretically and verified empirically, that the activity of the facets increases in the order (111)<(110)<(100), making synthesis of CNPs with many (100) facets highly desirable. The standard 'top-down' synthetic approach provides CNPs with mixtures of sizes and shapes, making it extremely difficult to obtain structural information to atomic resolution, especially of the exact identity of the high-activity (100) facets. Recently work has shed light into the mysteries of CNPs using a bottom-up synthetic procedure to synthesize molecular analogues of CNPs, so-called 'Ce/O nanoclusters'. Synthesis of these molecular clusters enables structural characterization to atomic resolution using X-ray crystallography, allowing identification of $Ce^{3+}$ ions and location of $H^+$ binding sites. In the Ce/O nanoclusters that have synthesized to date, the most thermodynamically stable facets have all been observed, (111), (110) and (100). In certain embodiments, in CNP synthesis, the use of $Cl^-$ or $NO_3^-$ ions has been reported to control the growth of selected facets by altering of surface free energy by adsorption. This use of these ions has therefore been explored in the synthesis of our Ce/O nanoclusters to compare the effects of $Cl^-$ and $NO_3^-$ ions on facet formation. One important result of this work is that $Cl^-$ ions produce an unprecedented amount of surface $Ce^{3+}$ ions in the resulting Ce/O nanocluster.

Building upon previous work with molecular cerium-oxide nanoclusters, it has been found and described herein that at least careful selection of reagents and the addition of anions to a molecular cerium-oxide reaction mixture can favor the growth of specific facets of the resultant molecular cerium-oxide nanoclusters. New reaction schemes can be undertaken which can selectively tune the surface morphology, and therefore reactivity, of molecular cerium-oxide nanoparticles. As molecular cerium-oxide nanoclusters have a wide range of uses, it can be possible to generate a specific molecular cerium-oxide nanocluster with a specific reactivity for a specific purpose by controlling the facets on the surface[s].

Without intending to be limiting, in embodiments, strategies to tune surface morphology of molecular cerium-oxide nanoclusters can involve employing $Ce^{3+}$ salts as a starting reagent with a counter anion such as $Cl^-$ or $NO_3^-$. Additional counter anion can be added to the reaction mix as well.

Synthetic methods as described herein have been developed for the synthesis of molecular $Ce/O/RCO_2$-clusters of various nuclearities (e.g., $Ce_{19}$, $Ce_{24}$, $Ce_{38}$, and $Ce_{40}$) using simple carboxylates ($RCO_2-$; R=various). These clusters can have a Ce/O core surrounded by the carboxylates on the outside. Embodiments of the clusters are molecular versions of $CeO_2$ as they can have the same arrangement of Ce and O atoms as in bulk $CeO_2$ (the so-called fluorite structure, which can be described as alternating layers of Ce and oxides where Ce ions are linked by tetrahedral oxides), without the disadvantages of bulk $CeO_2$. Each Ce—O cluster can exhibit the fluorite structure of bulk $CeO_2$, and the core of Ce clusters can possess one or more $Ce^{3+}$ ions on the edge surfaces, similar to $CeO_2$ nanoparticles. These clusters can be capable of allowing study of their general properties and activity in various catalytic and biomedical systems as a function of the nuclearity, size, $Ce^{3+}/Ce^{4+}$ ratio, and other mentioned parameters as described herein. Embodiments of the molecular $Ce/O/RCO_2$-clusters behave like the nanoparticles, without their disadvantages, so the molecular $Ce/O/RCO_2$-clusters have broad applicability and can be utilized in many of the same applications. Additionally, the molecular $Ce/O/RCO_2$-clusters are stable with respect to reduction as indicated by large potentials required to observe any electrochemical activity. Synthetic methods as described herein can further tune reactivity of the nanoclusters by determining surface morphology.

Various molecules as described herein can be synthesized that allow the study of the reactivity as a function of surface morphology and facet composition of the molecule. In certain aspects, the exact surface morphology, in terms of facets that each molecule possesses, which has been shown to affect the activity and is also extremely difficult to determine in nanoparticles, can be selected. These molecules may be more reactive than the nanoparticles due to their small size, therefore increasing the efficiency of the processes and applications which currently use cerium-oxide nanoparticles to perform various functions. Additionally, embodiments of the molecular $Ce/O/RCO_2$-clusters as described herein may help improve their efficiency by revealing the mechanisms (surface reactivity) by which they are able to carry out various reactions allowing for specific tuning of the synthetic procedures to attain desired properties.

Molecular cerium-nanoclusters and methods as described herein provide single-size nanoclusters of which nanoclusters of a given species are identical to one an another. Nanoclusters as described herein are much more active than previously described ceria compositions because they do not suffer problems such as, from agglomeration (nanoparticles sticking together). These points can be important especially for medical applications, since they affect activity, toxicity, etc.

Embodiments of the molecular $Ce/O/RCO_2$-clusters are identical and monodisperse in a composition. In addition, the molecular $Ce/O/RCO_2$-clusters can be crystallized allowing for complete structural characterization, which is advantageous to determine how to use the molecular $Ce/O/RCO_2$-clusters. Embodiments of the molecular $Ce/O/RCO_2$-clusters are soluble in common solvents such as water or common organic solvents such as alcohols, ketones, MeCN and similar. Further, the molecular $Ce/O/RCO_2$-clusters can use different organic ligands, which allows the characteristics of the molecular $Ce/O/RCO_2$-clusters to be designed for particular applications.

In embodiments as described herein, the surface morphology can be tuned and the surface morphology and facet makeup can be controlled.

In an embodiment, the molecular $Ce/O/RCO_2$-clusters can be prepared to have a homogenous size, nuclearity, or other properties, individually or in combination, which cannot be easily, if at all, accomplished with nanoparticles. In embodiments, the molecular cerium-oxide nanoclusters can have prepared according to surface morphology.

Embodiments of the molecular $Ce/O/RCO_2$-clusters have components that are covalently bound (for example organic acid constituents). Also, in an embodiment, the molecular $Ce/O/RCO_2$-clusters do not aggregate together to form larger clusters as nanoparticles often do. In this regard, the molecular $Ce/O/RCO_2$-clusters are non-aggregated.

Embodiments of the molecular $Ce/O/RCO_2$-clusters can be used in place of ceria nanoparticles, but in contrast, the size, shape, surface ligation, $Ce^{3+}/Ce^{4+}$ ratio, surface protonation, surface facets, and the like, of the molecular $Ce/O/RCO_2$-clusters of the present disclosure can be controlled and designed. In this regard, embodiments of the molecular $Ce/O/RCO_2$-clusters can be used in: industrial and petrochemical catalysis (e.g., the water-gas shift reaction, preferential oxidation of carbon monoxide, soot combustion, three-way catalytic converters in automobiles, cracking of heavy petroleum fractions, and others), solid-oxide fuel cells (e.g., as an electrolyte), UV absorbers, chemical mechanical polishing (e.g., used to produce a transparent surface for optical elements), biomedicine (e.g., as either pro- or anti-oxidants and demonstrate activity at low temperatures (potential for use in diseases where reactive oxygen species can cause cell damage and death, such as stroke and Alzheimers disease), photocatalysts for wastewater remediation treatments and water oxidation, cosmetics, and destruction of chemical warfare agents.

In an embodiment, the molecular Ce/O/RCO$_2$-clusters can have a general formula of $[Ce_xO_y(OH)_w(H_2O)_f(RCO_2)_z(L)_m]^n$, $[Ce_xO_y(OH)_w(H_2O)_f(RPO_2)_z(L)_m]^n$, or $[Ce_xO_y(OH)_w(H_2O)_f(RPO_3)_z(L)_m]$, where l, m, n, w, x, y, z=0 or ± an integer number, and L=pyridine (py), MeCN or similar neutral organic molecule, or an ion such as F$^-$, Cl$^-$, Br$^-$, I$^-$, or similar inorganic ion such as CN$^-$, N$_3^-$, NCO$^-$, or similar. RCO$_2$, RPO$_2$, and RPO$_3$ in the above formulas can be derived from any of the organic acids described in more detail below.

In an embodiment, R can be alkyl group (such as CH$_3$, C$_2$H$_5$, C$_3$H$_7$, C$_4$H$_9$, C$_5$H$_{11}$, and longer chains, and their branched analogs, and derivatives of both types with one or more H atoms replaced by other atoms such as a halide (F, Cl, Br, I), OR' or SR' (R'=H or any alkyl group as listed)), or an aromatic group comprising one or more phenyl or similar aromatic rings, each of which can be unsubstituted or substituted at one or more H positions with an alkyl, halide or other group as described. In an embodiment, the molecular Ce/O/RCO$_2$-clusters can have the formula $[Ce_{19}O_{18}(OH)_9(PhCO_2)_{27}(py)_3(H_2O)]$.

Compositions of molecular cerium-oxide nanoclusters are described herein. A composition can be a homogenous composition comprised of similar clusters. A composition can be a non-homogenous composition that comprises clusters of the same nuclearity but different surface properties due to shifts in locations of protons. Clusters of a particular nuclearity can have different atomic configurations but retain similar shapes and properties as each other.

Provided herein are compositions of molecular Ce/O/RCO$_2$-clusters or molecular cerium-oxide nanoclusters. As used herein, molecular cerium-oxide nanoclusters (also referred to herein as cerium-oxide nanoclusters, nanoclusters, or clusters) can refer to individual nanoclusters and can also refer to a composition of a plurality of molecular cerium-oxide nanoclusters. Molecular cerium-oxide nanoclusters as described herein can have a crystalline structure. Molecular cerium-oxide nanoclusters as described herein can have a crystalline structure similar to the Fluorite structure.

Compositions of molecular cerium-oxide nanoclusters as described herein can be a homogenous composition, where nanoclusters of the composition have the same cerium nuclearities, similar sizes, and/or Ce$^{3+}$/Ce$^{4+}$ ratios. In certain embodiments, each cluster of a particular nuclearity has exactly the same size as other clusters of that same nuclearity. In certain embodiments, compositions as described herein can be heterogenous mixtures.

As used herein, cerium nuclearity is the number of central cerium atoms in a molecular nanocluster. Cerium-oxide nanoclusters as described herein can have a cerium nuclearity of about 6 to 100, about 19 to 40, about 6 to 40. In particular embodiments, cerium-oxide nanoclusters as described herein can have a cerium nuclearity of 19, 24, 38, and/or 40. A composition of molecular cerium-oxide nanoclusters can contain nanoclusters with the same or similar cerium nuclearity, for example a composition of molecular cerium-oxide nanoclusters can contain nanoclusters with a cerium nuclearity of 6, 14, 20, 24, or 38.

Molecular cerium-oxide nanoclusters may also contain Ce$^{3+}$ ions positioned around the outside of the core, similar to what is observed in cerium nanoparticles. Last, a local buildup of protons can occur near areas of Ce$^{3+}$ sites in molecular cerium-oxide nanoparticles, which are also typically not surrounded by as many oxide ions as Ce$^{4+}$ sites.

In certain aspects, molecular cerium-oxide nanoclusters as described herein can have two or more (100) facets. In certain aspects, molecular cerium-oxide nanoclusters as described herein can have 8 (100) facets. The number and/or type of facets presents on the surface of molecular cerium-oxide nanoclusters can be determined by the presence of small anions in reaction mixtures for molecular cerium-oxide nanocluster synthesis.

In certain aspects, molecular cerium-oxide nanoclusters (or cerium nanoclusters or cerium-oxide nanoclusters) as described herein have the formula $[Ce_{20}O_{18}Cl_{16}(O_2CPh)_{22}]^{4-}$, $[Ce_{24}O_{27}(OH)_5Cl_4(O_2CPH)_{30}(py)_4]$, $[Ce_{14}O_{14}(O_2CPH)_{22}(NO_3)_3(H_2O)]^-$, $[Ce_{24}O_{27}(OH)_9Cl_4(O_2CPh)_3(py)_4]$, $[Ce_{24}O_{23}(OH)_6Cl_4(O_2CPh)_3(py)_4]$, $[Ce_6O_4(OH)_3F(O_2CPh)_{12}(py)_2]$, or $[Ce_{38}O_{54}Cl_6(O_2CMe)_{36}(py)_8]$.

Provided herein are methods of synthesis of molecular cerium-oxide nanoclusters and/or molecular cerium-oxide nanoclusters. Methods as described herein can synthesize homogenous compositions of molecular cerium-oxide nanoclusters. Methods as described herein can synthesize homogenous compositions of crystalline molecular cerium-oxide nanoclusters. FIGS. 6B-6D depict embodiments of synthesis methods for embodiments of molecular cerium-oxide nanoclusters as described herein.

Methods as described herein can utilize a first cerium source. The first cerium source can be a cerium salt with a 3+ oxidation state and a counter anion. The counter ion can be a halide, nitrate, sulfate, or others. In embodiments, the first cerium source is CeCl$_3$ or Ce(NO$_3$)$_3$, individually or in combination. In other embodiments, the first cerium source can be Ce(ClO$_4$)$_3$, CeF$_3$, Ce$_2$(SO$_4$)$_3$, CeBr$_3$, and CeI$_3$.

Methods as described herein can also utilize a second cerium source. The second cerium source can act as an oxidizing agent, and contains cerium in the +4 oxidation state. The second cerium source can contain cerium and a nitrate group.

The cerium source can be ceric ammonium nitrate (NH$_4$)$_2$[Ce(NO$_3$)$_6$], or tetrabutylammonium cerium nitrate (TBA)$_2$[Ce(NO$_3$)$_6$]. In an embodiment, the second cerium source is (NH$_4$)$_2$[Ce(NO$_3$)$_3$].

The organic acid can be of the formula X$_1$CO$_2$H or X$_1$Y$_1$PO$_2$H or X$_1$PO$_3$H or RCO$_2$H, RPO$_2$H or RPO$_3$H, wherein X$_1$, Y$_1$, and R can each independently selected from: aromatic (e.g., phenyl (Ph), substituted phenyls, more than one connected phenyls), linear, or branched aliphatic, alicyclic or combinations of aromatic and aliphatic (e.g., alkyl group). X$_1$ and Y$_1$ can be phenyl (Ph), CH$_3$, CH$_3$CH$_2$, CH(CH$_3$)$_2$ The organic acid can be an O-containing acid such as MeCO$_2$H, CH$_3$CO$_2$H, PhCO$_2$H, CH$_3$CO$_2$H, CH$_3$CH$_2$CO$_2$H, PH$_2$PO$_2$H or PhPO$_3$H, or other organic acids. The organic acid provides oxygen atoms that are covalently bound to the nanocluster surface helping to stabilize the structure of the core and the energetically favorable growth of the core, and can play a role in regulating molecular nanocluster size, which will be determined by varying X$_1$ and/or Y$_1$. The organic acid can be benzoic acid or benzoic acid derivatives, such as 2-methylbenzoic acid, 3-methyl-benzoic acid, or 4-methylbenzoic acid. The organic acid can also be a weaker one such as an alcohol or polyol, or a multifunctional chelate ligand with a mixture of acid and alcohol groups. The organic acid can be acetic acid or propionic acid. In certain embodiments, R is Ph, $CH_3$, or $CH_3CH_2$.

The cerium source and the organic acid can be mixed in a solvent to create a reaction mixture in a ratio of about 1 to about 2 or about 1 to about 4. In an embodiment, the ratio is about 1 to about 2. In another embodiment, the ratio is about 1 to about 4. The solvent can comprise pyridine. Pyridine can be present in a ratio to the first cerium source of about 8:1 to about 32:1. Pyridine can be present in a ratio to the organic acid of about 4:1 to about 16:1. In certain aspects, pyridine is present in a ratio to the first cerium source of about 8:1 or about 32:1. The solvent can comprise acetonitrile. The solvent can comprise acetonitrile and pyridine. The solvent can comprise an alcohol (such as ethanol and methanol) and pyridine. The solvent can comprise tetrahydrofuran and pyridine. The solvent can comprise pyridine (py) and water in a ratio of about 5:1 v/v to about 10:1 v/v. In an embodiment, the amount of water can be less than 2 mL, and if the amount of water is more than 2 mL insoluble products can form without desirable crystalline products. In an embodiment the amount of water can be about 10 mL. In an embodiment, the amount of water can be about 2 mL to about 10 mL, about 3 mL to about 9 mL, about 4 mL to about 8 mL, about 5 mL to about 7 mL, about 6 mL.

In embodiments according to the present disclosure, the reaction mixture or solvent can further comprise $NEt_4ClO_4$ in an amount of about 0.1 mmol to about 1 mmol, about 0.2 mmol to about 0.9 mmol, about 0.3 mmol to about 0.8 mmol, about 0.4 mmol to about 0.7 mmol, or about 0.5 mmol to about 0.6 mmol.

The mixture can optionally be stirred.

The reaction can progress at a temperature of about 25° C. to about 180° C. In embodiments according to the present disclosure, the reaction can progress at a temperature of about 80° C. to about 180° C. In embodiments according to the present disclosure, the reaction can progress at a temperature of about 80° C., 120° C., or about 180° C. The reaction can progress at a temperature of about 80° C. to about 180° C., about 90° C. to about 170° C., about 100° C. to about 160° C., about 110° C. to about 150° C., about 120° C. to about 150° C., or about 130° C. to about 140° C.

The reaction can progress at a pressure of about 1 atm to about 3 atm, about 1 atm to about 2 atm or about 2 atm to about 3 atm.

The reaction can progress at a time of about 10 mins to about 72 hours. In embodiments according to the present disclosure, the reaction can progress for a time of about 30 minutes to about 90 minutes. In embodiments according to the present disclosure, the reaction can progress for about an hour. The reaction can progress for about 40 minutes to about 80 minutes, or about 50 minutes to about 70 minutes.

The reaction can be assisted with optional devices, such as a Biotage® Initiator or Initiaor+.

Methods as described herein can also utilize an anion source which is separate from the first and/or second cerium source. The anion source can be an acid or salt which can provide anions, such as halide, nitrate, sulfate, and the like. In an embodiment, the anion source is HCl. In embodiments, the anion source can be HBr, HF, $HNO_3$. Additional chloride sources, such as tetraethylammonium chloride may also be suitable.

After the reaction has processed, crystalline solid of molecular cerium-oxide nanoclusters can be isolated with an isolation method, such as filtration through filter paper or a glass frit.

Described herein are methods of scavenging free radicals. As used herein radical scavenging can mean reducing the absolute number of free radicals, reducing the concentration of free radicals, or reducing the half-life of free radicals. Methods as described herein can reduce free radicals from a first level to a second level, wherein a first level can be an absolute number, concentration, or half-life that is greater than a second level, which can be an absolute number, concentration, or half-life.

Methods as described herein can scavenge free radicals by the administration of compositions comprising molecular cerium-oxide nanoclusters as described herein. Methods of scavenging free radicals can include one or more of reducing the number or concentration of free radicals in an environment (such as a fluid), reducing the half-life of free radicals in an environment, preventing the generation of free radicals, or accelerating the rate of free radical decay. Free radicals can be reactive oxygen species, such as hydroxide and superoxide radicals, or other radicals, such as reactive nitrogen species.

Methods as described herein can reduce the absolute number of free radicals from a first level (or number) to a second level (i.e. number), wherein the second level is lower than the first. Methods as described herein can reduce the concentration of free radicals from a first level (i.e. concentration) to a second level (i.e. concentration), wherein the second level is lower than the first. Methods as described herein can reduce the half-life of free radicals from a first level to a second level, wherein the second level is a shorter duration of time (seconds, milliseconds, etc.) than the first. Methods as described herein can reduce combinations of the above.

Methods as described herein can scavenge free radicals by the administration of compositions comprising molecular cerium-oxide nanoclusters as described herein, and can accelerate physiological and non-physiological rates of free radical decay, wherein free radical decay is a reduction in one or more of free radical amount, concentration, or half-life over time. Compositions and methods as described herein can reduce one or more of the amount, concentration, or half-life of one or more free radical species at a faster rate than the free radical species would decay without compositions and methods as described herein.

Also described herein is a method of scavenging reactive oxygen species (ROS) or other physiological or non-physiological intra-cellular or extra-cellular free radicals. In embodiments of methods as described herein, a composition containing one or more cerium-oxide nanoclusters can be introduced into an environment containing reactive oxygen species, and the composition can reduce the amount of reactive oxygen species from a first level to a second level, the first level being higher than the second. In certain aspects, an exemplary embodiment of an ROS which can be scavenged is a hydroxyl radical (OH.) or superoxide radical ($O_2$.). One of skill in the art would recognize that although embodiments as described herein are directed to reactive oxygen species, compositions and methods as described herein are not limited to reactive oxygen species, and can relate to other radical species, such as reactive nitrogen species, for example.

In certain embodiments, a composition containing one or more cerium-oxide nanoclusters can be administered to a subject in need thereof. A subject in need thereof can be a subject (i.e., a cell, a rodent, a human, etc.) containing one or more living cells which may be subject to cellular or sub-cellular damage caused by reactive oxygen species or other intra-cellular or extra-cellular radical species. The composition administered to a subject in need thereof can reduce reactive oxygen species in or around the subject from a first level to a second level, where the first level is higher than the first. The composition administered to a subject in need thereof can reduce half-life of reactive oxygen species in or around the subject from a first level to a second level, where the second level is a shorter duration of time than the first level. The composition administered to a subject in need thereof can otherwise scavenge radicals in the subject.

In certain embodiments, the method includes treating a subject (i.e. a subject in need thereof) having undergoing or subject to oxidative stress. Such subjects can have an increased level of reactive oxygen species or radical species or can be subject to a risk of such and can be treated or prophylactically treated by the administration of a pharmaceutical composition to the subject in need thereof. Pharmaceutical compositions as described herein can comprise one or more molecular cerium-oxide nanoclusters as described herein and one or more pharmaceutically acceptable carriers (described in further detail below).

Methods of treatment as described herein can reduce the level of reactive oxygen species or radical species in the subject from a first level to a second level, wherein the second level is lower than the first. Methods of treatment as described herein can reduce the level of reactive oxygen species or radical species in or around one or more cells of the subject from a first level to a second level, wherein the second level is lower than the first. Methods of treatment as described herein can reduce the half-life of reactive oxygen species or other radical species in the subject from a first level to a second level, wherein the second level is a shorter duration of time than the first. Methods of treatment as described herein can reduce the half-life of reactive oxygen species or other radicals in or around one or more cells of the subject from a first level to a second level, wherein the second level is a shorter duration of time than the first. Methods as described herein can scavenge reactive oxygen species or radical species in a subject in need thereof.

A subject can be a subject, as defined herein, in need of treatment. A subject in need thereof can be a subject with a total level of free radicals or reactive oxygen species higher (absolute numbers, concentrations, half-life, numbers of species, or other factors) than a normal level as a result of a diseased state and/or an increased level of oxidative stress on the cellular level. A subject in need thereof can be a subject with a level of free radicals or reactive oxygen species in one or more populations of cells or organs (such as the brain, heart, lungs, etc.) higher than a normal level as a result of a diseased state and/or an increased level of oxidative stress on the cellular level.

As described, a subject in need thereof can be a subject under conditions of oxidative stress (in aspects in one or more cells or one or more populations of cells), an imbalance is created in which over-abundant reactive oxygen species (ROS) overwhelm cellular defenses-typically regulated and protected by antioxidants—and thus damage biological cells. There are many pathological conditions in which oxidative stress plays an important role in the pathogenesis of the condition, such as cancer, stroke, Alzheimer's, inflammation, or neurodegeneration.

In certain embodiments, oxidative stress and/or an increased level of reactive oxygen species or other free radicals can be caused in subjects by one or more of cancer, stroke, Alzheimer's, inflammation, or neurodegeneration (amyotropic lateral sclerosis, or ALS for example).

The methods as described herein can include delivering to a subject in need thereof, a pharmaceutical composition that includes a therapeutically effective amount of a compound (e.g., compounds A-D), or a pharmaceutically acceptable salt of the compound, and a pharmaceutically acceptable carrier, to treat the subject with an increased level of reactive oxygen species (i.e. scavenge excess reactive oxygen species) or other free radicals. As used herein, a therapeutically effective amount of a compound can be an amount of compound effective to reduce the level of free radicals or reactive oxygen species from a first level to a second level, where the first level is higher than the second. As used herein, a therapeutically effective amount of a compound can be an amount of compound effective to reduce the half-life of free radicals or reactive oxygen species from a first level to a second level, where the second level is a shorter duration of time than the first. Examples of concentrations which can comprise an effective amount are described below in the examples section and figures.

It should be noted that the therapeutically effective amount to result in uptake of the compound into the subject can depend upon a variety of factors, including for example, the age, body weight, general health, sex, and diet of the subject; the time of administration; the route of administration; the rate of excretion of the specific compound employed; the duration of the treatment; the existence of other drugs used in combination or coincidental with the specific composition employed; the type(s) of bacteria; and like factors well known in the medical arts.

Preparation of embodiments of the compounds is described in the Examples.

Pharmaceutical Formulations and Routes of Administration

Embodiments of the present disclosure include a compound (comprising one or more molecular cerium nanoclusters) as identified herein and formulated with one or more pharmaceutically acceptable excipients, diluents, carriers and/or adjuvants. In addition, embodiments of the present disclosure include a compound formulated with one or more pharmaceutically acceptable auxiliary substances. In particular the compound can be formulated with one or more pharmaceutically acceptable excipients, diluents, carriers, and/or adjuvants to provide an embodiment of a composition of the present disclosure.

A wide variety of pharmaceutically acceptable excipients are known in the art. Pharmaceutically acceptable excipients have been amply described in a variety of publications, including, for example, A. Gennaro (2000) "Remington: The Science and Practice of Pharmacy," 20th edition, Lippincott, Williams, & Wilkins; Pharmaceutical Dosage Forms and Drug Delivery Systems (1999) H. C. Ansel et al., eds., $7^{th}$ ed., Lippincott, Williams, & Wilkins; and Handbook of Pharmaceutical Excipients (2000) A. H. Kibbe et al., eds., $3^{rd}$ ed. Amer. Pharmaceutical Assoc.

The pharmaceutically acceptable excipients, such as vehicles, adjuvants, carriers or diluents, are readily available to the public. Moreover, pharmaceutically acceptable auxiliary substances, such as pH adjusting and buffering agents, tonicity adjusting agents, stabilizers, wetting agents and the like, are readily available to the public.

In an embodiment of the present disclosure, the compound can be administered to the subject using any means capable of resulting in the desired effect. Thus, the compound can be incorporated into a variety of formulations for therapeutic administration. For example, the compound can be formulated into pharmaceutical compositions by combination with appropriate, pharmaceutically acceptable carriers or diluents, and may be formulated into preparations in solid, semi-solid, liquid or gaseous forms, such as tablets, capsules, powders, granules, ointments, solutions, suppositories, injections, inhalants and aerosols.

In pharmaceutical dosage forms, the compound may be administered in the form of its pharmaceutically acceptable salts, or a subject active composition may be used alone or in appropriate association, as well as in combination, with other pharmaceutically active compounds. The following methods and excipients are merely exemplary and are in no way limiting.

For oral preparations, the compound can be used alone or in combination with appropriate additives to make tablets, powders, granules or capsules, for example, with conventional additives, such as lactose, mannitol, corn starch or potato starch; with binders, such as crystalline cellulose, cellulose derivatives, acacia, corn starch or gelatins; with disintegrators, such as corn starch, potato starch or sodium carboxymethylcellulose; with lubricants, such as talc or magnesium stearate; and if desired, with diluents, buffering agents, moistening agents, preservatives and flavoring agents.

Embodiments of the compound can be formulated into preparations for injection by dissolving, suspending or emulsifying them in an aqueous or nonaqueous solvent, such as vegetable or other similar oils, synthetic aliphatic acid glycerides, esters of higher aliphatic acids or propylene glycol; and if desired, with conventional additives such as solubilizers, isotonic agents, suspending agents, emulsifying agents, stabilizers and preservatives.

Embodiments of the compound can be utilized in aerosol formulation to be administered via inhalation. Embodiments of the compound can be formulated into pressurized acceptable propellants such as dichlorodifluoromethane, propane, nitrogen and the like.

Furthermore, embodiments of the compound can be made into suppositories by mixing with a variety of bases such as emulsifying bases or water-soluble bases. Embodiments of the compound can be administered rectally via a suppository. The suppository can include vehicles such as cocoa butter, carbowaxes and polyethylene glycols, which melt at body temperature, yet are solidified at room temperature.

Unit dosage forms for oral or rectal administration, such as syrups, elixirs, and suspensions, may be provided wherein each dosage unit, for example, teaspoonful, tablespoonful, tablet or suppository, contains a predetermined amount of the composition containing one or more compositions. Similarly, unit dosage forms for injection or intravenous administration may comprise the compound in a composition as a solution in sterile water, normal saline or another pharmaceutically acceptable carrier.

Embodiments of the compound can be formulated in an injectable composition in accordance with the disclosure. Typically, injectable compositions are prepared as liquid solutions or suspensions; solid forms suitable for solution in, or suspension in, liquid vehicles prior to injection may also be prepared. The preparation may also be emulsified or the active ingredient encapsulated in liposome vehicles in accordance with the present disclosure.

In an embodiment, the compound can be formulated for delivery by a continuous delivery system. The term "continuous delivery system" is used interchangeably herein with "controlled delivery system" and encompasses continuous (e.g., controlled) delivery devices (e.g., pumps) in combination with catheters, injection devices, and the like, a wide variety of which are known in the art.

Mechanical or electromechanical infusion pumps can also be suitable for use with the present disclosure. Examples of such devices include those described in, for example, U.S. Pat. Nos. 4,692,147; 4,360,019; 4,487,603; 4,360,019; 4,725,852; 5,820,589; 5,643,207; 6,198,966; and the like. In general, delivery of the compound can be accomplished using any of a variety of refillable, pump systems. Pumps provide consistent, controlled release over time. In some embodiments, the compound can be in a liquid formulation in a drug-impermeable reservoir, and is delivered in a continuous fashion to the individual.

In one embodiment, the drug delivery system is an at least partially implantable device. The implantable device can be implanted at any suitable implantation site using methods and devices well known in the art. An implantation site is a site within the body of a subject at which a drug delivery device is introduced and positioned. Implantation sites include, but are not necessarily limited to, a subdermal, subcutaneous, intramuscular, or other suitable site within a subject's body. Subcutaneous implantation sites are used in some embodiments because of convenience in implantation and removal of the drug delivery device.

Drug release devices suitable for use in the disclosure may be based on any of a variety of modes of operation. For example, the drug release device can be based upon a diffusive system, a convective system, or an erodible system (e.g., an erosion-based system). For example, the drug release device can be an electrochemical pump, osmotic pump, an electroosmotic pump, a vapor pressure pump, or osmotic bursting matrix, e.g., where the drug is incorporated into a polymer and the polymer provides for release of drug formulation concomitant with degradation of a drug-impregnated polymeric material (e.g., a biodegradable, drug-impregnated polymeric material). In other embodiments, the drug release device is based upon an electrodiffusion system, an electrolytic pump, an effervescent pump, a piezoelectric pump, a hydrolytic system, etc.

Drug release devices based upon a mechanical or electromechanical infusion pump can also be suitable for use with the present disclosure. Examples of such devices include those described in, for example, U.S. Pat. Nos. 4,692,147; 4,360,019; 4,487,603; 4,360,019; 4,725,852, and the like. In general, a subject treatment method can be accomplished using any of a variety of refillable, non-exchangeable pump systems. Pumps and other convective systems are generally preferred due to their generally more consistent, controlled release over time. Osmotic pumps are used in some embodiments due to their combined advantages of more consistent controlled release and relatively small size (see, e.g., PCT published application no. WO 97/27840 and U.S. Pat. Nos. 5,985,305 and 5,728,396). Exemplary osmotically-driven devices suitable for use in the disclosure include, but are not necessarily limited to, those described in U.S. Pat. Nos. 3,760,984; 3,845,770; 3,916,899; 3,923,426; 3,987,790; 3,995,631; 3,916,899; 4,016,880; 4,036,228; 4,111,202; 4,111,203; 4,203,440; 4,203,442; 4,210,139; 4,327,725; 4,627,850; 4,865,845; 5,057,318; 5,059,423; 5,112,614; 5,137,727; 5,234,692; 5,234,693; 5,728,396; and the like.

In some embodiments, the drug delivery device is an implantable device. The drug delivery device can be implanted at any suitable implantation site using methods and devices well known in the art. As noted herein, an implantation site is a site within the body of a subject at which a drug delivery device is introduced and positioned. Implantation sites include, but are not necessarily limited to a subdermal, subcutaneous, intramuscular, or other suitable site within a subject's body.

In some embodiments, an active agent (e.g., compounds A-D) can be delivered using an implantable drug delivery system, e.g., a system that is programmable to provide for administration of the agent. Exemplary programmable, implantable systems include implantable infusion pumps. Exemplary implantable infusion pumps, or devices useful in connection with such pumps, are described in, for example, U.S. Pat. Nos. 4,350,155; 5,443,450; 5,814,019; 5,976,109; 6,017,328; 6,171,276; 6,241,704; 6,464,687; 6,475,180; and 6,512,954. A further exemplary device that can be adapted for the present disclosure is the Synchromed infusion pump (Medtronic).

Suitable excipient vehicles for the compound are, for example, water, saline, dextrose, glycerol, ethanol, or the like, and combinations thereof. In addition, if desired, the vehicle may contain minor amounts of auxiliary substances such as wetting or emulsifying agents or pH buffering agents. Methods of preparing such dosage forms are known, or will be apparent upon consideration of this disclosure, to those skilled in the art. See, e.g., Remington's Pharmaceutical Sciences, Mack Publishing Company, Easton, Pa., 17th edition, 1985. The composition or formulation to be administered will, in any event, contain a quantity of the compound adequate to achieve the desired state in the subject being treated.

Compositions of the present disclosure can include those that comprise a sustained-release or controlled release matrix. In addition, embodiments of the present disclosure can be used in conjunction with other treatments that use sustained-release formulations. As used herein, a sustained-release matrix is a matrix made of materials, usually polymers, which are degradable by enzymatic or acid-based hydrolysis or by dissolution. Once inserted into the body, the matrix is acted upon by enzymes and body fluids. A sustained-release matrix desirably is chosen from biocompatible materials such as liposomes, polylactides (polylactic acid), polyglycolide (polymer of glycolic acid), polylactide co-glycolide (copolymers of lactic acid and glycolic acid), polyanhydrides, poly(ortho)esters, polypeptides, hyaluronic acid, collagen, chondroitin sulfate, carboxylic acids, fatty acids, phospholipids, polysaccharides, nucleic acids, polyamino acids, amino acids such as phenylalanine, tyrosine, isoleucine, polynucleotides, polyvinyl propylene, polyvinylpyrrolidone and silicone. Illustrative biodegradable matrices include a polylactide matrix, a polyglycolide matrix, and a polylactide co-glycolide (co-polymers of lactic acid and glycolic acid) matrix.

In another embodiment, the pharmaceutical composition of the present disclosure (as well as combination compositions) can be delivered in a controlled release system. For example, the compound may be administered using intravenous infusion, an implantable osmotic pump, a transdermal patch, liposomes, or other modes of administration. In one embodiment, a pump may be used (Sefton (1987). *CRC Crit. Ref. Biomed. Eng.* 14:201; Buchwald et al. (1980). *Surgery* 88:507; Saudek et al. (1989). *N. Engl. J. Med.* 321:574). In another embodiment, polymeric materials are used. In yet another embodiment a controlled release system is placed in proximity of the therapeutic target thus requiring only a fraction of the systemic dose. In yet another embodiment, a controlled release system is placed in proximity of the therapeutic target, thus requiring only a fraction of the systemic. Other controlled release systems are discussed in the review by Langer (1990). *Science* 249:1527-1533.

In another embodiment, the compositions of the present disclosure (as well as combination compositions separately or together) include those formed by impregnation of the compound described herein into absorptive materials, such as sutures, bandages, and gauze, or coated onto the surface of solid phase materials, such as surgical staples, zippers and catheters to deliver the compositions. Other delivery systems of this type will be readily apparent to those skilled in the art in view of the instant disclosure.

Dosages

Embodiments of the compound can be administered to a subject in one or more doses. Those of skill will readily appreciate that dose levels can vary as a function of the specific the compound administered, the severity of the symptoms and the susceptibility of the subject to side effects. Preferred dosages for a given compound are readily determinable by those of skill in the art by a variety of means.

In an embodiment, multiple doses of the compound are administered. The frequency of administration of the compound can vary depending on any of a variety of factors, e.g., severity of the symptoms, and the like. For example, in an embodiment, the compound can be administered once per month, twice per month, three times per month, every other week (qow), once per week (qw), twice per week (biw), three times per week (tiw), four times per week, five times per week, six times per week, every other day (qod), daily (qd), twice a day (qid), or three times a day (tid). As discussed above, in an embodiment, the compound is administered continuously.

The duration of administration of the compound analogue, e.g., the period of time over which the compound is administered, can vary, depending on any of a variety of factors, e.g., patient response, etc. For example, the compound in combination or separately, can be administered over a period of time of about one day to one week, about two weeks to four weeks, about one month to two months, about two months to four months, about four months to six months, about six months to eight months, about eight months to 1 year, about 1 year to 2 years, or about 2 years to 4 years, or more.

Routes of Administration

Embodiments of the present disclosure provide methods and compositions for the administration of the active agent (e.g., the compound) to a subject (e.g., a human) using any available method and route suitable for drug delivery, including in vivo and ex vivo methods, as well as systemic and localized routes of administration.

Routes of administration include intranasal, intramuscular, intratracheal, subcutaneous, intradermal, topical application, intravenous, rectal, nasal, oral, and other enteral and parenteral routes of administration. Routes of administration may be combined, if desired, or adjusted depending upon the agent and/or the desired effect. An active agent (e.g., the compound) can be administered in a single dose or in multiple doses.

Embodiments of the compound can be administered to a subject using available conventional methods and routes suitable for delivery of conventional drugs, including systemic or localized routes. In general, routes of administration contemplated by the disclosure include, but are not limited to, enteral, parenteral, or inhalational routes.

Parenteral routes of administration other than inhalation administration include, but are not limited to, topical, transdermal, subcutaneous, intramuscular, intraorbital, intracapsular, intraspinal, intrasternal, and intravenous routes, i.e., any route of administration other than through the alimentary canal. Parenteral administration can be conducted to effect systemic or local delivery of the compound. Where systemic delivery is desired, administration typically involves invasive or systemically absorbed topical or mucosal administration of pharmaceutical preparations.

In an embodiment, the compound can also be delivered to the subject by enteral administration. Enteral routes of administration include, but are not limited to, oral and rectal (e.g., using a suppository) delivery.

Methods of administration of the compound through the skin or mucosa include, but are not limited to, topical application of a suitable pharmaceutical preparation, transdermal transmission, injection and epidermal administration. For transdermal transmission, absorption promoters or iontophoresis are suitable methods. Iontophoretic transmission may be accomplished using commercially available "patches" that deliver their product continuously via electric pulses through unbroken skin for periods of several days or more.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

Abbreviations

Ph: phenyl; Me: methyl; py: pyridine; BVS: bond valence sums; Ce: cerium.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

Cerium is the $2^{nd}$ element in the lanthanide series and unlike other lanthanides is able to exist in both the +3 and +4 oxidation states. When burned in air, cerium dioxide, otherwise known as ceria is formed. Ceria crystalizes in the fluorite structure as is shown in FIGS. 2A-2B. Each cerium ion is coordinated to 8 oxygens in and each oxygen is coordinated to four cerium ions in a tetrahedral environment. As a consequence of its dual oxidation states ceria is able to exist in a range of oxides from the fully oxidized cerium dioxide to the fully reduced cerium sesquioxide, and non-stoichiometric oxides in-between. To accommodate reduced cerium ions into the fluorite lattice and maintain charge balance oxygen vacancies occur in the lattice. Ceria can both release oxygen and absorb oxygen, a property which has been exploited since the 1970s in three way catalytic converters. Ceria shows three low index thermodynamically stable faces the 111, 110, and the 100 as shown in FIGS. 2C-2E. Each face has a different repeat structure as indicated by the colored shapes. The repeat units of each of the faces vary for each of them and leads to different surface free energies, it is found that stability with respect to surface free energy decreases as we go from the 111 to 110 and 100.

Descending in size from the bulk cerium dioxide to cerium oxide nanoparticles (CNPs) the previously shown faces become facets, which are just small pieces of faces that in combination with other facets leads to the overall morphology of a nanoparticle.

Decreasing the size from bulk material to nanoparticle can lead to an increase in the reactivity as there is an increase in the number of oxygen vacancies formed and therefore a greater number of Ce+3 ions. Continuing to decrease the size in the nanoparticle size regime leads to further increased reactivity as the number of Ce3+ ions in the structure continues to increase. The morphology of nanoparticles is determined by the facets present, this can be seen in this image showing first the (100) enclosed nanocube up to the (111) octahedron (FIGS. 3A-3E). The reactivity of the facets varies as a result of their ability to form oxygen vacancies. It is therefore essential to be able to selectively synthesize more reactive facets for oxidation catalysis it is desirable to synthesize the (110) and (100) facets. As the (100) and (110) facets have a greater surface free energy anions/templating agents have to be introduced into the synthetic procedure to decrease the facets surface free energy and make it favorable to synthesize these facets. It has been seen in nanoparticle synthesis that with addition of nitrate ions to the reaction mixture the (100) enclosed nanocube can be synthesized as a result of the nitrates ability to selectively interact with that facet and favor its growth.

Cerium oxide nanoparticles bridge the gap between bulk materials and molecular clusters, however there are issues surrounding ceria nanoparticles. Nonetheless, size dependent properties are observed in ceria nanoparticles. Additionally, the presence of different facets can lead to the formation of different morphologies, wherein the morphology is determined by the facets present on the surfaces of (FIGS. 3A-3E) the nanoparticles. Different facets (such as (100), (110), and (110)) can exhibit different reactivities as a consequence of their ability to form O vacancies (on the order of (111)<(110)<(100) from least to most reactive), and structures with different morphologies can therefore exhibit different reactivities as well.

Nanoparticle synthesis suffers from a few limitations: a single synthesis produces a range of nanoparticle sizes; and can only be studied using surface techniques. As a consequence of the nanoparticle synthetic scheme a disperse range of sizes are produced meaning that the size dependent properties of nanoparticles can never be truly isolated. They can also only be studied using surface techniques that are unable to define the location of the Ce3+ ions and the O vacancies. The problems faced by nanoparticle synthesis can be overcome using a molecular approach to synthesis as the crystalline product can be refined to atomic precision using X-ray diffraction techniques allowing the identification of Ce3+ ions locations and even H+ ions present on the surface of the clusters Ce/O molecular synthesis offers an attractive alternative to help resolve these issues showing at least: monodispersity, crystallinity, true solubility, and protecting Organic Ligand Shell. Synthesis of precise molecular cerium-oxide nanoclusters has been previously demonstrated, for example according to the reaction scheme of FIG. 5A. Using a molecular approach to synthesis, a family of cerium dioxide clusters has been synthesized spanning from the smallest unit of the fluorite structure, the Ce6, to the largest known cerium oxide structure to date, the $Ce_4$ (FIGS. 4A-4F). Each of the clusters has similar features to nanoparticles and bulk materials that helped give further insight into the structure of nanoparticles.

Figure 5A:
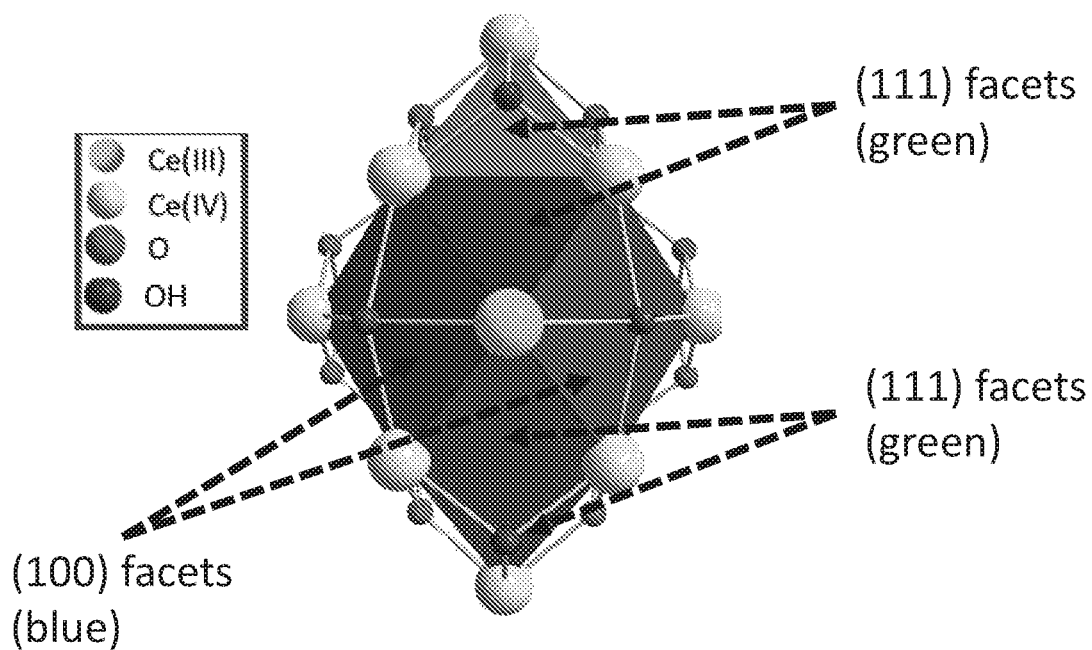
FIGS. 5A-5B demonstrate that the facets that are observed in ceria nanoparticles (example of which shown in FIG. 5A) are also seen in larger Ce/O clusters (molecular cerium-oxide nanoclusters, example of which shown in FIG. 5B).
Figure 5B:
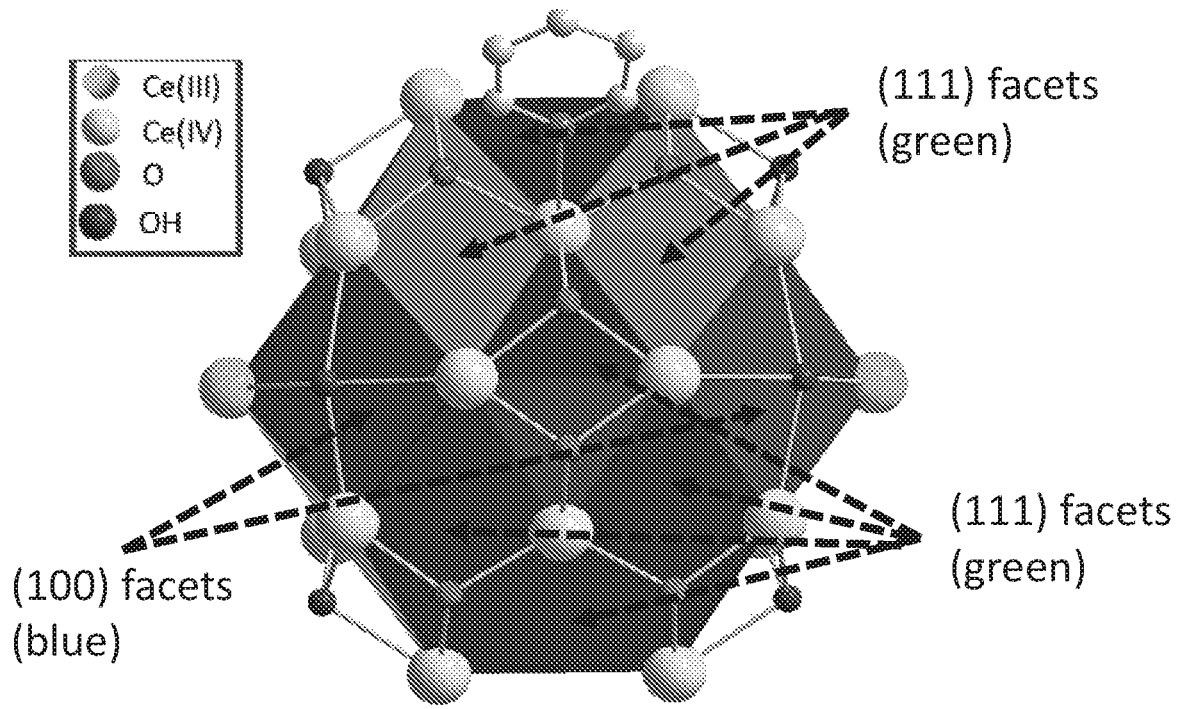

These molecular cerium-oxide nanoclusters can be formed that exhibit similar properties to bulk ceria materials (such as the fluorite structure shown in FIGS. 2A and 2B) without the drawbacks of ceria nanoparticles. It is additionally noted that the facets that are observed in cerium oxide nanoparticles are also observed in molecular cerium-oxide nanoclusters (FIGS. 5A and 5B). Furthermore, in (100) facets, the Ce3+ ions present in $Ce_{24}$ occurs in favorable locations at the intersections, and OH⁻ ions can accumulate around the $Ce^{3+}$, stabilizing the reducing charge.

Taking a closer look at the $Ce_{24}$, for example (FIGS. 5A-5B), the first point to note is that the facets observed in CNPs can also been seen in the cerium oxide clusters. In this figure both the 111 and 100 facets in green and blue respectively are seen. The 110 facet is also observed but only in the $Ce_{40}$. The second point is that reduced cerium ions are located in favorable locations. These favorable locations are typically at the intersection of two (100) facets, where there is reduced coordination to oxides. Hydroxides shown in purple accumulate around the reduced cerium ions as a way to help stabilize the reduced charge. At the 100 facets $\mu_4$ hydroxides are found bridging as a way to stabilize the facet. The cerium hydroxide distance is long enough that there is only a weak interaction between the cerium and hydroxide, the hydroxide behaves as a lid and is believed to represent a catalytic hotspot.

Figure 6A:
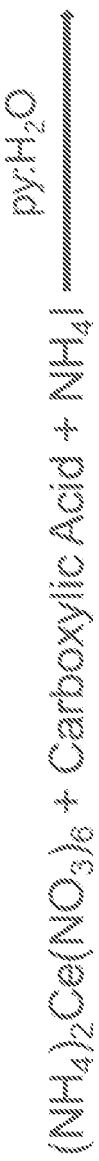
FIGS. 6A-6D.
Figure 6B:
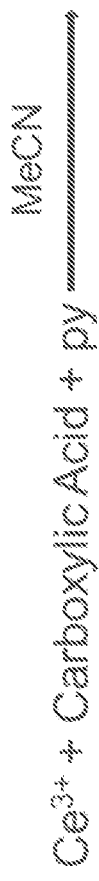
Figure 6C:
Figure 6D:

Previously a $Ce^{+4}$ source has been in used in an aqueous pyridine system, in for example in the reaction scheme of FIG. 6A. In an embodiment of the present work, when $Ce^{3+}$ salts have been used a known $Ce_{24}$ is produced that doesn't appear to suggest that the counter anion is incorporated into the structure hence the reaction solvent has been changed to acetonitrile.

Building upon this previous work, it has been found that at least careful selection of reagents and the addition of anions to a molecular cerium-oxide reaction mixture can favor the growth of specific facets of the resultant molecular cerium-oxide nanoclusters. New reaction schemes, such as those in FIGS. 6B-6D, can be undertaken which can selectively tune the surface morphology, and therefore reactivity, of molecular cerium-oxide nanoparticles. As molecular cerium-oxide nanoclusters have a wide range of uses, it can be possible to generate a specific molecular cerium-oxide nanocluster with a specific reactivity for a specific purpose by controlling the facets on the surface[s].

Strategies to tune surface morphology of molecular cerium-oxide nanoclusters can involve employing $Ce^{3+}$ salts as a starting reagent with a counter anion such as Cl⁻ or $NO_3^-$ (FIGS. 6B and 6C). Additional counter anion can be added to the reaction mix as well (FIG. 6D for example).

Using a reaction scheme such as in FIG. 6B, cerium (Ill) chloride, benzoic acid, pyridine and cerium ammonium nitrate produced a $Ce_2$. Initially, no cerium ammonium nitrate was include in the reaction scheme and it took approximately 3 months to crystallize. This was attributed to the reaction proceeding through a cerium three polymer intermediate that took a long time to dissolve before the $Ce_2$ crystallized. Cerium ammonium nitrate (($NH_4$)$_2$Ce($NO_3$)$_6$) was added to disturb the dissolution recrystallization equilibrium and help decrease the time it took to form the $Ce_2$. With addition of cerium ammonium nitrate the product was isolated within 4 weeks. The crystals produced were a dark purple as shown here, in CNP synthesis dark powders are indicative of a highly reduced sample. The black color of these crystals is likely also indicative of a high $Ce^{3+}$:$Ce^{4+}$ ratio.

An embodiment of a molecular cerium-oxide nanocluster having a nuclearity of ($Ce_2$) can be synthesized according to the following reaction mechanism (also shown in FIG. 7A) with a yield of about 10% or greater based on Ce:

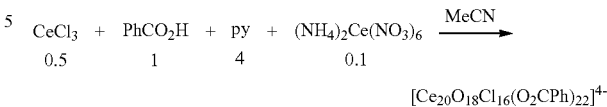

The numbers 0.5, 1, 4, and 0.1 in the above reaction can denote proportions or ratios. An illustration of a structure of a molecular $Ce_{20}$ cluster can be seen in FIG. 7B and a representative $Ce_{20}$ crystal is shown in the picture of FIG. 7C. FIG. 8 shows coordination numbers and oxidation states for $Ce_{20}$. Using bond valence sum calculations the oxidation states of the cerium and the protonation level of the oxides has been calculated. It can be seen that $Ce_1$—$Ce_{10}$ are all cerium +4. These ions are all 8 coordinate which is the same as the +4 ions in the cerium dioxide fluorite structure. $Ce_2$ has a low BVS, when examining its local environment we can see that it is slightly distorted from the idealized fluorite lattice, but based on its position and coordination number it is most likely a $Ce^{4+}$. $Ce_{11}$ through $Ce_{20}$ have coordination of 9 or greater and an oxidation state of +3. The BVS of the oxides indicated that they were all doubly deprotonated. This leads to an overall charge of the molecule as −4. From the structure we can see that there are two groups of $Ce^{3+}$ ions separated by a $Ce_{10}$ oxidized core and the chloride ions accumulate around them as way to help stabilize the charge.

Figure 9A:
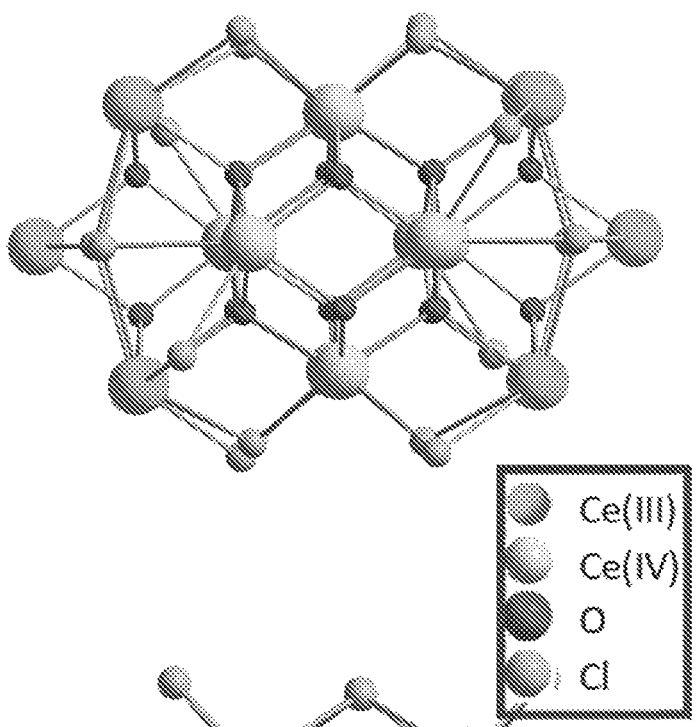
FIG. 9 shows coordination numbers and oxidation states for an embodiment of a $Ce_{20}$ molecular cerium-oxide nanocluster according to the present disclosure.
Figure 9B:
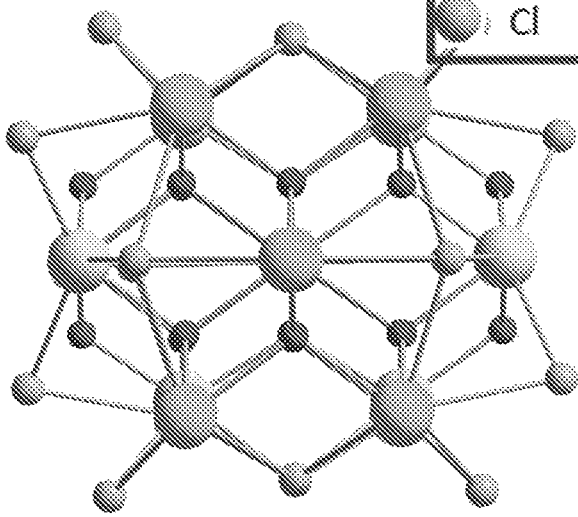

An illustration of a structure of a core of a molecular $Ce_{20}$ cluster can be seen in FIGS. 9A-9B. Using the reaction scheme above, a $Ce^{3+}$ polymer can be produced overnight and the dark color of the crystal[s] shown in FIG. 7B. It was additionally found that the addition of another cerium source to the reaction, such as ($NH_4$)$_2$Ce($NO_3$)$_6$, can decrease the time taken for crystallization of the product.

Figure 10C:
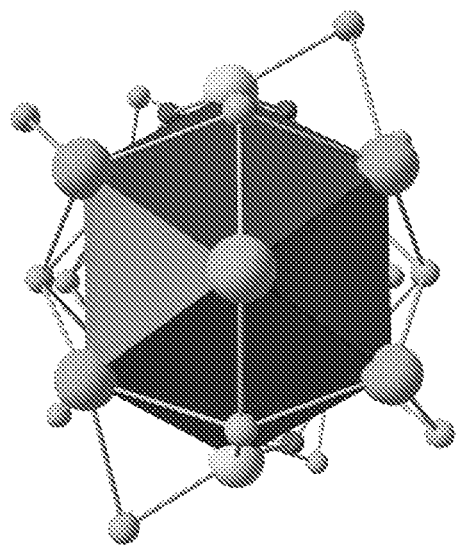
Figure 10B:
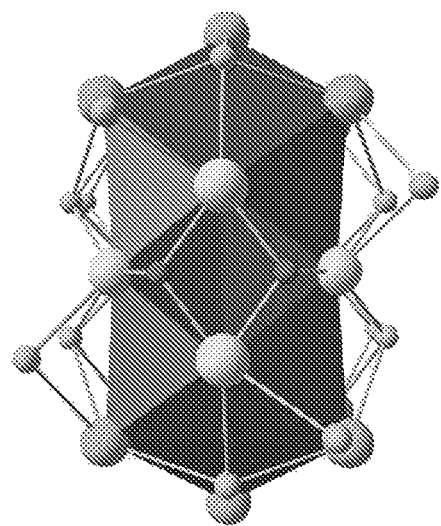
FIGS. 10A-10B illustrate the core structure of an embodiment of a molecular cerium-oxide nanocluster, $Ce_{20}$, from different angles according to the present disclosure.
Figure 10A:
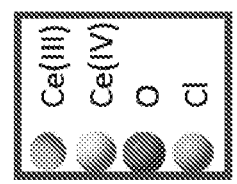
Figure 10A:
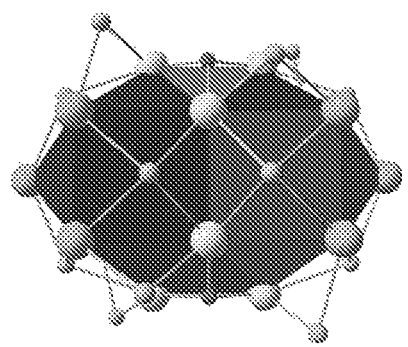

FIGS. 10A-10C show core-in-facet views of the embodiment of the $Ce_{20}$ cluster product above. From these views, it can be seen that there are 8 (100) facets, there is a high $Ce^{3+}$:$Ce^{4+}$ ratio (about 1:1), and the $Ce^{3+}$ ions are located in the favorable locations. Further, the Cl⁻ ions are able to coordinate both as $\mu_2$ and $\mu_4$, and $\mu_4$-Cl⁻ ions bridge (100) facets. In these images it can be seen that the facets present in the $Ce_{20}$, the 111 facet is shown in green and the 100 facet is shown in blue. It can be see the reduced cerium ions are located at in places where the angle of intersection is either 90 or 120 degrees. There are four ions present in (100) facets that join through an edge as opposed to an atom. The angle of intersection of these facets is approximately 180 degrees, the cerium ions located in these positions are all oxidized. This has been seen previously in the $Ce_{40}$ where two 100 facets met at 180 degrees and the ion present was oxidized. $\mu_4$ chloride ions are found bridging the 100 facets as was done by hydroxides in previous molecular cerium-oxide nanoclusters. The chloride appears to inhibit the growth of the $Ce_{20}$ and allows the formation of the $Ce_{20}$ as the chlorides are able to stabilize the (100) facets. This structure displays an unprecedented amount of reduced ce ions with a 1:1 cerium 3+ to cerium 4+ ratio and this may be attributed to the fact that chloride has inhibited the growth and stabilized the (100) facet. It is also the first time in a structure where two (100) facets have been observed interacting through the edge of the facet as opposed to through a single atom.

According to another embodiment, an embodiment of a molecular cerium-oxide nanocluster having a nuclearity of 14 ($Ce_{14}$) can be synthesized according to the following reaction mechanism (also shown in FIG. 11A, similar to FIG. 7A except with $Ce(NO_3)_3$ as starting material) with a yield of about 7% or greater based on Ce:

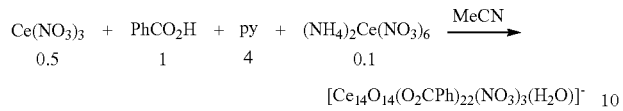

$$Ce(NO_3)_3 + PhCO_2H + py + (NH_4)_2Ce(NO_3)_6 \xrightarrow{MeCN}$$
$$0.5 \quad\quad 1 \quad\quad 4 \quad\quad 0.1$$

$$[Ce_{14}O_{14}(O_2CPh)_{22}(NO_3)_3(H_2O)]^-$$

The numbers 0.5, 1, 4, and 0.1 in the above reaction can denote proportions or ratios. An illustration of a structure of a molecular $Ce_{14}$ cluster can be seen in FIG. 11B, and a core-in-facet view is shown in FIG. 11C. Representative $Ce_{14}$ crystals are shown in the picture of FIG. 11D. It was noted that no Ce3+ polymer was produced and only (111) facets were present in the product.

The product was a $Ce_{14}$, that shows a cerium 10 core with 4 cerium ions bound to the core through single oxides. Using bond valence sum calculations it was found that the 4 cerium ions coordinated to a single oxide are reduced cerium ions and the cerium 10 core is all found to be oxidized, all oxides are doubly deprotonated leading to an overall charge of –1. The red color of the crystals could be associated with a charge transfer from the Oxygen 2p orbital to the cerium 4f orbital.

Figure 13A:
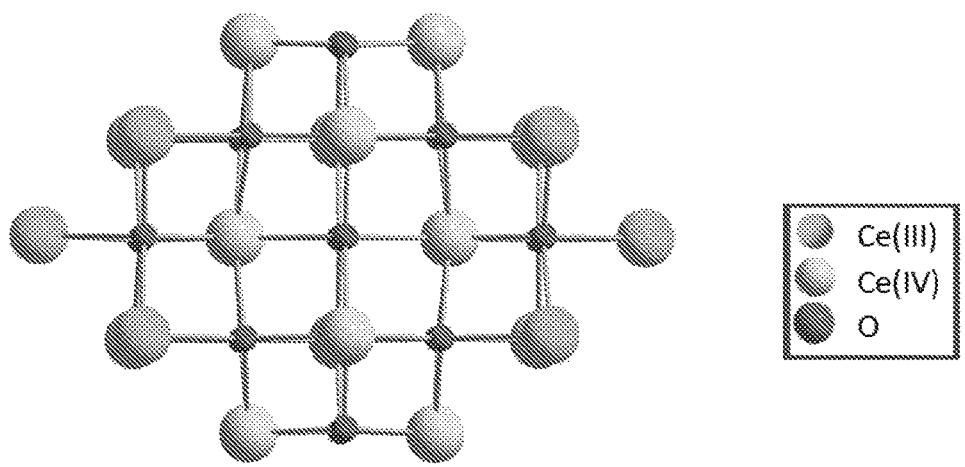
FIGS. 13A-13B illustrate additional molecular cerium-oxide nanocluster structure (FIG. 13A) in addition to RMS analysis, showing orientation of the $Ce_{20}$ in pink overlaid with the $Ce_{14}$ in green (FIG. 13B).
Figure 13B:
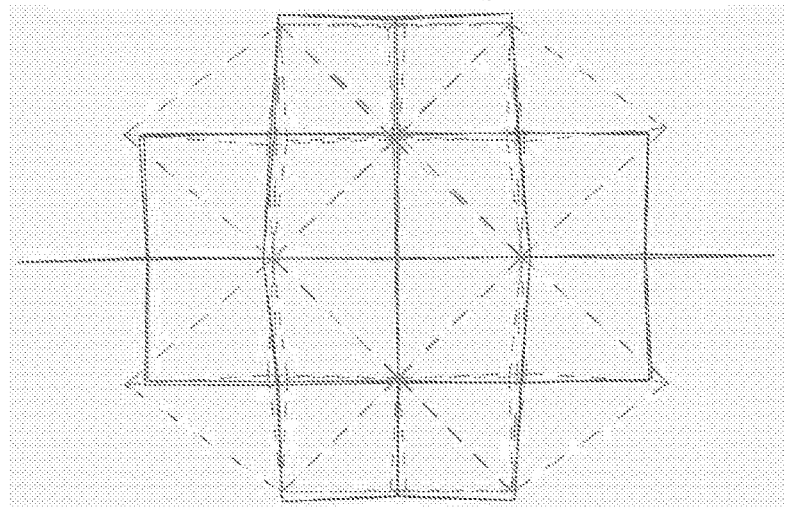

A root mean square analysis of the $Ce_{20}$ and $Ce_{14}$ embodiments above is shown in FIG. 12. The similarity between the $Ce_{14}$ and $Ce_{20}$ has been furthered explored using RMS analysis. Shown is the orientation of the $Ce_{20}$ in pink overlaid with the $Ce_{14}$ in green (FIGS. 13A-13B). The dashed lines at 45 degrees can be ignored as they represent ce-ce bonds. The rms deviation appears quite large at 0.273 angstroms but upon further inspection its seen that the cerium ions 1 to 10 in both structures deviate very little from one another but the reduced ions, shown in bold in the table have the greatest deviation. This deviation of $Ce_{11}$ to $Ce_{14}$ in the $Ce_{14}$ can be attributed to the fact that they are only bound to the $Ce_{10}$ core through a single oxide, when the nuclearity and number of oxides is increased the ions have greater restrictions upon the reduced ions.

It appears from the embodiments above that Cl⁻ ions are important structure-directing agents in the formation of the molecular cerium-oxide nanoclusters, at least for $Ce_{20}$. Cl⁻ ions additionally appear to be able to bridge the (100) facet, stabilizing the facet, whereas $NO_3$ ions may only chelate on $Ce^3$ ions.

According to yet another embodiment, a molecular cerium-oxide nanocluster having a nuclearity of 24 ($Ce_{24}$) can be synthesized according to the following reaction mechanism (also shown in FIG. 14A) with a yield of about 6% or greater based on Ce:

$$Ce(NO_3)_3 + PhCO_2H + HCl + py + (NH_4)_2Ce(NO_3)_3 \xrightarrow{MeCN}$$
$$0.5 \quad\quad 1 \quad\quad 25\,\mu L \quad\quad 4 \quad\quad 0.1$$

$$[Ce_{24}O_{27}(OH)_5Cl_4(O_2CPh)_{30}(py)_4]$$

The numbers 0.5, 1, 4, and 0.1 in the above reaction can denote proportions or ratios, whereas 25 µL is a volume. An illustration of a structure of a molecular $Ce_{24}$ cluster can be seen in FIG. 14B, and representative $Ce_{24}$ crystals are shown in the picture of FIG. 14C. As HCl is acid, chloride and water reaction controls have been conducted with water, potassium chloride and nitric acid (shown in FIG. 14D). Only the nitric acid produced a ce24 suggesting that it was the acid and chloride in combination that produced the change in nuclearity. Using BVS calculations it was found that there are 3 reduced ce ions present in favorable locations and 5 hydroxides present in the structure. Surrounding the cerium three ions are chlorides bridging the (100) facet and hydroxides as a way to help stabilize the lower charge of the reduced cerium.

It was noted that Cl⁻ ions have been incorporated into the product structure, the $Ce_{24}Cl$ is isostructural with the other $Ce_{24}$ clusters, and there are 4 (100) facets. When the $Ce_{14}$ synthetic procedure was repeated with addition of hydrochloric acid the product was changed from a $Ce_{14}$ to $Ce_{24}$. The $Ce_{24}$ is isostructural with the previously synthesized $Ce_{24}$ in the ce/o cluster family. It can see that the chloride ions are incorporated into the structure in a mu4 binding mode as was seen in the $Ce_2$. Using BVS calculations it was found that there are 3 reduced ce ions present in favorable locations and 5 hydroxides present in the structure. Surrounding the cerium three ions are chlorides bridging the (100) facet and hydroxides as a way to help stabilize the lower charge of the reduced cerium.

Figure 15A:
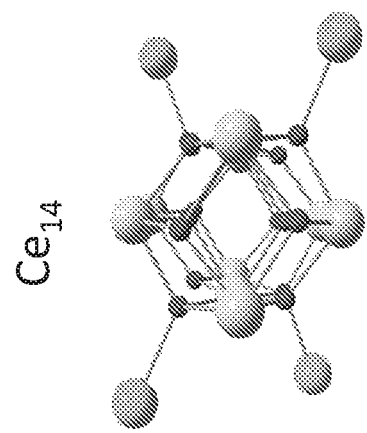
FIGS. 15A-15C show the core structure of embodiments of $Ce_{14}$, $Ce_{20}$, and $Ce_{24}$ according the present disclosure.
Figure 15B:
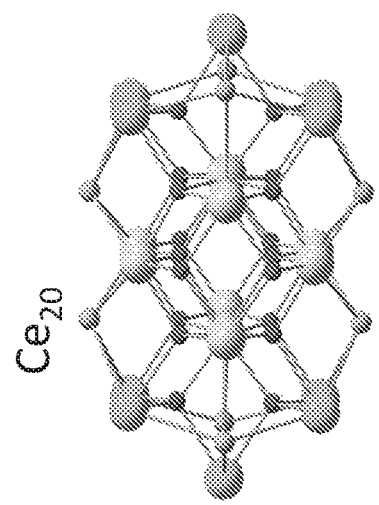
Figure 15C:
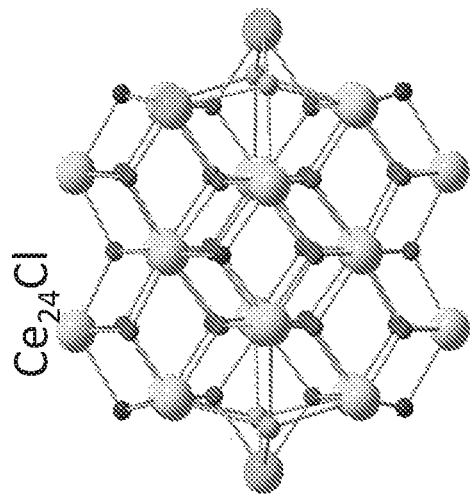
Figure 16A:
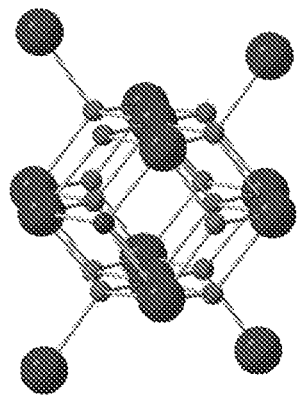
FIGS. 16A-16C illustrate further representation of $Ce_{14}$, $Ce_{20}$, and $Ce_{24}$ and their similarity to a $Ce_{10}$ core seed structure. In these figures it can be seen that blue ions represent the $Ce_{14}$, purple ions represent the ions added to make the $Ce_{20}$ and green are the cerium ions added to make the $Ce_{24}$. In all 3 molecules the $Ce_{10}$ core is consistent, suggesting that the $Ce_{10}$ is a key growth point for all of these three structures.
Figure 16B:
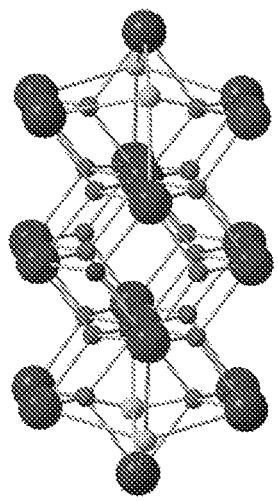
Figure 16C:
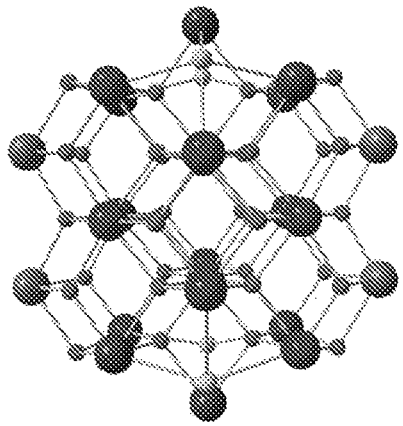

A comparison between the $Ce_{14}$, $Ce_{20}$, and $Ce_{24}$ embodiments above can be seen in core-only views of FIGS. 16A-16C. Furthermore, FIGS. 15A-15C show additional similarities. Through RMS analysis it can be seen how closely related the $Ce_{14}$, $Ce_{20}$ and $Ce_{24}$ are related to one another. In these figures it can be seen that blue ions represent the ce14, purple ions represent the ions added to make the ce20 and green are the cerium ions added to make the ce24. In all 3 molecules the ce10 core is consistent, this would suggest that the ce10 is a key growth point for all of these three structures.

In conclusion, Cl⁻ ions can direct structure of molecular cerium-oxide nanoclusters to a new nuclearity of Ce/O nanoclusters that shows a greater (100) facet covered and higher $Ce^{3+}$:$Ce^{4+}$ ratio. Cl⁻ ions additionally can stability the (100) facet by bridging multiple Ce ions. In contrast, $NO_3^-$ may only chelate and hence may not favor the growth of the (100) facet under these synthetic conditions. In this work 2 embodiments of new nuclearities have been synthesized through anion control. It has been observed that the Cl⁻ ions are better able to stabilize the 100 facet as they are able to bridge multiple reduced cerium ions and favor the growth of the 100 facet. This is contrast to the observations in CNP synthesis where it is seen that nitrate addition favors the formation of the 100 facet. When nitrates are present in a 6:1 nitrate to ce ratio no polymer is produced which may be important to incorporating more reduced cerium ions into the structure as there is slower oxidation of the ions as they begin to aggregate, because of the structural demands the reduced cerium ions the structures produced are smaller.

Additional Info for Example 1

Figures 17, 18A:
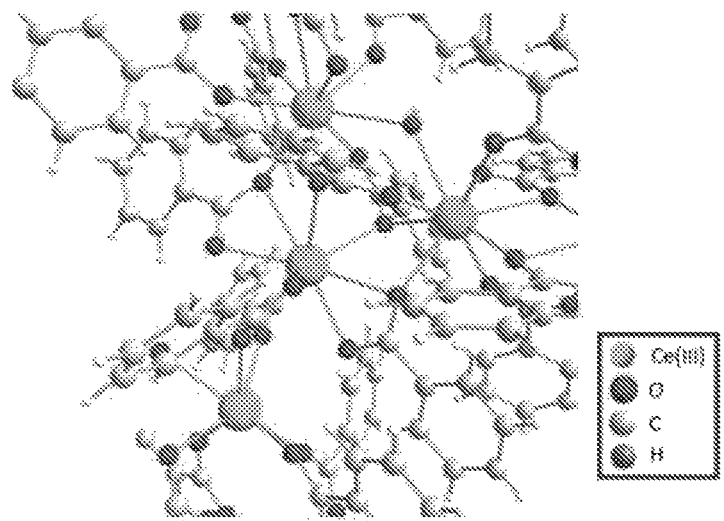
FIG. 17 shows a partial structure of $Ce^{3+}$ polymer.
FIGS. 18A-18B show BVS calculations and the core structure of $Ce_{14}$ respectively.

The $Ce^3$ polymer (FIG. 17), formed overnight, has been isolated. The polymer is produced overnight as either a white powder or colorless crystals. In the literature ce(III) polymers have been used to synthesize both homo and heterometallic cerium oxide clusters with the fluorite structure. In fact the previous largest known cerium oxide cluster, a ce22 was synthesized using a cerium isobutyrate polymer. In the polymer structure there are no chlorides present suggesting that chloride has a structure directing effect in the formation of the $Ce_{20}$.

Figures 18B, 19A:
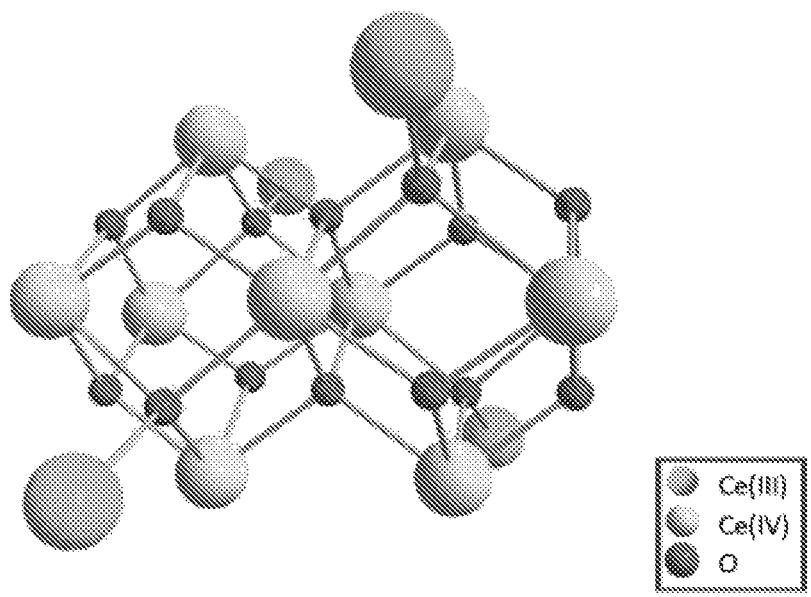
FIGS. 19A-19B show BVS calculations and the core structure of $Ce_{24}$ respectively.

From the bvs calculations of Ce14 (FIG. 18A; core structure shown in FIG. 18B), it can be seen that ce1 to ce10 are all oxidized and 8 coordinate similar to the ce20. Ce11 to ce14, the outer ions bridged to the $Ce_{10}$ core via a single oxide are all reduced. The oxides were all found to be doubly deprotonated with the exception of a single terminal water molecule present on ce13.

Figure 19B:
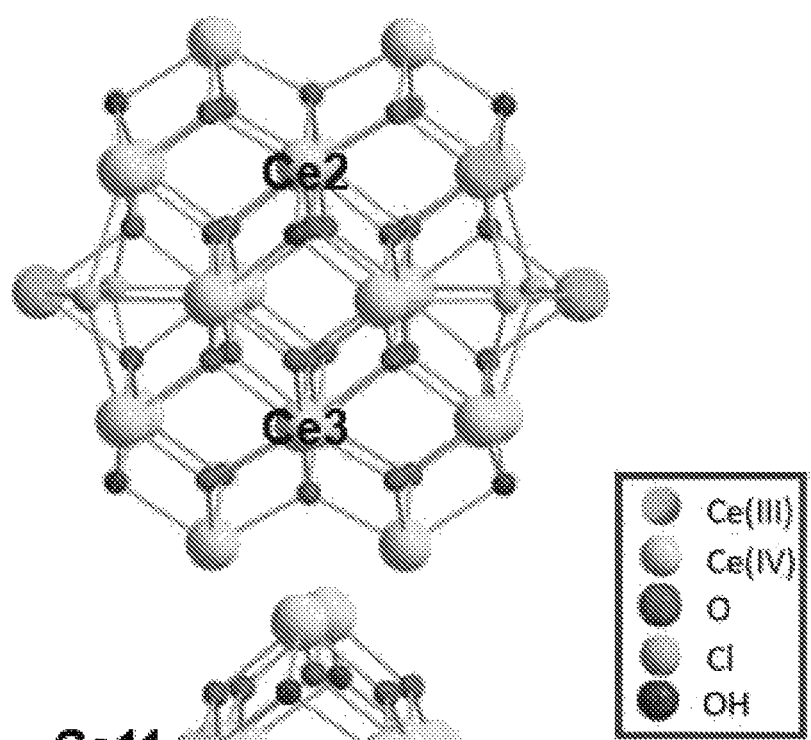
Figure 19C:
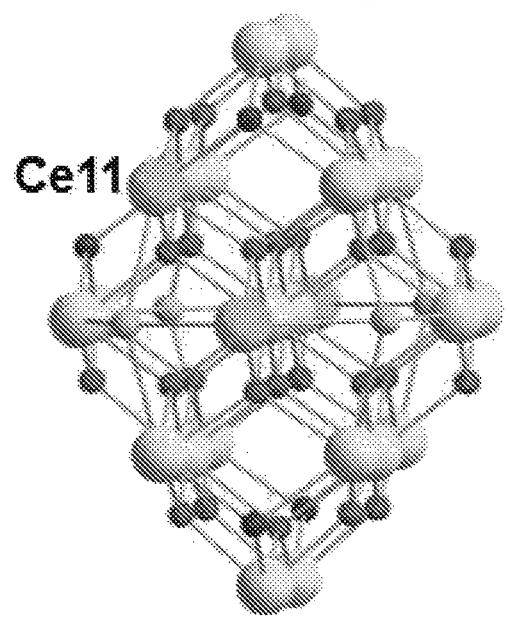

The bvs values of $Ce_{24}$ (FIG. 19A) show that ce5 is reduced and the other ions are assigned as ce(Iv), Ce2 and Ce3 have low values but have been compared average Ce—O bond lengths have been compared with other $Ce_{24}$ and they have a similar bond length. There is one odd bvs value of 3.63 for ce11. Ce11 is in a similar position to the 3$^{rd}$ reduced ion in the ce24b and could therefore be reduced. Core structures of $Ce_{24}$ are shown in FIGS. 19B and 19C.

Figure 20C:
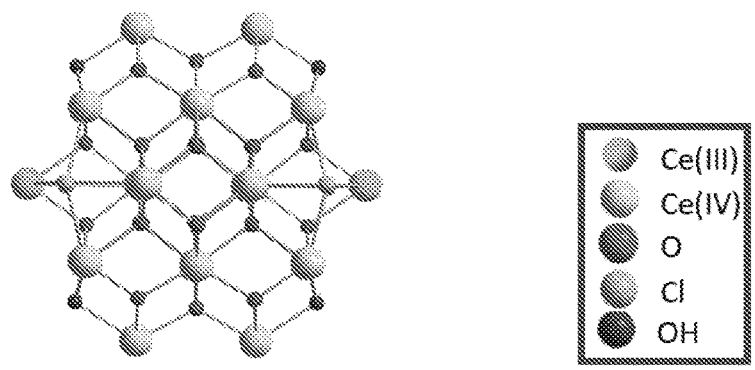
Figure 20D:
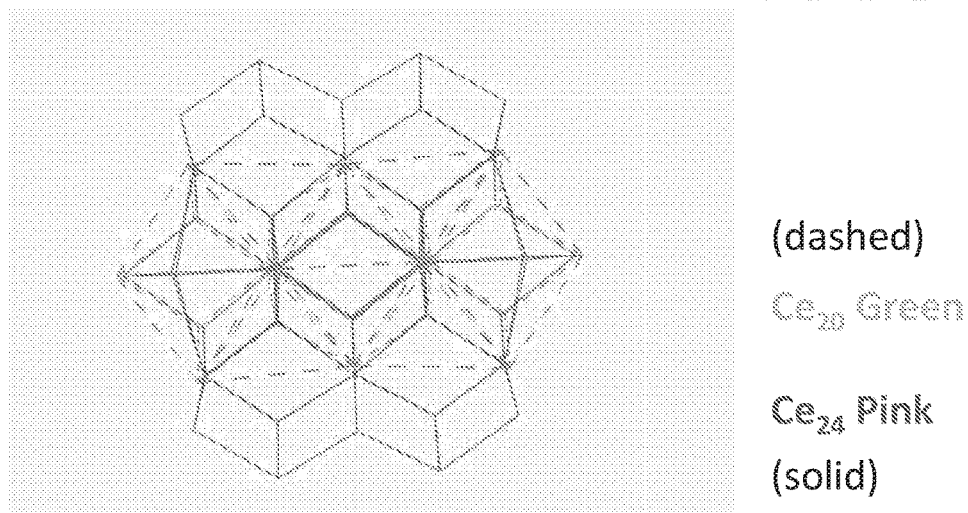

Using RMS analysis the structural similarities between the $Ce_{24}$ and $Ce_{20}$ can be compared. The $Ce_{24}$ orientation is shown above the RMS diagram (FIG. 20C) where the $Ce_{20}$ is shown in green is overlaid on the ce24 in pink (FIG. 20D). These diagonal dashed green bonds can be ignored as they are ce-ce bonds. In the table reduced ions are shown in bold and similarly to the Ce14 reduced ions show the greatest deviation from the $Ce_{24}$ as they go from reduced to oxidized with the increase in nuclearity (FIGS. 20A and 20B).

Example 2

$Ce_{20}$ Synthesis

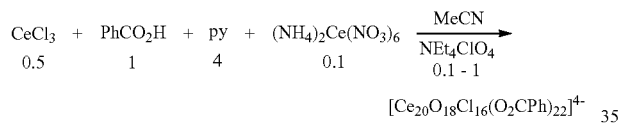

$[Ce_{20}O_{18}Cl_{16}(O_2CPh)_{22}]^{4-}$

With addition of $NEtClO_4$ (0.1-1 mmol) to the reaction solution after the reaction is completed the yield was increased to 24%.

Figure 21A:
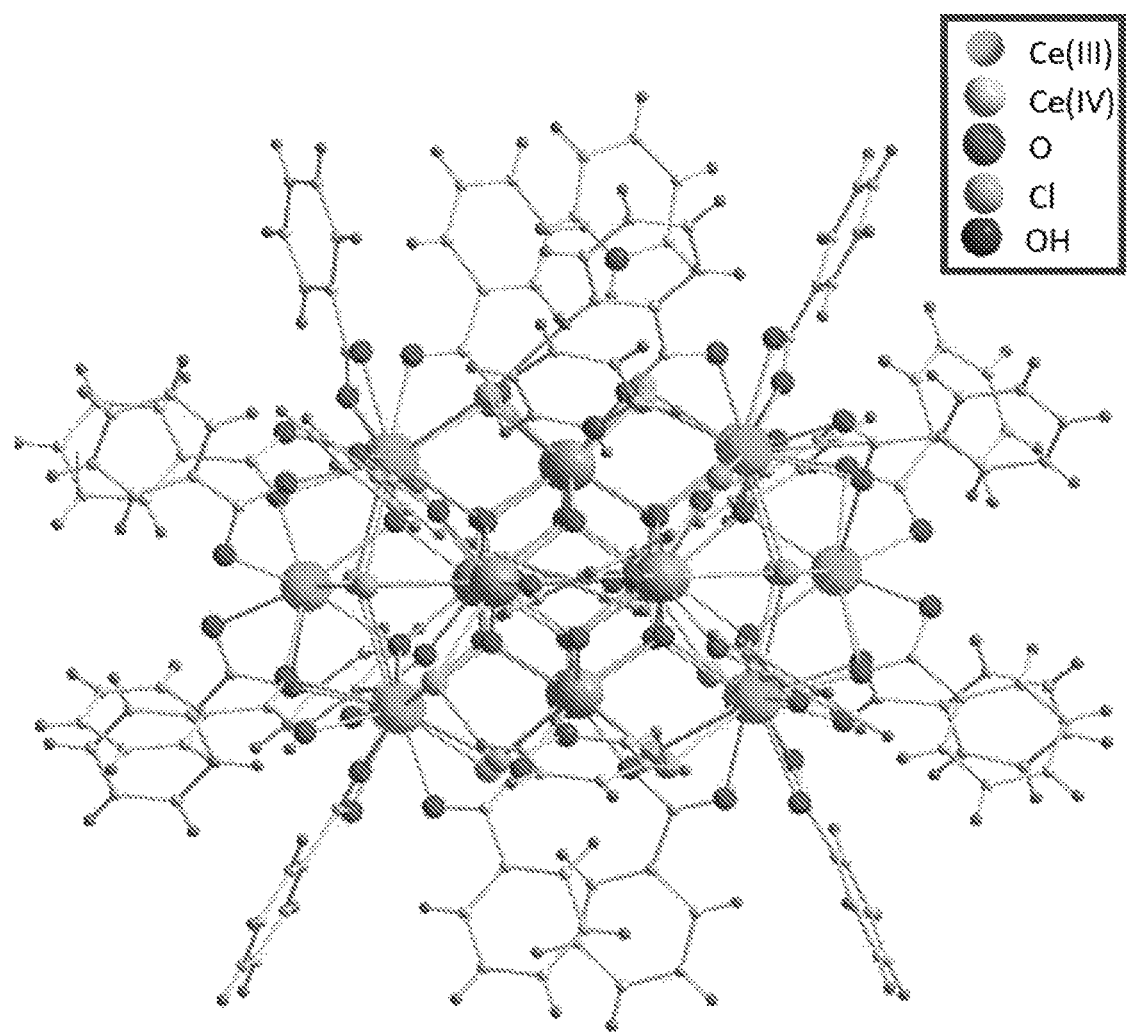
FIGS. 21A-21C illustrate the structure of the $Ce_{20}$ with (FIG. 21A) and without (FIGS. 21B-21C) benzoate ligands. Color code: $Ce^{IV}$ gold, $Ce^{III}$ sky blue, O red, Cl green, N blue, C light grey, H dark grey.
Figure 21B:
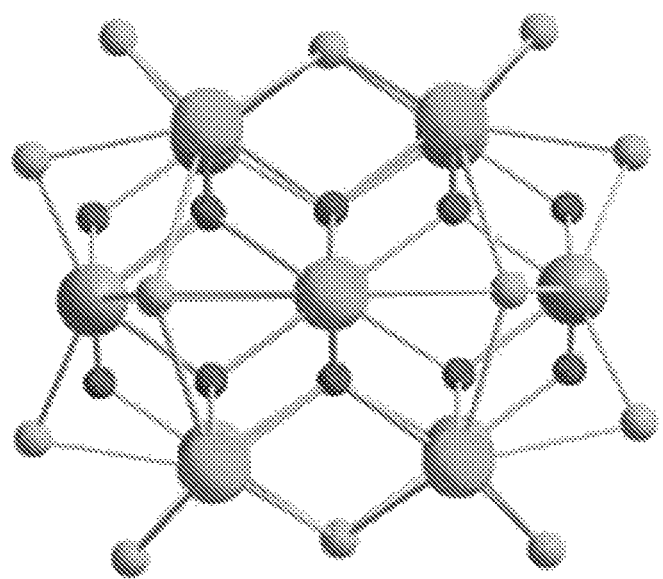
Figure 21B:
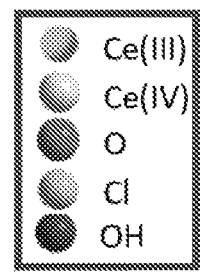
Figure 21C:
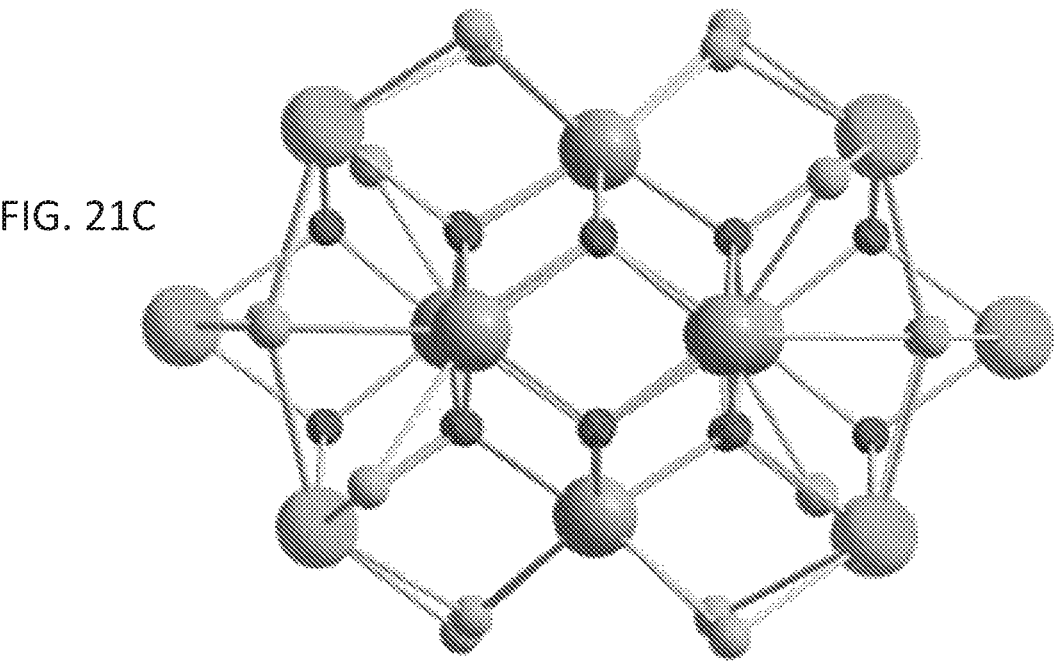

FIGS. 21A-21C illustrate the structure of the $Ce_{20}$ with (FIG. 21A) and without (FIGS. 21B-21C) benzoate ligands. Color code: $Ce^{IV}$ gold, $Ce^{III}$ sky blue, O red, Cl green, N blue, C light grey, H dark grey.

FIGS. 22A-22B depict the facets of the $Ce_{20}$. The benzoate ligands have been omitted for clarity. Facets are colour coded: (100) facets are blue, (111) facets are green. On the (100) facets there are $\mu_4$-Cl⁻ ions and at the (111)(100) facet intersection there are $\mu_2$-Cl⁻ ions. Colour code: $Ce^{IV}$ gold, $Ce^{III}$ sky blue, O red, Cl green.

Example 3

$Ce_{24b}Cl$ Synthesis

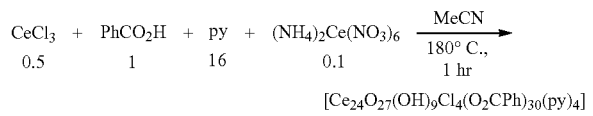

$[Ce_{24}O_{27}(OH)_9Cl_4(O_2CPh)_{30}(py)_4]$

Repeating the $Ce_{20}$ synthesis with additional pyridine equivalents and heating at 180° C. for 1 hour in a Biotage Intiator resulted in a $Ce_{24b}Cl$ product in a 4% yield. This $Ce_{24}$ is isostructural with the previously synthesized $Ce_{24}$ that was reported by Mitchell with 21 $Ce^{4+}$ ions and 3 $Ce^{3+}$ ions.[1]

FIGS. 23A-23B illustrate the structure of the $Ce_{24b}Cl$ with (FIG. 23A) and without (FIG. 23B) the benzoate ligands Color code: $Ce^{IV}$ gold, $Ce^{III}$ sky blue, O red, Cl green, N blue, OH purple, C light grey, H dark grey.

Figure 24:
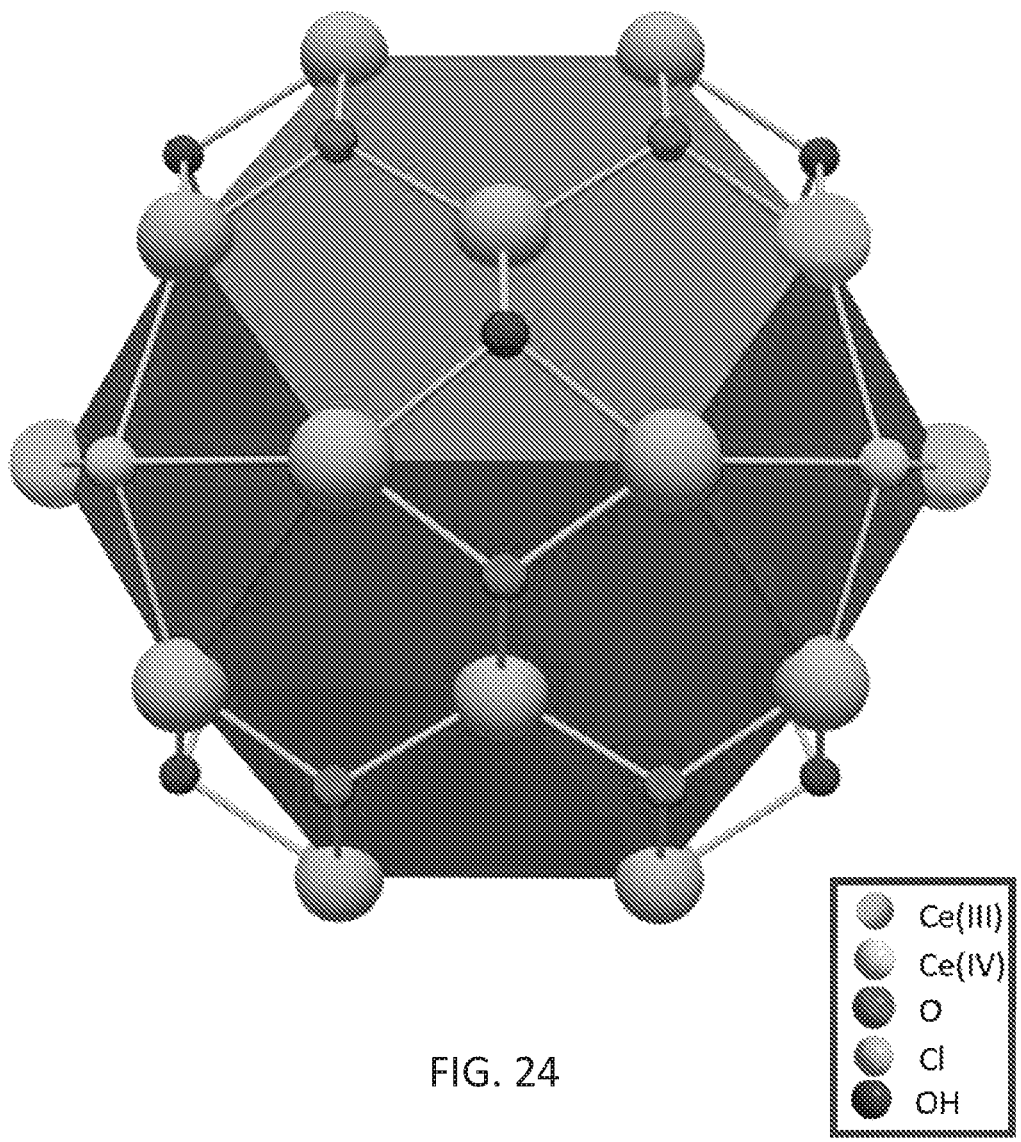
FIG. 24 shows the facets of the $Ce_{24b}Cl$. The benzoate ligands have been omitted for clarity. Facets are color coded: (100) facets are blue, (111) facets are green. Color code: $Ce^{IV}$ gold, $Ce^{III}$ sky blue, O red, Cl green, OH purple.

FIG. 24 shows the facets of the $Ce_{24b}Cl$. The benzoate ligands have been omitted for clarity. Facets are color coded: (100) facets are blue, (111) facets are green. Color code: $Ce^{IV}$ gold, $Ce^{III}$ sky blue, O red, Cl green, OH purple.

Example 4

$Ce_{24a}Cl$ Synthesis

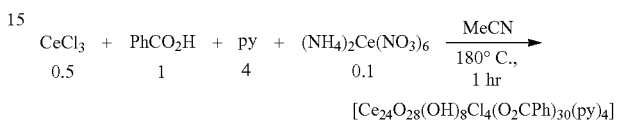

$[Ce_{24}O_{28}(OH)_8Cl_4(O_2CPh)_{30}(py)_4]$

Repeating the $Ce_{20}$ synthesis and heating at 180° C. for 1 hour in a Biotage Intiator resulted in a $Ce_{24a}Cl$ product in a 5% yield. This $Ce_{24}$ is isostructural with the previously synthesized $Ce_{24}$ that was reported by Mitchell et al., with 22 $Ce^{4+}$ ions and 2 $Ce^{3+}$ ions.[2]

Figure 25B:
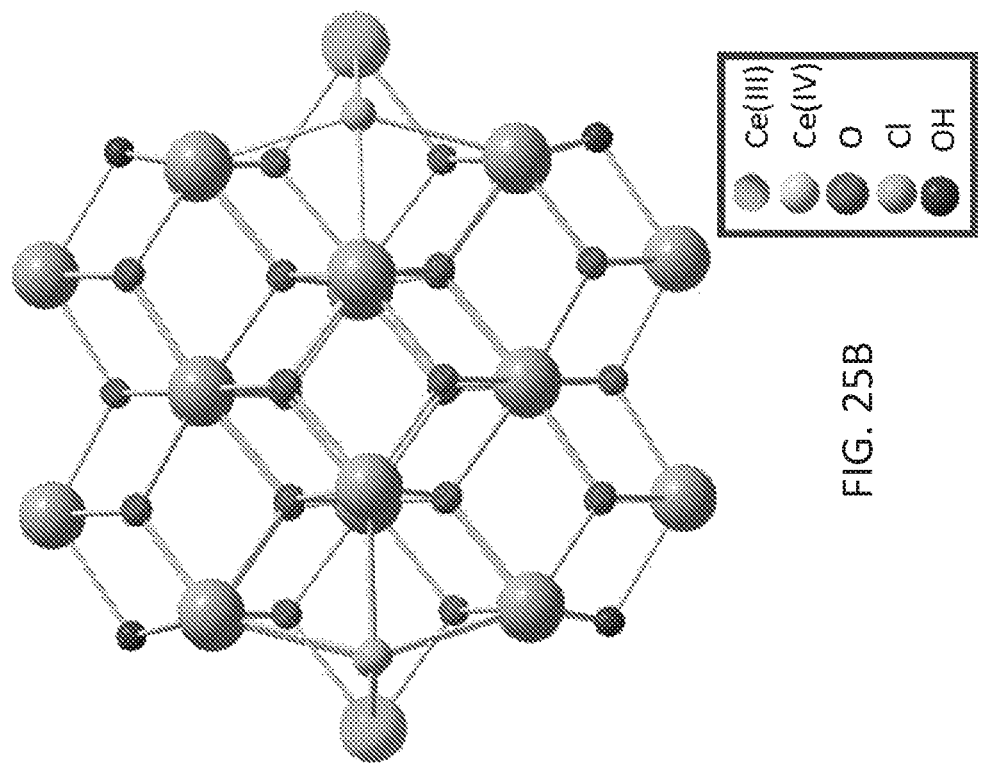
FIGS. 25A-25B show the structure of the $Ce_{24a}Cl$ with (FIG. 25A) and without (FIG. 25B) the benzoate ligands. Color code: $Ce^{IV}$ gold, $Ce^{III}$ sky blue, O red, Cl green, N blue, OH purple, C light grey, H dark grey.
Figure 25A:
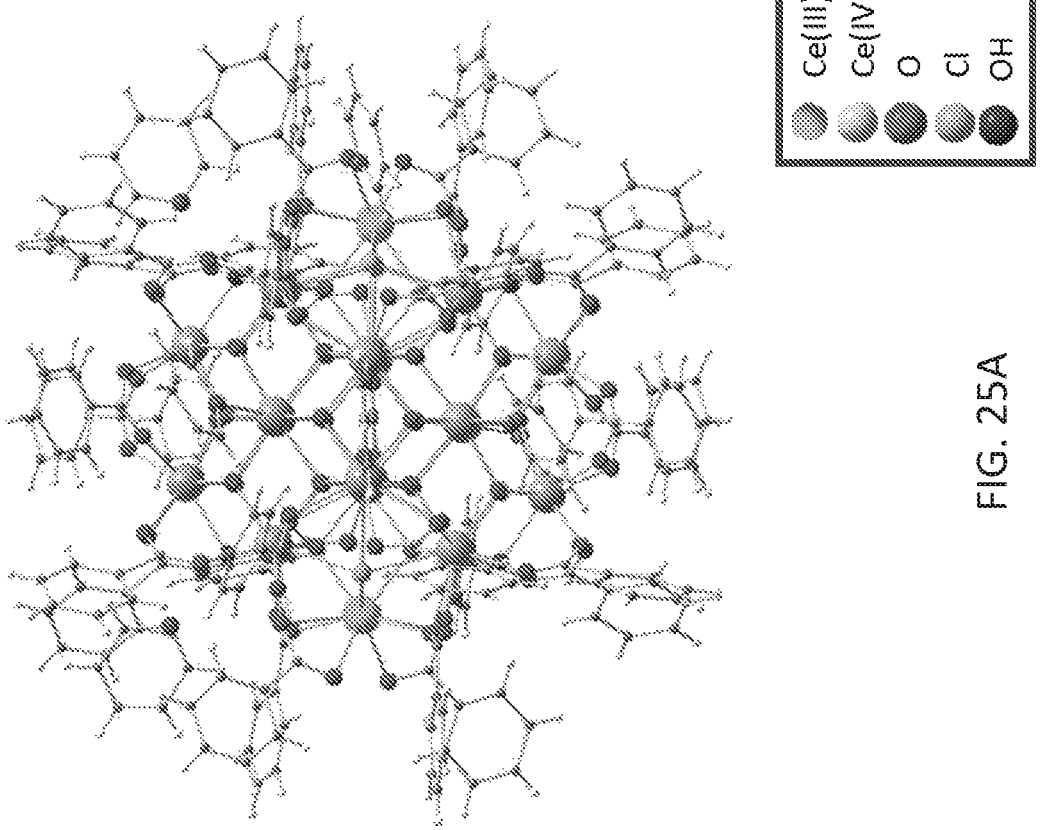

FIGS. 25A-25B show the structure of the $Ce_{24a}Cl$ with (FIG. 25A) and without (FIG. 25B) the benzoate ligands. Color code: $Ce^{IV}$ gold, $Ce^{III}$ sky blue, O red, Cl green, N blue, OH purple, C light grey, H dark grey.

Figure 26:
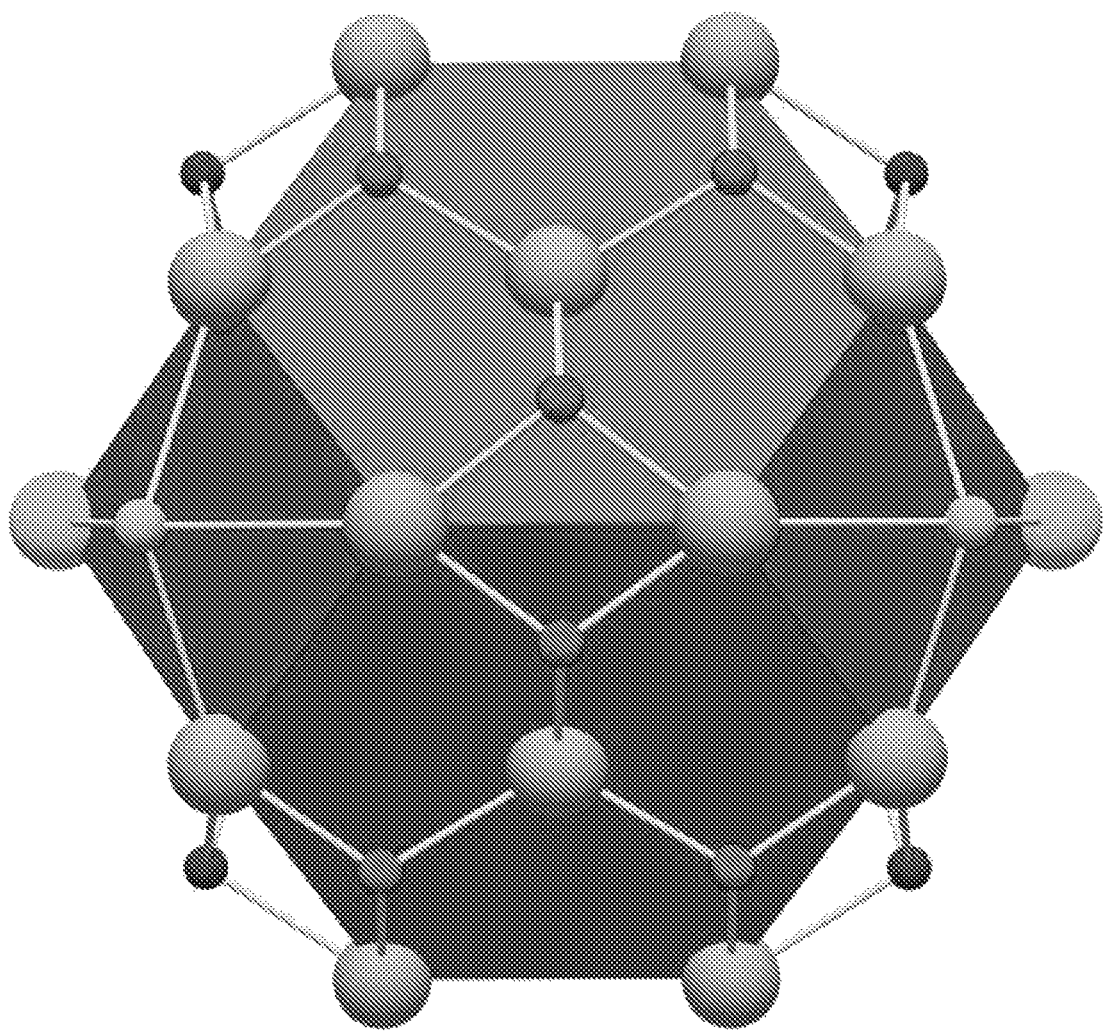
FIG. 26 shows the facets of the $Ce_{24a}Cl$. The benzoate ligands have been omitted for clarity. Facets are color coded: (100) facets are blue, (111) facets are green. Color code: $Ce^{IV}$ gold, $Ce^{III}$ sky blue, O red, Cl green, OH purple.

FIG. 26 shows the facets of the $Ce_{24a}Cl$. The benzoate ligands have been omitted for clarity. Facets are color coded: (100) facets are blue, (111) facets are green. Color code: $Ce^{IV}$ gold, $Ce^{III}$ sky blue, O red, Cl green, OH purple.

Example 5

$Ce_{14}$ Synthesis

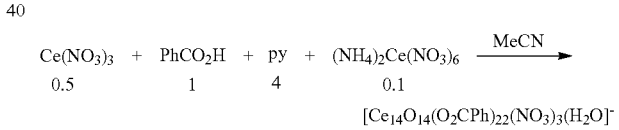

$[Ce_{14}O_{14}(O_2CPh)_{22}(NO_3)_3(H_2O)]^-$

With new $Ce(NO_3)_3$ the yield of $Ce_{14}$ was increased to 30%.

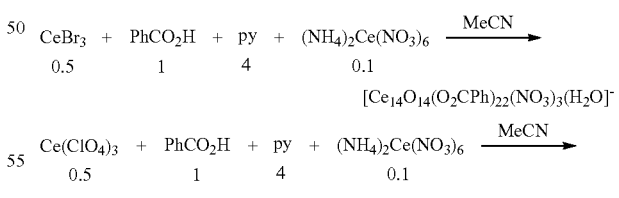

$[Ce_{14}O_{14}(O_2CPh)_{22}(NO_3)_3(H_2O)]^-$ $[Ce_{14}O_{14}(O_2CPh)_{22}(NO_3)_3(H_2O)]^-$

For both the $CeBr_3$ and the $Ce(ClO_4)_3$ syntheses the formula is assumed, based on the color of the product, FTIR analysis and elemental analysis of the $CeBr_3$ product which showed no Br⁻ in the product.

Figures 27A, 27B:
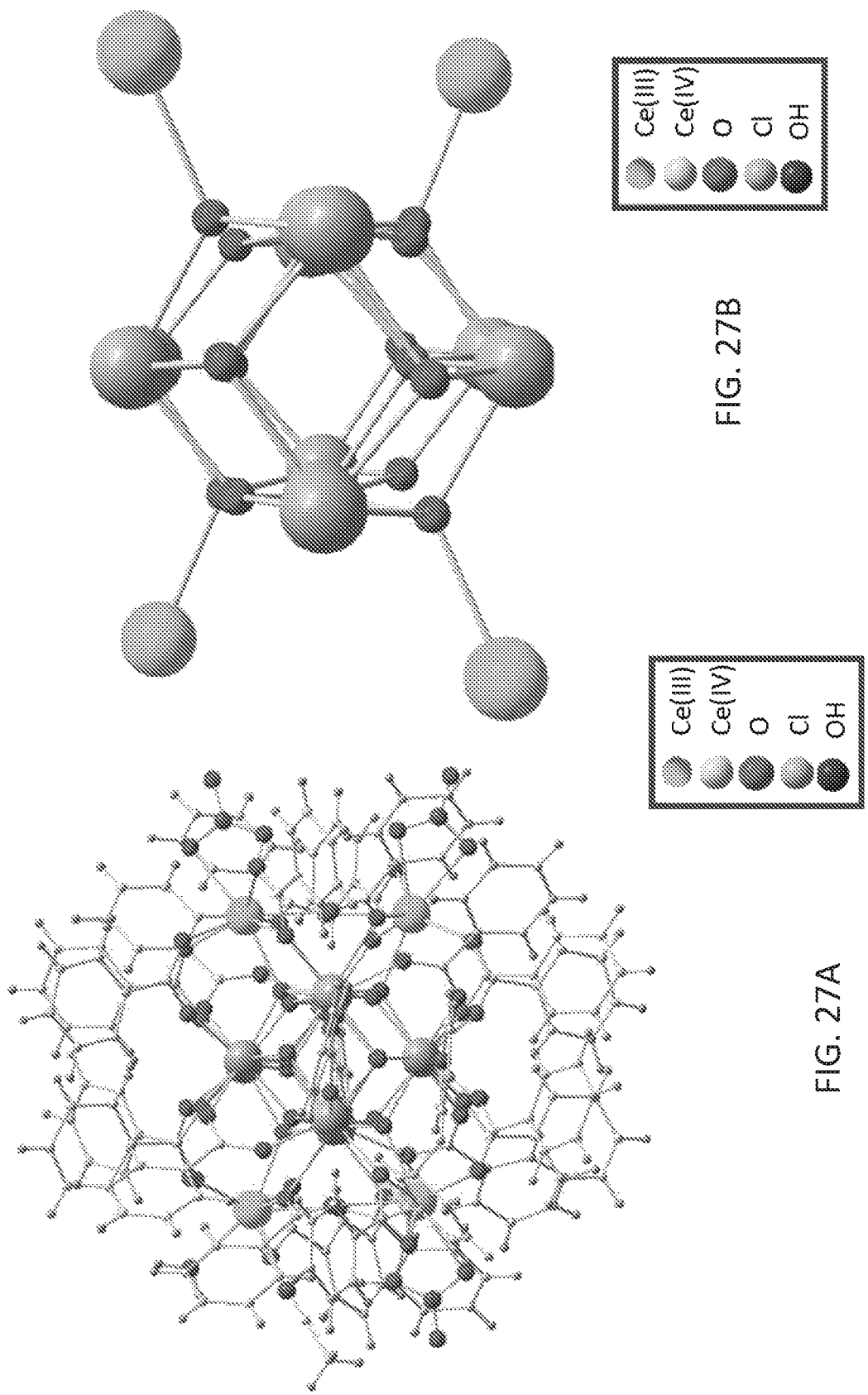
FIGS. 27A-27B illustrate the structure of the $Ce_{14}$ with (FIG. 27A) and without (FIG. 27B) the benzoate ligands Color code: $Ce^{IV}$ gold, $Ce^{III}$ sky blue, O red, Cl green, N blue, OH purple, C light grey, H dark grey.

FIGS. 27A-27B illustrate the structure of the $Ce_{14}$ with (FIG. 27A) and without (FIG. 27B) the benzoate ligands Color code: $Ce^{IV}$ gold, $Ce^{III}$ sky blue, O red, Cl green, N blue, OH purple, C light grey, H dark grey.

Figure 28B:
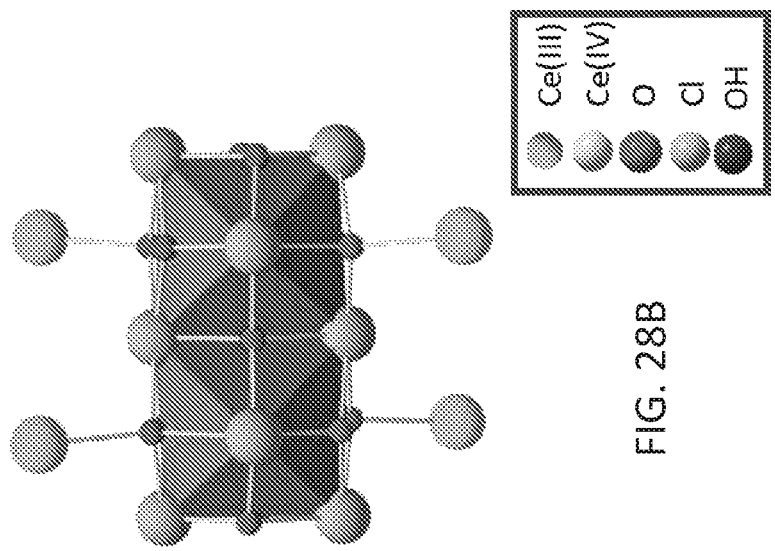
FIGS. 28A-28B show the facets of the $Ce_{14}$. The benzoate ligands have been omitted for clarity. Facets are color coded: (111) facets are green. Color code: $Ce^{IV}$ gold, $Ce^{III}$ sky blue, O red.
Figure 28A:
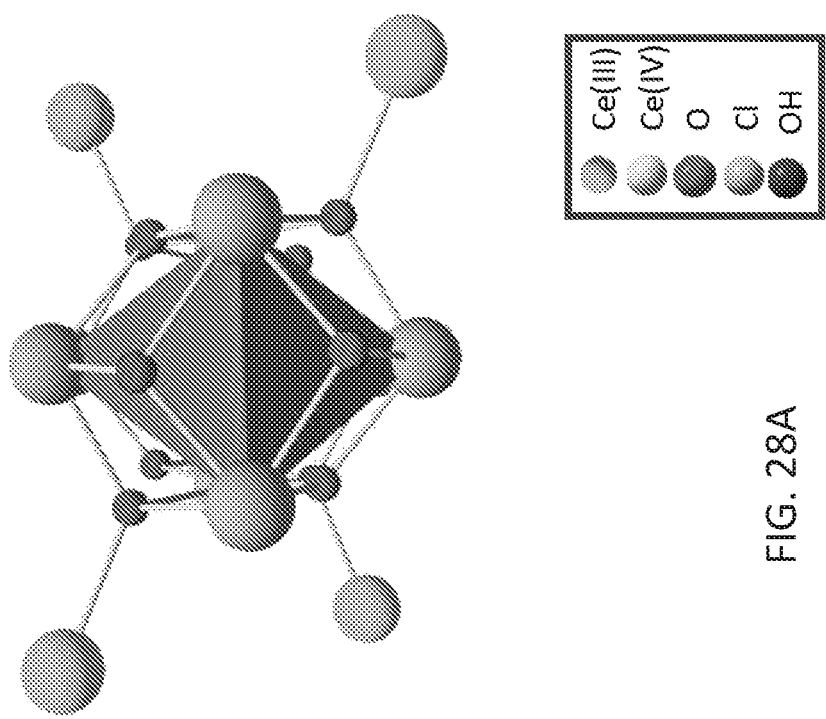

FIGS. 28A-28B show the facets of the $Ce_{14}$. The benzoate ligands have been omitted for clarity. Facets are color coded: (111) facets are green. Color code: $Ce^{IV}$ gold, $Ce^{III}$ sky blue, O red.

Example 6

$Ce_6F$ Synthesis

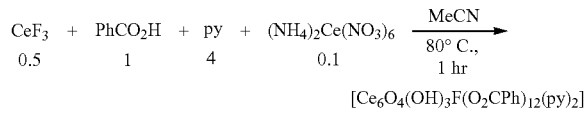

The $Ce_6O_4(OH)_3F$ is synthesized using $CeF_3$ and heating the reaction in a Biotage Initiator for 1 hour at 80° C. The solution is left to stand undisturbed and over the course of a week yellow crystals are produced in a 6% yield. The incorporation of $F^-$ into the product was confirmed through elemental analysis.

Figure 29B:
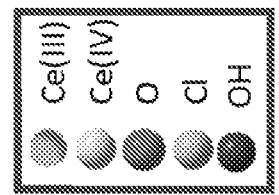
FIGS. 29A-29B illustrate the structure of $Ce_6F$ with (FIG. 29A) and without (FIG. 29B) benzoate ligands. $Ce^{IV}$ gold, $Ce^{III}$ sky blue, O red, F pink, N blue, OH purple, C light grey, H dark grey.
Figure 29B:
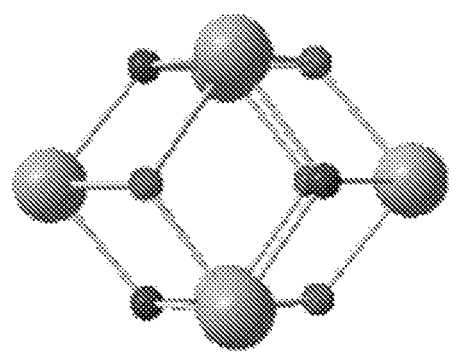
Figure 29A:
Figure 29A:
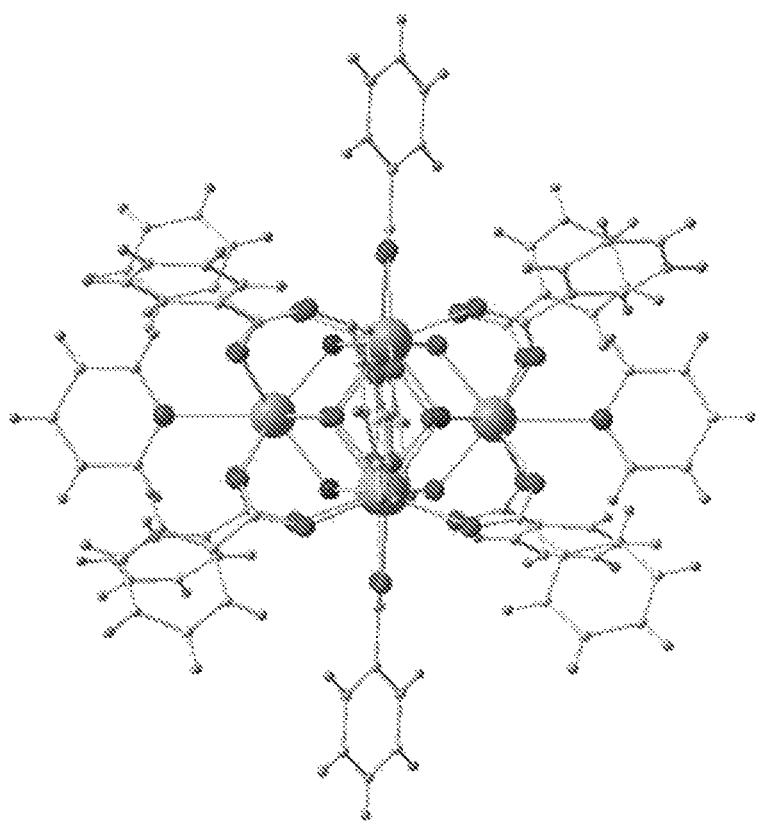

FIGS. 29A-29B illustrate the structure of $Ce_6F$ with (FIG. 29A) and without (FIG. 29B) benzoate ligands. $Ce^{IV}$ gold, $Ce^{III}$ sky blue, O red, F pink, N blue, OH purple, C light grey, H dark grey.

Example 7

$Ce_{36}Cl$ Synthesis

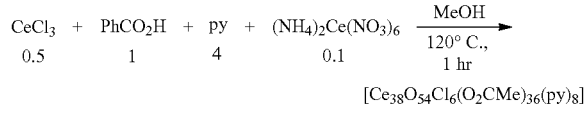

The $Ce_{36}Cl$ is synthesized using $CeCl_3$ as the starting $Ce^{3+}$ material and heating the reaction in a Biotage Initiator for 1 hour at 120° C. The product was synthesized in 10% yield. This $Ce_{38}$ is isostructural with the previously synthesized $Ce_{38}$ by Mitchell et al, but in place of the $\mu_4$-$OH^-$ has six $\mu_4$-$Cl^-$.

Figure 30B:
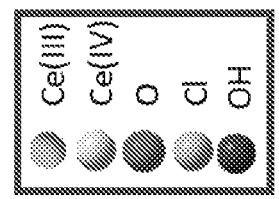
FIGS. 30A-30B depict the structure of $Ce_{35}Cl$ with (FIG. 30A) and without (FIG. 30B) acetate ligands, H omitted for clarity. Color code: $Ce^{IV}$ gold, $Ce^{III}$ sky blue, O red, Cl green, C light grey.
Figure 30B:
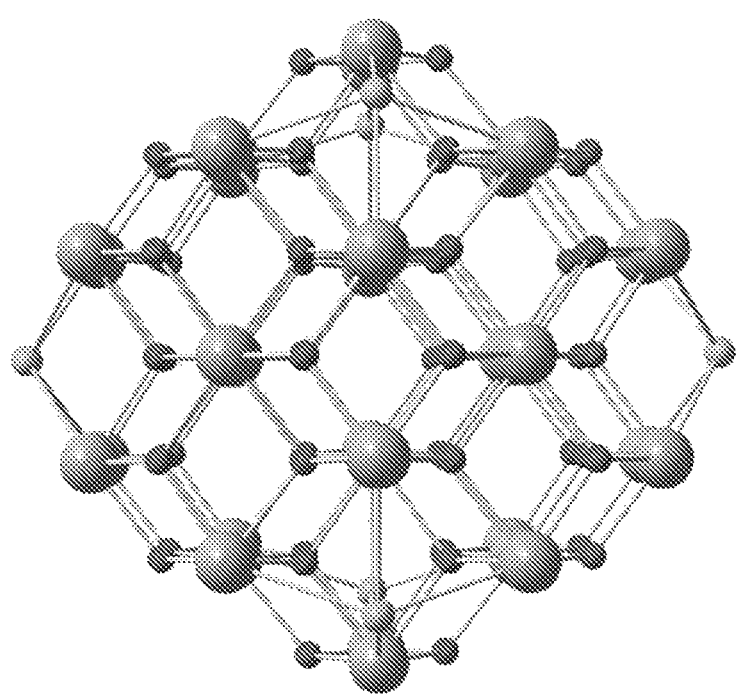
Figure 30A:
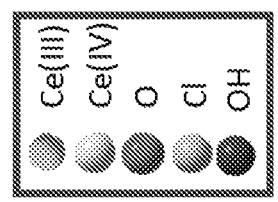
Figure 30A:
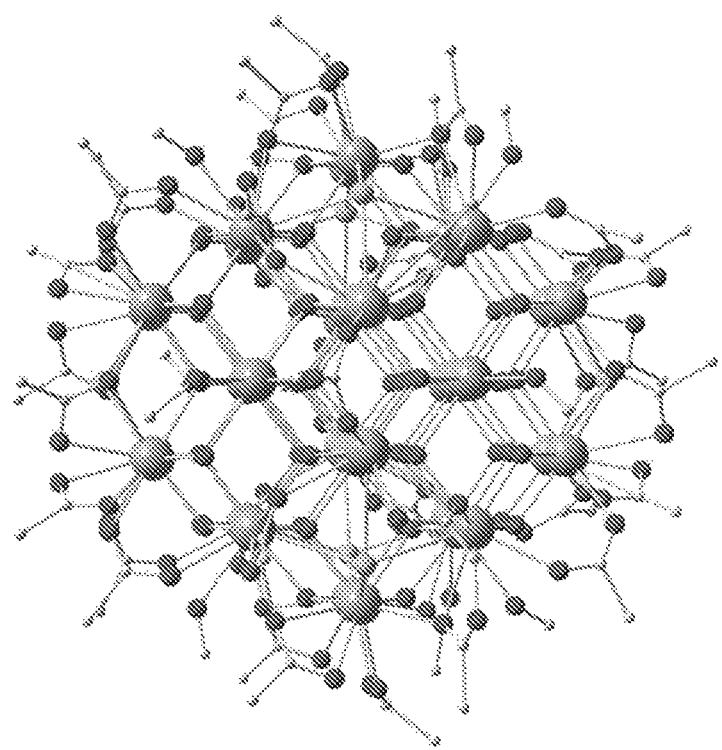

FIGS. 30A-30B depict the structure of $Ce_{38}Cl$ with (FIG. 30A) and without (FIG. 30B) acetate ligands, H omitted for clarity. Color code: $Ce^{IV}$ gold, $Ce^{III}$ sky blue, O red, Cl green, C light grey.

Figure 31:
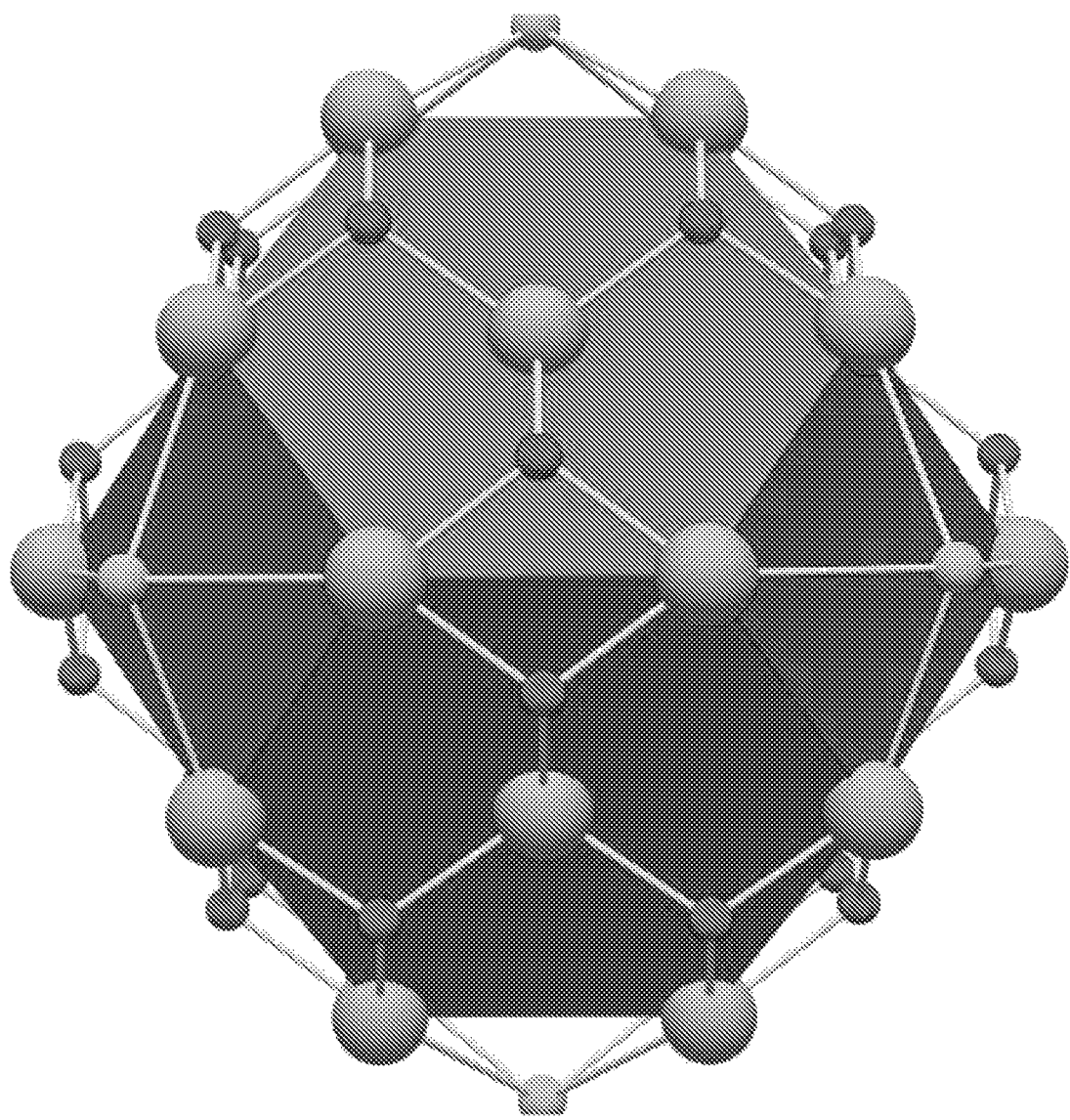
FIG. 31 show the facets of the $Ce_{35}Cl$. The acetate ligands have been omitted for clarity. Facets are color coded: (100) facets are blue, (111) facets are green. Color code: $Ce^{IV}$ gold, $Ce^{III}$ sky blue, O red, Cl green.

FIG. 31 show the facets of the $Ce_{38}Cl$. The acetate ligands have been omitted for clarity. Facets are color coded: (100) facets are blue, (111) facets are green. Color code: $Ce^{IV}$ gold, $Ce^{III}$ sky blue, O red, Cl green.

Unless defined otherwise, all technical and scientific terms used have the same meaning as commonly understood by one of ordinary skill in the art to which this disclosure belongs. Although any methods and materials similar or equivalent to those described can also be used in the practice or testing of the present disclosure, the preferred methods and materials are now described.

Embodiments of the present disclosure will employ, unless otherwise indicated, techniques of separating, testing, and constructing materials, which are within the skill of the art. Such techniques are explained fully in the literature.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A method of synthesizing a molecular cerium-oxide nanocluster composition, comprising:
providing a first cerium source, an organic acid, and a solvent; and
mixing the first cerium source and the organic acid in a molar ratio of about 1:2 to about 1:4 in the presence of the solvent to create a reaction mixture at a temperature and a pressure for a period of time to create a composition of molecular cerium-oxide nanoclusters containing a plurality of molecular cerium-oxide nanoclusters; and
further comprising adding a second cerium source to the reaction mixture, wherein the second cerium source is different than the first cerium source.

2. The method of claim 1, wherein the first cerium source is a $Ce^{3+}$ salt.

3. The method of claim 1, wherein the first cerium source is $CeCl_3$, $Ce(NO_3)_3$, $Ce(ClO_4)_3$, $CeF_3$, $Ce_2(SO_4)_3$, $CeBr_3$, or $CeI_3$, individually or in combination.

4. The method of claim 1, wherein the organic acid is of the formula $X_1CO_2H$, $X_1Y_1PO_2H$, or $X_1PO_3H$, wherein $X_1$ and $Y_1$ are selected from the group consisting of: an alkyl group, an aromatic group, substituted phenyls, a plurality of connected phenyls, linear or branched aliphatic, alicyclic groups, and a combination thereof.

5. The method of claim 1, wherein the organic acid is $MeCO_2H$, $PhCO_2H$, or $CH_3CH_2CO_2H$, individually or in combination.

6. The method of claim 1, wherein the solvent is MeCN.

7. The method of claim 1, wherein the second cerium source is $(NH_4)_2Ce(NO_3)_3$ or $(TBA)_2[Ce(NO_3)_6$, individually or in combination.

8. The method of claim 1, further comprising adding an anion source to the reaction mixture.

9. The method of claim 8, wherein the anion source is HCl, HBr, HF, or $HNO_3$, individually or in combination.

10. The method of claim 1, further comprising adding pyridine to the reaction mixture.

11. The method of claim 1, further comprising adding $N(CH_2CH_3)_4ClO_4$ to the reaction mixture.

12. The method of claim 1, wherein the first cerium source is $CeCl_3$ and the molecular cerium-oxide nanocluster composition has a formula of $[Ce_{20}O_{18}Cl_{16}(O_2CPh)_{22}]^{4-}$.

13. The method of claim 1, wherein the first cerium source is $Ce(NO_3)_3$ and the molecular cerium-oxide nanocluster composition has a formula of $[Ce_{24}O_{27}(OH)_5Cl_4(O_2CPh)_{30}$ (pyridine)$_4]$, $[Ce_{24}O_{27}(OH)_9Cl_4(O_2CPh)_{30}(pyridine)_4]$, $[Ce_{24}O_{28}(OH)_8Cl_4(O_2CPh)_{30}(pyridine)_4]$, or $[Ce_{14}O_{14}(O_2CPh)_{22}(NO_3)_3(H_2O)]$.

14. The method of claim 1, wherein the first cerium source is $CeBr_3$ and the molecular cerium-oxide nanocluster composition has a formula of $[Ce_{14}O_{14}(O_2CPh)_{22}(NO_3)_3(H_2O)]$.

15. The method of claim 1, wherein the first cerium source is $Ce(ClO_4)_3$ and the molecular cerium-oxide nanocluster composition has a formula of $[Ce_{14}O_{14}(O_2CPh)_{22}(NO_3)_3(H_2O)]$.

16. The method of claim 1, wherein the first cerium source is $CeF_3$ and the molecular cerium-oxide nanocluster composition has a formula of $[Ce_6O_4(OH)_3F(O_2CPh)_{12}(pyridine)_2]$.

17. The method of claim 1, wherein the first cerium source is $CeCl_3$ and the molecular cerium-oxide nanocluster composition has a formula of $[Ce_{38}O_{54}Cl_6(O_2CMe)_{36}(pyridine)_8]$.

* * * * *